US012634233B2

(12) United States Patent
Fan et al.

(10) Patent No.: US 12,634,233 B2
(45) Date of Patent: May 19, 2026

(54) COMMUNICATION METHOD AND APPARATUS, AND COMMUNICATION SYSTEM

(71) Applicant: Huawei Technologies Co., Ltd., Shenzhen (CN)

(72) Inventors: Wei Fan, Beijing (CN); Guanjun Li, Nanjing (CN); Zhifeng He, Shenzhen (CN); Lianjing Zhang, Nanjing (CN); Meng Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 18/751,874

(22) Filed: Jun. 24, 2024

(65) Prior Publication Data

US 2024/0348544 A1     Oct. 17, 2024

Related U.S. Application Data

(63) Continuation of application No. PCT/CN2022/137688, filed on Dec. 8, 2022.

(30) Foreign Application Priority Data

Dec. 24, 2021   (CN) .......................... 202111602645.9
Mar. 30, 2022   (CN) .......................... 202210330790.4

(51) Int. Cl.
*H04L 12/46*      (2006.01)
*H04L 45/74*      (2022.01)
*H04L 45/76*      (2022.01)
*H04W 28/08*      (2023.01)

(52) U.S. Cl.
CPC .............. *H04L 45/74* (2013.01); *H04L 45/76* (2022.05)

(58) Field of Classification Search
None
See application file for complete search history.

(56) References Cited

U.S. PATENT DOCUMENTS

| | | | | | |
|---|---|---|---|---|---|
| 2015/0359019 | A1* | 12/2015 | Chen | ................ | H04W 36/0058 |
| | | | | | 370/329 |
| 2019/0373666 | A1* | 12/2019 | Khan | ................... | G06F 9/45558 |
| 2021/0160318 | A1* | 5/2021 | Sajeepa | ................. | G06F 3/0659 |
| 2021/0314187 | A1* | 10/2021 | Jindal | ................. | G06F 9/45558 |
| 2021/0314404 | A1* | 10/2021 | Glek | ....................... | G06F 3/067 |
| 2022/0201777 | A1* | 6/2022 | Teyeb | ................... | H04W 76/11 |
| 2023/0104568 | A1* | 4/2023 | Miriyala | ................ | H04L 45/42 |
| | | | | | 718/104 |

(Continued)

FOREIGN PATENT DOCUMENTS

| | | |
|---|---|---|
| CN | 106657330 A | 5/2017 |
| CN | 113746709 A | 12/2021 |

(Continued)

*Primary Examiner* — Christopher B Robinson
(74) *Attorney, Agent, or Firm* — Conley Rose, P.C.

(57) ABSTRACT

A communication method includes a control plane node transferring a first virtual media access control (MAC) address in a plurality of virtual MAC addresses on a plurality of user plane (UP) nodes from a first UP node in the plurality of UP nodes to a target UP node based on that the target UP node in the plurality of UP nodes in a virtual broadband network gateway (vBNG) system satisfies a target condition, where the target condition is related to a load of the target UP node.

20 Claims, 10 Drawing Sheets

(56) References Cited

U.S. PATENT DOCUMENTS

2023/0269130 A1*   8/2023   Li   ......................... H04L 45/645
370/221

FOREIGN PATENT DOCUMENTS

| CN | 114465834 | A | 5/2022 |
|----|-----------|-----|---------|
| EP | 2536068 | A1 | 12/2012 |
| WO | 2017114363 | A1 | 7/2017 |

\* cited by examiner

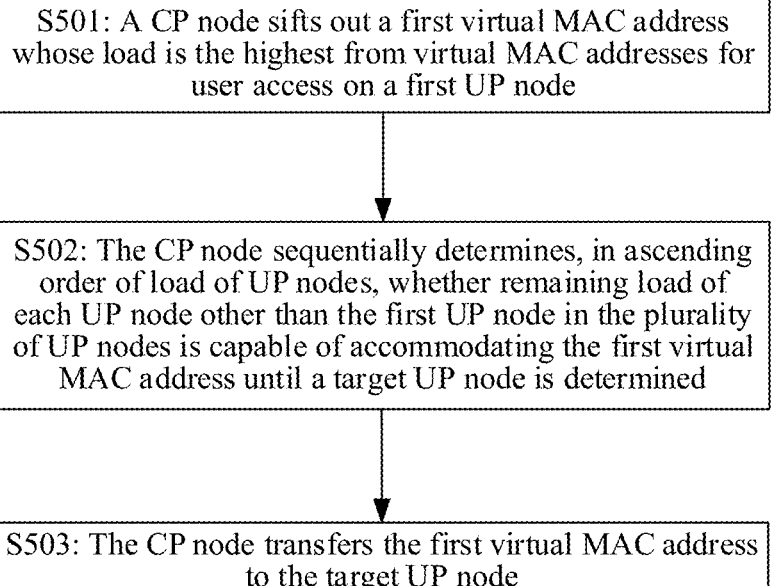

S501: A CP node sifts out a first virtual MAC address whose load is the highest from virtual MAC addresses for user access on a first UP node S502: The CP node sequentially determines, in ascending order of load of UP nodes, whether remaining load of each UP node other than the first UP node in the plurality of UP nodes is capable of accommodating the first virtual MAC address until a target UP node is determined S503: The CP node transfers the first virtual MAC address to the target UP node

FIG. 5

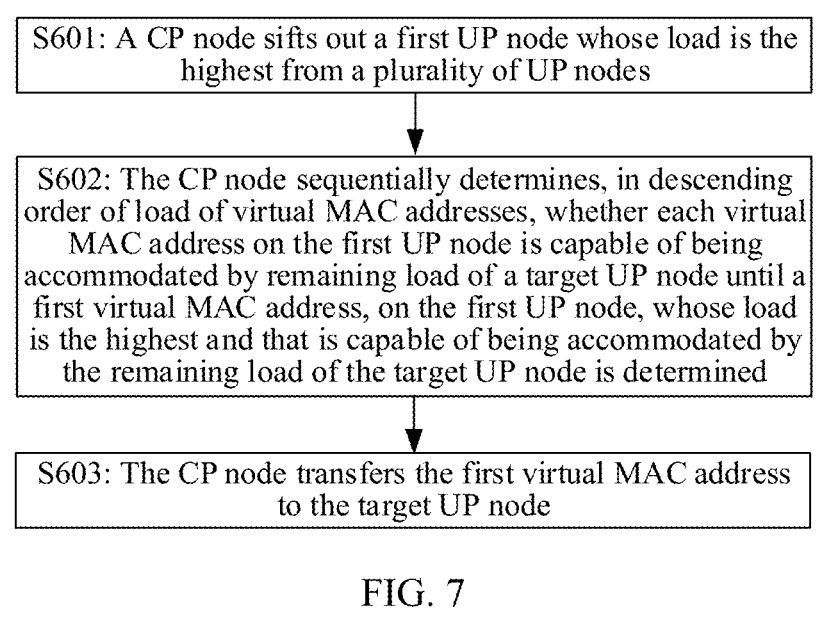

S601: A CP node sifts out a first UP node whose load is the highest from a plurality of UP nodes S602: The CP node sequentially determines, in descending order of load of virtual MAC addresses, whether each virtual MAC address on the first UP node is capable of being accommodated by remaining load of a target UP node until a first virtual MAC address, on the first UP node, whose load is the highest and that is capable of being accommodated by the remaining load of the target UP node is determined S603: The CP node transfers the first virtual MAC address to the target UP node

FIG. 7

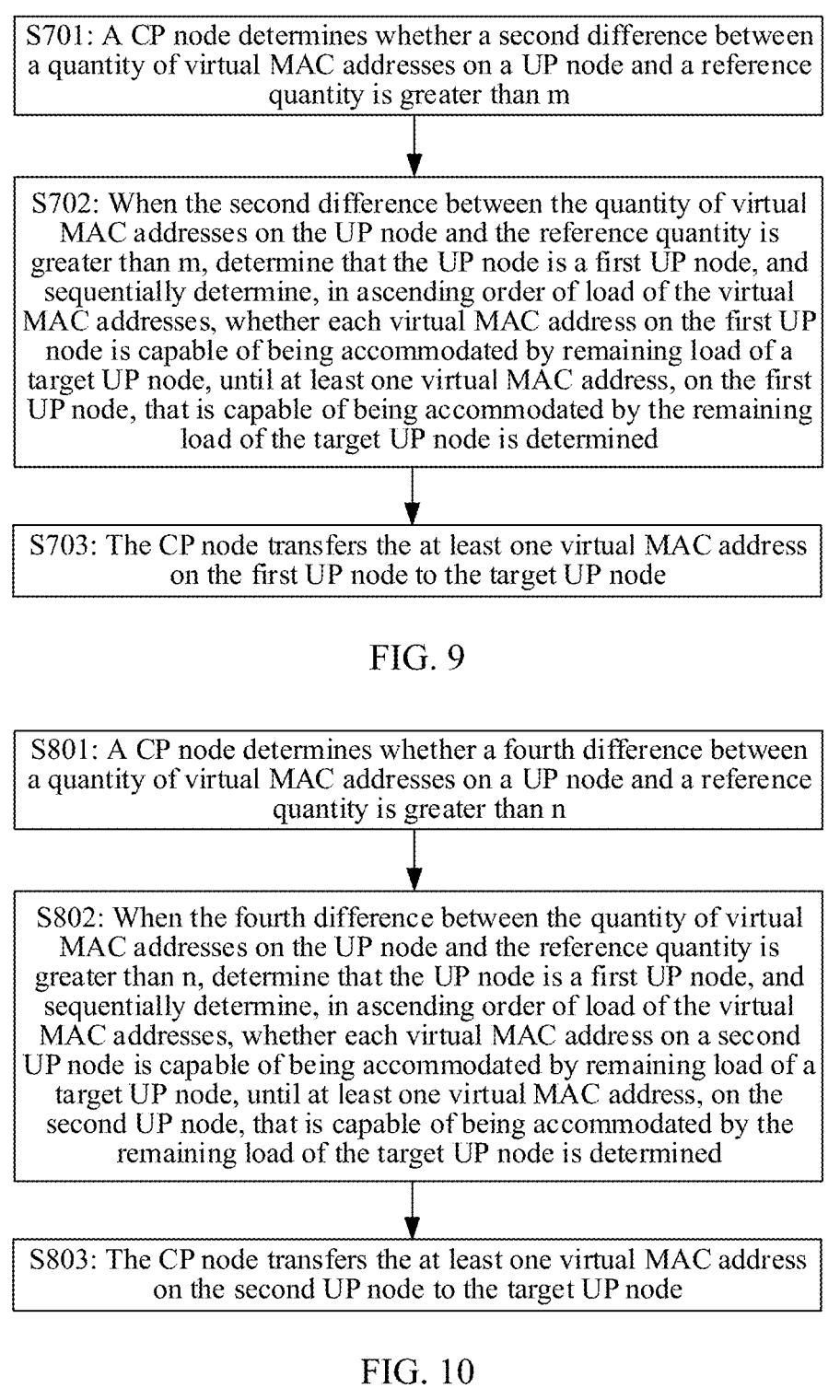

S701: A CP node determines whether a second difference between a quantity of virtual MAC addresses on a UP node and a reference quantity is greater than m S702: When the second difference between the quantity of virtual MAC addresses on the UP node and the reference quantity is greater than m, determine that the UP node is a first UP node, and sequentially determine, in ascending order of load of the virtual MAC addresses, whether each virtual MAC address on the first UP node is capable of being accommodated by remaining load of a target UP node, until at least one virtual MAC address, on the first UP node, that is capable of being accommodated by the remaining load of the target UP node is determined S703: The CP node transfers the at least one virtual MAC address on the first UP node to the target UP node

FIG. 9

S801: A CP node determines whether a fourth difference between a quantity of virtual MAC addresses on a UP node and a reference quantity is greater than n S802: When the fourth difference between the quantity of virtual MAC addresses on the UP node and the reference quantity is greater than n, determine that the UP node is a first UP node, and sequentially determine, in ascending order of load of the virtual MAC addresses, whether each virtual MAC address on a second UP node is capable of being accommodated by remaining load of a target UP node, until at least one virtual MAC address, on the second UP node, that is capable of being accommodated by the remaining load of the target UP node is determined S803: The CP node transfers the at least one virtual MAC address on the second UP node to the target UP node

CONT. FROM FIG. 11A

S901: A CP node sends, to a first UP node in a plurality of UP nodes
at a first moment based on quality of a link between each of the
plurality of UP nodes and the CP node, a first priority of responding
to a request of a user by the first UP node S902: The CP node sends, to a second UP node in the plurality of UP
nodes at a second moment based on quality of the link between each
of the plurality of UP nodes and the CP node, a second priority of
responding to the request of the user by the second UP node, where
the second UP node is different from the first UP node

FIG. 12

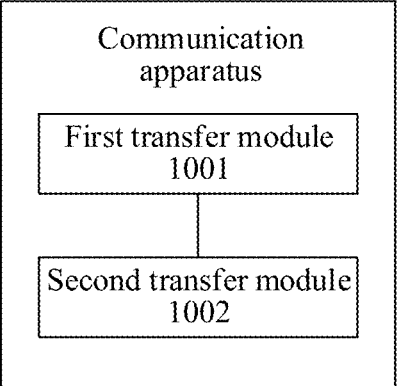

Communication
apparatus

First transfer module
1001

Second transfer module
1002

FIG. 13

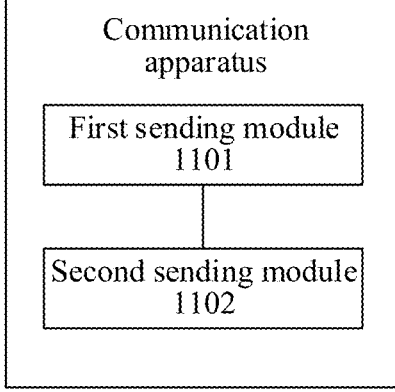

Communication
apparatus

First sending module
1101

Second sending module
1102

FIG. 14

COMMUNICATION METHOD AND APPARATUS, AND COMMUNICATION SYSTEM

CROSS-REFERENCE TO RELATED APPLICATIONS

This is a continuation of International Patent Application No. PCT/CN2022/137688 filed on Dec. 8, 2022, which claims priority to Chinese Patent Application No. 202111602645.9 filed on Dec. 24, 2021, and Chinese Patent Application No. 202210330790.4 filed on Mar. 30, 2022. All of the aforementioned patent applications are hereby incorporated by reference in their entireties.

TECHNICAL FIELD

This application relates to the field of communication technologies, and in particular, to a communication method and apparatus, and a communication system.

BACKGROUND

A virtual broadband network gateway (vBNG) system usually includes a control plane (CP) node and a plurality of user plane (UP) nodes. In addition, to ensure high availability of the vBNG system, the plurality of UP nodes usually include a plurality of active UP nodes and one backup UP node. This is also referred to as an N:1 warm backup technology.

The active UP node has a virtual media access control (MAC) address for user access, and the backup UP node has no virtual MAC address for user access. When the active UP node works normally, the active UP node can use the virtual MAC address to access a user and communicate with the user. In this case, the backup UP node cannot communicate with the user. When the active UP node is faulty, the CP node transfers the virtual MAC address for user access on the active UP node to the backup UP node, so that the backup UP node uses the virtual MAC address to communicate with the user, to ensure that user communication is not interrupted.

However, the CP node transfers, to the backup UP node, all virtual MAC addresses that may need to be transferred. When there is a large quantity of virtual MAC addresses transferred to the backup UP node, the backup UP node is easily overloaded and faulty.

SUMMARY

This application provides a communication method and apparatus, and a communication system, to resolve a problem that a UP node is easily overloaded and faulty. The technical solutions are as follows:

According to a first aspect, a communication method is provided. The method includes: A CP node transfers a first virtual MAC address in a plurality of virtual MAC addresses on a plurality of UP nodes from a first UP node in the plurality of UP nodes to a target UP node based on that the target UP node in the plurality of UP nodes in a vBNG system satisfies a target condition, where the target condition is related to load of the target UP node.

In a related technology in which an N:1 warm backup technology is used, when transferring the virtual MAC address, the CP node does not consider the load-related target condition, but directly transfers the virtual MAC address to a backup UP node. When the CP node transfers different virtual MAC addresses to a fixed backup UP node for a plurality of times, the backup UP node is easily overloaded and faulty. However, in this application, when transferring the virtual MAC address, the CP node may need to consider that the target UP node satisfies the load-related target condition, so that the first virtual MAC address can be transferred to the target UP node. It can be learned that this application provides another method for transferring a virtual MAC address by a CP node, to enrich functions of the CP node. In addition, in this application, when the CP node performs the operation of transferring the first virtual MAC address for a plurality of times, a plurality of target UP nodes selected for a plurality of times based on the target condition may be different. In this way, the plurality of first virtual MAC addresses transferred for the plurality of times may be transferred to different target UP nodes, to reduce a probability that one UP node is overloaded and faulty because the plurality of first virtual MAC addresses is transferred to the UP node.

In addition, in the related technology in which the N:1 warm backup technology is used, before the CP node transfers the virtual MAC address to the backup UP node, the backup UP node has no virtual MAC address for user access. As a result, resource idleness of the backup UP node is caused. However, in this application, the plurality of UP nodes has the plurality of virtual MAC addresses for user access, and in this application, that each of the plurality of UP nodes has a virtual MAC address for user access is used as an example. For example, before the first virtual MAC address is transferred from the first UP node to the target node, the target node may have another virtual MAC address, for example, a second virtual MAC address. This may also be referred to as an N+1 warm backup technology. In this case, the CP node determines the target UP node in the plurality of UP nodes that have the virtual MAC addresses, and transfers the first virtual MAC address to the target UP node. In addition, before the CP node transfers the first virtual MAC address to the target UP node, because the target UP node has the virtual MAC address for user access, the target UP node can also communicate with a user, to avoid resource idleness of the target UP node and improve communication efficiency of the vBNG system. In this application, the N+1 warm backup technology is used, and an active UP node and a backup UP node in the plurality of UP nodes may not be distinguished.

It should be noted that the load of the target UP node may be related to at least one parameter of the target UP node, and the load of the target UP node may be measured by using the at least one parameter. For example, the at least one parameter includes a quantity of users, user bandwidth, and the like carried on the target UP node. For example, the load of the target UP node is positively correlated with the quantity of users carried on the target UP node. The target UP node has one or more virtual MAC addresses for user access, the virtual MAC address may be used for carrying a user, and the quantity of users carried on the target UP node may be a sum of quantities of users carried on all the virtual MAC addresses on the target UP node.

Further, in this application, the CP node transfers the first virtual MAC address from the first UP node to the target UP node based on that the target UP node satisfies the target condition. Herein, the first UP node, the first virtual MAC address, and the target UP node may all have a plurality of implementations.

(1) For the first virtual MAC address, the first virtual MAC address may be any virtual MAC address on the first UP node.

Optionally, the first virtual MAC address may be a virtual MAC address randomly selected by the CP node on the first UP node.

Alternatively, before the CP node transfers the first virtual MAC address to the target UP node, the first virtual MAC address may be a virtual MAC address, on the first UP node, whose load is the highest and that is capable of being accommodated by remaining load of the target UP node. In this case, transferring the first virtual MAC address to the target UP node can greatly reduce load of the first UP node, and facilitate load balancing between the plurality of UP nodes.

Alternatively, before the CP node transfers the first virtual MAC address to the target UP node, the first virtual MAC address may be a virtual MAC address, on the first UP node, whose load is the lowest and that is capable of being accommodated by remaining load of the target UP node. In this case, transferring the first virtual MAC address to the target UP node can reduce load of the first UP node, and the load of the target UP node is not high, so that a probability of implementing load balancing between the plurality of UP nodes is increased.

Alternatively, before the CP node transfers the first virtual MAC address to the target UP node, the first virtual MAC address may be a virtual MAC address for user access, on the first UP node, whose load is the lowest and that is capable of being accommodated by remaining load of the target UP node. In this case, transferring the first virtual MAC address to the target UP node can reduce load of the first UP node, and the load of the target UP node is not high, so that a probability of implementing load balancing between the plurality of UP nodes is increased. In addition, because a user is accessed by using the first virtual MAC address, the user accessed by using the first virtual MAC address may be further transferred to the target UP node.

It should be noted that the load of the virtual MAC address may be related to at least one parameter of the virtual MAC address, and the at least one parameter may be used for measuring the load of the virtual MAC address. For example, the at least one parameter includes a quantity of users, user bandwidth, and the like carried on the virtual MAC address. For example, the load of the virtual MAC address is positively correlated with the quantity of users carried on the virtual MAC address.

(2) For the target UP node, the target UP node satisfies the target condition, and the target condition may be any load-related condition.

(2.1) For example, the target condition includes: the remaining load of the target UP node is capable of accommodating the first virtual MAC address. In this case, after the CP node transfers the first virtual MAC address to the target UP node, the target UP node is not overloaded, to prevent the target UP node from being faulty.

(2.2) For another example, the target condition includes: the target UP node is a UP node, in UP nodes other than the first UP node in the plurality of UP nodes, whose remaining load is capable of accommodating the first virtual MAC address and whose load is the lowest. In this way, transferring the first virtual MAC address to the target UP node does not cause the load of the target UP node to far exceed load of a remaining UP node, and load balancing between the plurality of UP nodes can be facilitated.

(2.3) For still another example, the target condition includes: the load of the target UP node is less than the load of the first UP node. In this case, after the CP node transfers the first virtual MAC address to the target UP node, the load of the first UP node can be reduced, and the load of the target UP node can be increased, so that load of the plurality of UP nodes can be balanced.

(2.4) For still another example, the target condition includes: a quantity of virtual MAC addresses on the target UP node is less than a quantity of virtual MAC addresses on the first UP node.

It should be noted that, when the target condition includes that the quantity of virtual MAC addresses on the target UP node is less than the quantity of virtual MAC addresses on the first UP node, transferring the first virtual MAC address from the first UP node to the target UP node can make the quantity of virtual MAC addresses on the first UP node and the quantity of virtual MAC addresses on the target UP node tend to be balanced. As time goes on, a user goes online and offline continuously, and load of each virtual MAC address tends to be balanced. In this case, if the quantity of virtual MAC addresses on the first UP node and the quantity of virtual MAC addresses on the target UP node tend to be balanced, load of the plurality of UP nodes tends to be balanced.

(2.5) For still another example, the target condition includes: a first difference between a reference quantity and the quantity of virtual MAC addresses on the target UP node is greater than m, where m≥0, the reference quantity $S=((Z-1)/N)+1$, Z represents a quantity of virtual MAC addresses in the plurality of virtual MAC addresses, and N represents a quantity of UP nodes in the plurality of UP nodes.

The reference quantity is related to an average value of the virtual MAC addresses on the plurality of UP nodes. When the first difference between the reference quantity and the quantity of virtual MAC addresses on the target UP node is greater than m, it indicates that the quantity of virtual MAC addresses on the target UP node is small. In this case, the virtual MAC address may need to be transferred to the target UP node, so that the quantities of virtual MAC addresses on the plurality of UP nodes tend to be balanced. As time goes on, a user goes online and offline continuously, and load of each virtual MAC address tends to be balanced. In this case, if the quantities of virtual MAC addresses on the plurality of UP nodes tend to be balanced, load of the plurality of UP nodes tends to be balanced.

(2.6) For still another example, the target condition includes: the target UP node is a newly added UP node in the plurality of UP nodes, and the newly added UP node may have no virtual MAC address for user access. The newly added UP node may be a UP node that is re-added to the plurality of UP nodes after a fault is rectified, or may be a UP node that is not faulty and that has not been added to the plurality of UP nodes. In this application, an example in which the target UP node is a newly added UP node is used. Certainly, the target UP node may not be a newly added UP node. This is not limited in this application.

In this application, the foregoing (2.1) to (2.6) provide a total of six conditions in the target condition. It may be understood that the target condition may include at least one of the six conditions. This is not limited in this application. When the target condition includes at least two of the six conditions, the target UP node may need to satisfy the at least two conditions, and the CP node may need to search, based on the at least two conditions, for the target UP node that satisfies the at least two conditions.

(3) For the first UP node, the first UP node may be any UP node in the plurality of UP nodes.

Optionally, the first UP node may be a faulty node or a non-faulty node in the plurality of UP nodes.

In one aspect, when the first UP node is a faulty node, and when transferring the first virtual MAC address from the first UP node to the target UP node based on that the target UP node satisfies the target condition, the CP node may transfer the first virtual MAC address from the first UP node to the target UP node based on that the target UP node satisfies the target condition and the first UP node is faulty. It can be learned that, when the faulty node (the first UP node) occurs in the plurality of UP nodes and the target UP node satisfies the target condition, the CP node may transfer the first virtual MAC address on the first UP node to the target UP node, to avoid communication interruption that is of a user accessed by using the first virtual MAC address and that is caused by the fault of the first UP node.

In another aspect, when the first UP node is a non-faulty node, the CP node transfers the first virtual MAC address from the first UP node to the target UP node, so that a user carried on the first virtual MAC address can be transferred from the first UP node to the target UP node, and the user can be unaware of the transfer.

Optionally, when the first UP node is a non-faulty node, the first UP node is a UP node, in the plurality of UP nodes, whose load is the highest and that has a virtual MAC address that is capable of being accommodated by the remaining load of the target UP node. In this case, the first virtual MAC address is transferred from the first UP node to the target UP node, so that the load of the first UP node can be reduced, overload of the first UP node can be avoided, and load balancing between the plurality of UP nodes is facilitated.

It may be understood that, when the first UP node is a non-faulty node, the first UP node may alternatively be implemented in another manner.

For example, when the first UP node is a non-faulty node, the first UP node may alternatively be a UP node randomly selected by the CP node from the plurality of UP nodes.

For another example, when the first UP node is a non-faulty node, the first UP node may alternatively be a UP node whose second difference between the quantity of virtual MAC addresses and the reference quantity is greater than m, where m≥0, the reference quantity $S=((Z-1)/N)+1$, Z indicates the quantity of virtual MAC addresses in the plurality of virtual MAC addresses, and N indicates the quantity of UP nodes in the plurality of UP nodes.

It should be noted that the reference quantity is related to the average value of the virtual MAC addresses on the plurality of UP nodes. When the second difference between the quantity of virtual MAC addresses on the first UP node and the reference quantity is greater than m, it indicates that the quantity of virtual MAC addresses on the first UP node is large. In this case, the first virtual MAC address on the first UP node may need to be transferred to another UP node, so that the quantities of virtual MAC addresses on the plurality of UP nodes tend to be balanced. As time goes on, a user goes online and offline continuously, and load of each virtual MAC address tends to be balanced. In this case, if the quantities of virtual MAC addresses on the plurality of UP nodes tend to be balanced, load of the plurality of UP nodes tends to be balanced.

In this application, an example in which when the second difference between the quantity of virtual MAC addresses on the first UP node and the reference quantity is greater than m, and the first UP node has at least one virtual MAC address that is capable of being accommodated by the remaining load of the target UP node, the target condition includes that the first difference between the reference quantity and the quantity of virtual MAC addresses on the target UP node is greater than m is used. In this case, when transferring the first virtual MAC address from the first UP node in the plurality of UP nodes to the target UP node, the CP node may transfer at least one virtual MAC address on the first UP node from the first UP node to the target UP node. A quantity of virtual MAC addresses in the at least one virtual MAC address on the first UP node is less than or equal to the first difference and the second difference, and the at least one virtual MAC address includes the first virtual MAC address. When the at least one virtual MAC address includes a plurality of virtual MAC addresses, the CP node may transfer the plurality of virtual MAC addresses from the first UP node to the target UP node once, and efficiency of balancing the quantity of virtual MAC addresses on the first UP node and the quantity of virtual MAC addresses on the target UP node can be improved.

The foregoing describes the plurality of implementations of the first UP node, the plurality of implementations of the first virtual MAC address, and the plurality of implementations of the target UP node (related to the plurality of implementations of the target condition) in this application. It may be understood that any implementation of the first UP node, any implementation of the first virtual MAC address, and any implementation of the target UP node in this application may be mutually combined, and all obtained communication methods fall within the protection scope of this application.

The following uses three examples to describe the communication method protected in this application.

Example 1: If the CP node transfers the first virtual MAC address from the first UP node to the target UP node based on that the target UP node satisfies the target condition and the first UP node is faulty, based on that the first UP node is faulty, when a virtual MAC address for user access exists on the first UP node, the CP node may perform a first operation at least once until no virtual MAC address for user access exists on the first UP node, or until no UP node whose remaining load is capable of accommodating the first virtual MAC address exists in the UP nodes other than the first UP node in the plurality of UP nodes, where the first operation includes: sifting out the first virtual MAC address whose load is the highest from virtual MAC addresses for user access on the first UP node; sequentially determining, in ascending order of load of the UP nodes, whether remaining load of each UP node other than the first UP node in the plurality of UP nodes is capable of accommodating the first virtual MAC address until the target UP node is determined; and transferring the first virtual MAC address to the target UP node.

In the example 1, the first UP node may be a faulty node, and the first virtual MAC address may be a virtual MAC address for user access, on the first UP node, whose load is the highest and that is capable of being accommodated by remaining load of the target UP node. The target condition may include: the target UP node is a UP node, in the UP nodes other than the first UP node in the plurality of UP nodes, whose remaining load is capable of accommodating the first virtual MAC address and whose load is the lowest.

It can be learned from the content of this example that the CP node sifts out the first virtual MAC address from the virtual MAC addresses for user access on the first UP node. In this case, after the first operation is repeatedly performed for a plurality of times, a case in which all the virtual MAC addresses for user access on the faulty first UP node are transferred to another UP node exists. In this way, users carried on the faulty first UP node can be transferred to another UP node, so that communication of these users is ensured.

The CP node sifts out the first virtual MAC address whose load is the highest from the virtual MAC addresses for user access on the first UP node. In this case, transferring the first virtual MAC address to the target UP node by the CP node can greatly reduce the load of the first UP node, and ensure that communication of a large quantity of users carried on the first UP node (users carried on the first virtual MAC address) is not interrupted. If the CP node repeatedly performs the first operation for a plurality of times, the CP node may transfer, in descending order of the load of the virtual MAC addresses, the virtual MAC address for user access on the first UP node, to ensure that communication of a large quantity of users carried on the first UP node is not interrupted.

The remaining load of the target UP node selected by the CP node is capable of accommodating the first virtual MAC address. In this case, after the CP node transfers the first virtual MAC address to the target UP node, the target UP node is not overloaded, to prevent the target UP node from being faulty. In addition, the CP node sequentially determines, in ascending order of the load of the UP node, whether the remaining load of each UP node other than the first UP node in the plurality of UP nodes is capable of accommodating the first virtual MAC address until the target UP node is determined. In this way, the target UP node selected by the CP node is a UP node, in the UP nodes other than the first UP node in the plurality of UP nodes, whose remaining load is capable of accommodating the first virtual MAC address and whose load is the lowest, and transferring the first virtual MAC address to the target UP node does not cause the load of the target UP node to far exceed load of another UP node, and load balancing between the plurality of UP nodes can be facilitated.

Example 2: If the CP node transfers the first virtual MAC address in the plurality of virtual MAC addresses from the first UP node in the plurality of UP nodes to the target UP node based on that the target UP node in the plurality of UP nodes satisfies the target condition, when the target UP node is not a UP node whose load is the highest in the plurality of UP nodes, the CP node may perform a second operation at least once until the target UP node is the UP node whose load is the highest in the plurality of UP nodes, or until no virtual MAC address that is capable of being accommodated by the remaining load of the target UP node exists on the UP node whose load is the highest in the plurality of UP nodes. The second operation includes: sifting out the first UP node whose load is the highest from the plurality of UP nodes; and transferring at least one virtual MAC address on the first UP node to the target UP node, to update load of the plurality of UP nodes, where the at least one virtual MAC address includes the first virtual MAC address.

In the example 2, the first UP node may be a UP node, in UP nodes other than the target UP node in the plurality of UP nodes, that has a virtual MAC address that is capable of being accommodated by the remaining load of the target UP node and whose load is the highest. The first virtual MAC address may be a virtual MAC address, on the first UP node, that is capable of being accommodated by the remaining load of the target UP node and whose load is the highest. The target condition may include: the target UP node is a newly added UP node.

It can be learned from the content of this example that, the CP node sifts out the first UP node whose load is the highest from the plurality of UP nodes. In this case, transferring the first virtual MAC address to the target UP node by the CP node can greatly reduce the load of the first UP node, prevent the first UP node from being faulty because of excessively high load, and ensure that communication of a large quantity of users carried on the first UP node (users carried on the first virtual MAC address) is not interrupted. After the second operation is repeatedly performed for a plurality of times, the CP node can transfer at least a part of virtual MAC addresses on a UP node whose load is high in the plurality of UP nodes to the target UP node, to facilitate load balancing between the plurality of UP nodes.

The CP node sequentially determines, in descending order of the load of the virtual MAC addresses, whether each virtual MAC address of the first UP node is capable of being accommodated by the remaining load of the target UP node, until the first virtual MAC address is determined. In this way, the first virtual MAC address selected by the CP node is a virtual MAC address whose load is the highest in virtual MAC addresses, on the first UP node, that are capable of being accommodated by the remaining load of the target UP node. Transferring the first virtual MAC address to the target UP node can improve load balancing efficiency of the plurality of UP nodes.

In addition, when the first virtual MAC address selected by the CP node is a virtual MAC address, on the first UP node, whose load is the lowest and that is capable of being accommodated by the remaining load of the target UP node, the CP node may sequentially determine, in ascending order of the load of the virtual MAC addresses, whether each virtual MAC address on the first UP node is capable of being accommodated by the remaining load of the target UP node until the first virtual MAC address is determined.

Example 3: If the CP node transfers the at least one virtual MAC address on the first UP node from the first UP node to the target UP node based on that the target UP node in the plurality of UP nodes satisfies the target condition, when the first difference is greater than m, the CP node sequentially performs a third operation on each UP node other than the target UP node in the plurality of UP nodes until the first difference is less than or equal to m. The third operation includes: transferring the at least one virtual MAC address on the first UP node to the target UP node, to update a quantity of virtual MAC addresses on each UP node.

In the example 3, the second difference between the quantity of virtual MAC addresses on the first UP node and the reference quantity may be greater than m, and the first UP node has the at least one virtual MAC address that is capable of being accommodated by the remaining load of the target UP node. The first virtual MAC address may be a virtual MAC address, on the first UP node, whose load is the lowest and that is capable of being accommodated by the remaining load of the target UP node. The target condition may include: the target UP node is a newly added UP node, and the first difference between the reference quantity and the quantity of virtual MAC addresses on the target UP node is greater than m.

It can be learned from the content of the example 3 that, the second difference that is between the quantity of virtual MAC addresses on the first UP node and the reference quantity and that is determined by the CP node is greater than m, and the first difference between the reference quantity and the quantity of virtual MAC addresses on the target UP node is greater than m. It can be learned that the quantity of virtual MAC addresses on the first UP node is greater than the reference quantity, and the reference quantity is greater than the quantity of virtual MAC addresses on the target UP node. In this way, the at least one virtual MAC address on the first UP node is transferred to the target UP node, so that the quantities of virtual MAC addresses on the first UP node and the target UP node tend to be balanced, and the quantities of virtual MAC addresses on the plurality of UP nodes tend to be balanced. As time goes on, a user goes online and offline continuously, and load of each virtual MAC address tends to be balanced. In this case, if the quantity of virtual MAC addresses on the first UP node and the quantity of virtual MAC addresses on the target UP node tend to be balanced, load of the plurality of UP nodes tends to be balanced.

The at least one virtual MAC address selected by the CP node is at least one virtual MAC address, on the first UP node, whose load is low and that is capable of being accommodated by the remaining load of the target UP node. In this case, after the CP node transfers the at least one virtual MAC address to the target UP node, the target UP node is not overloaded, to prevent the target UP node from being faulty. In addition, transferring the at least one virtual MAC address to the target UP node does not cause excessively high load of the target UP node, so that load balancing efficiency of the plurality of UP nodes can be improved.

In the foregoing content, the CP node sequentially performs the third operation on each UP node other than the target UP node in the plurality of UP nodes based on that the target UP node is the newly added UP node in the plurality of UP nodes, and the first difference between the reference quantity and the quantity of virtual MAC addresses on the target UP node is greater than m, until the first difference is less than or equal to m. In this way, the CP node transfers the first virtual MAC address in the plurality of virtual MAC addresses from the first UP node in the plurality of UP nodes to the target UP node based on that the target UP node in the plurality of UP nodes satisfies the target condition.

Further, it is assumed that the first UP node is a non-faulty node, the second difference between the quantity of virtual MAC addresses on the first UP node and the reference quantity is greater than m, and the first UP node has the at least one virtual MAC address that is capable of being accommodated by the remaining load of the target UP node. The target condition includes: the first difference between the reference quantity and the quantity of virtual MAC addresses on the target UP node is greater than m. The CP node transfers the at least one virtual MAC address on the first UP node to the target UP node based on that the target UP node satisfies the target condition. The quantity of virtual MAC addresses in the at least one virtual MAC address on the first UP node is less than or equal to the first difference and the second difference, and the at least one virtual MAC address on the first UP node includes the first virtual MAC address. After the CP node transfers the first virtual MAC address in the plurality of virtual MAC addresses from the first UP node in the plurality of UP nodes to the target UP node based on that the target UP node in the plurality of UP nodes satisfies the target condition, the CP node may further transfer at least one virtual MAC address on a second UP node in the plurality of UP nodes to the target UP node based on that the target UP node satisfies an auxiliary condition. The auxiliary condition includes: a third difference between the reference quantity and the quantity of virtual MAC addresses on the target UP node is greater than n, a fourth difference between a quantity of virtual MAC addresses on the second UP node and the reference quantity is greater than or equal to n, and the at least one virtual MAC address on the second UP node is capable of being accommodated by the remaining load of the target UP node, where n>m, and a quantity of virtual MAC addresses in the at least one virtual MAC address on the second UP node is less than or equal to the third difference and the fourth difference.

For example, when the CP node transfers the at least one virtual MAC address on the second UP node in the plurality of UP nodes to the target UP node based on that the target UP node satisfies the auxiliary condition, the CP node may sequentially perform a fourth operation on each UP node other than the target UP node in the plurality of UP nodes based on that the target UP node is a newly added node in the plurality of UP nodes and the third difference is greater than n, until the third difference is less than or equal to n. The fourth operation includes: transferring the at least one virtual MAC address on the second UP node to the target UP node, to update the quantity of virtual MAC addresses on each UP node.

It can be learned from the foregoing content that, the fourth difference that is between the quantity of virtual MAC addresses on the second UP node and the reference quantity and that is determined by the CP node is greater than n, and the third difference between the reference quantity and the quantity of virtual MAC addresses on the target UP node is greater than n. It can be learned that the quantity of virtual MAC addresses on the second UP node is greater than the reference quantity, and the reference quantity is greater than the quantity of virtual MAC addresses on the target UP node. In this way, the at least one virtual MAC address on the second UP node is transferred to the target UP node, so that the quantities of virtual MAC addresses on the second UP node and the target UP node tend to be balanced, and the quantities of virtual MAC addresses on the plurality of UP nodes tend to be balanced. As time goes on, a user goes online and offline continuously, and load of each virtual MAC address tends to be balanced. In this case, if the quantity of virtual MAC addresses on the second UP node and the quantity of virtual MAC addresses on the target UP node tend to be balanced, load of the plurality of UP nodes tends to be balanced.

The at least one virtual MAC address selected by the CP node may be at least one virtual MAC address, on the second UP node, whose load is low and that is capable of being accommodated by the remaining load of the target UP node. In this case, after the CP node transfers the at least one virtual MAC address to the target UP node, the target UP node is not overloaded, to prevent the target UP node from being faulty. In addition, transferring the at least one virtual MAC address to the target UP node does not cause excessively high load of the target UP node, so that load balancing efficiency of the plurality of UP nodes can be improved.

In this example, the reference quantity may be considered as a baseline quantity of virtual MAC addresses on a UP node. When the first difference between the reference quantity and the quantity of virtual MAC addresses on the target UP node is greater than m, the CP node may determine that there is a difference between the quantity of virtual MAC addresses on the target UP node and a quantity of virtual MAC addresses on another UP node. In this case, the CP node may need to transfer the virtual MAC address to the target UP node, to facilitate balancing between the quantities of virtual MAC addresses on the UP nodes. In addition, the first difference between the reference quantity and the quantity of virtual MAC addresses on the target UP node may be further reduced. After the CP node transfers the virtual MAC address to the target UP node based on that the first difference is greater than m, if the third difference between the reference quantity and the quantity of virtual MAC addresses on the target UP node is greater than n (n>m), the CP node may determine that a difference between the quantity of virtual MAC addresses on the target UP node and a quantity of virtual MAC addresses on another UP node is large. In this case, the CP node may need to continue to transfer the virtual MAC address to the target UP node, to further facilitate balancing between the quantities of virtual MAC addresses on the UP nodes. In addition, the third difference between the reference quantity and the quantity of virtual MAC addresses on the target UP node may be further made less than or equal to n as much as possible, to avoid a case in which a difference between the quantity of virtual MAC addresses on the target UP node and a quantity of virtual MAC addresses on another UP node is large, so as to facilitate load balancing between the plurality of UP nodes.

In addition, if after the CP node transfers the virtual MAC address to the target UP node based on that the first difference is greater than m, the third difference between the reference quantity and the quantity of virtual MAC addresses on the target UP node is less than or equal to n, the CP node may determine that a difference between the quantity of virtual MAC addresses on the target UP node and a quantity of virtual MAC addresses on another UP node is not large, and the quantities of virtual MAC addresses on the UP nodes are balanced. Therefore, the CP node does not need to continue to transfer the virtual MAC address to the target UP node.

It may be understood that, after the CP node transfers the first virtual MAC address in the plurality of virtual MAC addresses from the first UP node in the plurality of UP nodes to the target UP node based on that the target UP node in the plurality of UP nodes satisfies the target condition, the CP node may alternatively transfer the at least one virtual MAC address on the second UP node in the plurality of UP nodes to the target UP node without considering that the target UP node satisfies the auxiliary condition.

According to a second aspect, this application further provides a communication method. The method includes: A CP node in a vBNG system sends, to a first UP node in a plurality of UP nodes at a first moment based on quality of a link between each of the plurality of UP nodes that have a plurality of virtual MAC addresses for user access in the vBNG system and the CP node, a first priority of responding to a request of a user by the first UP node; the CP node sends, at a second moment to a second UP node that is in the plurality of UP nodes and that is different from the first UP node and based on quality of the link between each of the plurality of UP nodes and the CP node, a second priority of responding to the request of the user by the second UP node.

The CP node may perform a plurality of priority allocation operations, where an operation performed at the first moment is one priority allocation operation, and an operation performed at the second moment is another priority allocation operation. In this application, when the CP node performs each priority allocation operation, the CP node may send, to the UP node (for example, the first UP node or the second UP node) based on the quality of the link between each of the plurality of UP nodes and the CP node, the priority of responding to the request of the user by the UP node. A UP node with a higher priority in the plurality of UP nodes preferentially responds to the access request of the user. It can be learned that in this application, the priority of responding to the request of the user by the UP node is related to the quality of the link between the UP node and the CP node. In this way, the CP node may determine, with reference to the quality of the link between each UP node and the CP node, the priority of responding to the request of the user by the UP node, so that the priority of responding to the request of the user by the UP node is more reasonable.

Optionally, quality of a link between at least one of the plurality of UP nodes and the CP node changes at the second moment relative to the first moment. It can be learned that when the CP node performs different priority allocation operations, if the quality of the link between at least one of the plurality of UP nodes and the CP node changes, at least one UP node that receives a priority of responding to the request of the user in the different priority allocation operations changes (for example, changes from the first UP node to the second UP node).

Optionally, in each priority allocation operation performed by the CP node, for a UP node that receives a priority of responding to the request of the user, quality of a link between the UP node and the CP node is higher than or equal to a quality threshold. Alternatively, in some priority allocation operations performed by the CP node, for a UP node that receives a priority of responding to the request of the user, quality of a link between the UP node and the CP node is higher than or equal to a quality threshold. However, in some other priority allocation operations performed by the CP node, for a UP node that receives a priority of responding to the request of the user, quality of a link between the UP node and the CP node may alternatively be lower than the quality threshold. For example, the quality of the link between the first UP node and the CP node is higher than or equal to first quality, and the quality of the link between the second UP node and the CP node is higher than or equal to second quality. The first quality is a quality threshold at the first moment, and the second quality is a quality threshold at the second moment. For another example, the quality of the link between the first UP node and the CP node at the first moment is higher than or equal to the first quality, or the quality of the link between the second UP node and the CP node at the second moment is higher than or equal to the second quality.

In a priority allocation operation performed by the CP node, if quality of a link between the CP node and a UP node that receives a priority of responding to the request of the user is higher than or equal to the quality threshold, the priority of responding to the request of the user can be prevented from being sent to a UP node whose quality of a link between the UP node and the CP node is lower than the quality threshold, and the UP node is prevented from responding to the request of the user, to ensure reliability of user communication. Certainly, in this application, alternatively, in each priority allocation operation, each UP node may receive a priority that is of responding to the request of the user and that is sent by the CP node. This is not limited in this application.

Further, for different priority allocation operations, quality thresholds may be the same or may be different. For example, a quality threshold (the first quality) at the first moment may be the same as or different from a quality threshold (the second quality) at the first moment.

Optionally, when the CP node performs different priority allocation operations, the first priority that is of responding to the request of the user and that is received by the first UP node may be the same as or different from the second priority that is of responding to the request of the user and that is received by the second UP node. For example, the first priority is higher than the second priority; or the second priority is higher than the first priority.

Optionally, a priority of responding to a request of a user by a UP node may be positively correlated with quality of a link between the UP node and the CP node. For example, the CP node sends priorities of responding to the request of the user to at least two UP nodes. In addition, for the at least two UP nodes, a UP node with higher quality of a link between the UP node and the CP node has a higher priority of responding to the request of the user, and a UP node with lower quality of a link between the UP node and the CP node has a lower priority of responding to the request of the user. For another example, in different priority allocation operation processes, for two UP nodes that receive priorities of responding to the request of the user, a UP node with higher quality of a link between the UP node and the CP node has a higher priority of responding to the request of the user, and a UP node with lower quality of a link between the UP node and the CP node has a lower priority of responding to the request of the user. For example, when the second priority is higher than the first priority, the quality of the link between the second UP node and the CP node is higher than the quality of the link between the first UP node and the CP node.

When the priority of responding to the request of the user by the UP node is positively correlated with the quality of the link between the UP node and the CP node, the CP node may set a priority of responding to the request of the user by a UP node with highest quality of a link between the UP node and the CP node to be the highest, so that the user can access the UP node, to ensure high efficiency of responding to the request of the user by the UP node and improve user experience.

According to a third aspect, a broadband network access method is provided, applied to a CU-separated broadband network access (BNG) system, where the CU-separated BNG system is a BNG system including a CP node (CP) and a UP node (UP). A CU-separated BNG system may also be referred to as a vBNG system. The BNG system includes a first UP and a second UP. The method includes: The first UP enables a first user to access a network; the second UP enables a second user to access the network; and the second UP enables the first user to access the network when the first UP is faulty. It can be learned that, both the first UP and the second UP can enable the user to access the network; and when the first UP is faulty, the first user that originally accesses the network by using the first UP may access the network by using the second UP. In addition, before the first UP is faulty, the second UP may further enable the second user to access the network, that is, an N+1 warm backup technology is implemented between the first UP and the second UP, to avoid resource idleness of the second UP.

According to a fourth aspect, a broadband network access method is provided. The method is applied to a CU-separated BNG system. The BNG system includes a first UP, a second UP, and a third UP. The method includes: The first UP enables a first user and a second user to access a network; the second UP enables a third user to access the network; the third UP enables a fourth user to access the network; and when the first UP is faulty, the second UP enables the first user to access the network, and the third UP enables the second user to access the network. It can be learned that, the first UP, the second UP, and the third UP all can enable the user to access the network; and when the first UP is faulty, the first user and the second user that originally access the network by using the first UP may access the network by using the second UP and the third UP. The first user accesses the network by using the third UP, and the second user accesses the network by using the fourth UP. In this way, load balancing can be implemented between the second UP and the third UP, to avoid overload of the second UP or the third UP and prevent the second UP or the third UP from being faulty when both the first user and the second user access the second UP or the third UP. In addition, before the first UP is faulty, the second UP may further enable the third user to access the network, and the third UP may further enable the fourth user to access the network, that is, an N+1 warm backup technology is implemented between the first UP, the second UP, and the third UP, to avoid resource idleness of the second UP and the third UP.

According to a fifth aspect, a communication apparatus is provided. The communication apparatus belongs to a CP node in a vBNG system. The vBNG system further includes a plurality of user plane UP nodes, and the plurality of UP nodes have a plurality of virtual MAC addresses for user access. The communication apparatus includes: a first transfer module, configured to transfer a first virtual MAC address in the plurality of virtual MAC addresses from a first UP node in the plurality of UP nodes to a target UP node based on that the target UP node in the plurality of UP nodes satisfies a target condition, where the target condition is related to load of the target UP node.

It should be noted that the load of the target UP node may be related to at least one parameter of the target UP node, and the load of the target UP node may be measured by using the at least one parameter. For example, the at least one parameter includes a quantity of users, user bandwidth, and the like carried on the target UP node. For example, the load of the target UP node is positively correlated with the quantity of users carried on the target UP node. The target UP node has one or more virtual MAC addresses for user access, the virtual MAC address may be used for carrying a user, and the quantity of users carried on the target UP node may be a sum of quantities of users carried on all the virtual MAC addresses on the target UP node.

Further, in this embodiment of this application, the CP node transfers the first virtual MAC address from the first UP node to the target UP node based on that the target UP node satisfies the target condition. Herein, the first UP node, the first virtual MAC address, and the target UP node may all have a plurality of implementations.

(1) For the first virtual MAC address, the first virtual MAC address may be any virtual MAC address on the first UP node.

Optionally, the first virtual MAC address may be a virtual MAC address randomly selected by the first transfer module on the first UP node.

Alternatively, before the first transfer module transfers the first virtual MAC address to the target UP node, the first virtual MAC address may be a virtual MAC address, on the first UP node, whose load is the highest and that is capable of being accommodated by remaining load of the target UP node.

Alternatively, before the first transfer module transfers the first virtual MAC address to the target UP node, the first virtual MAC address may be a virtual MAC address, on the first UP node, whose load is the lowest and that is capable of being accommodated by remaining load of the target UP node.

Alternatively, before the first transfer module transfers the first virtual MAC address to the target UP node, the first virtual MAC address may be a virtual MAC address for user access, on the first UP node, whose load is the lowest and that is capable of being accommodated by remaining load of the target UP node.

It should be noted that the load of the virtual MAC address may be related to at least one parameter of the virtual MAC address, and the at least one parameter may be used for measuring the load of the virtual MAC address. For example, the at least one parameter includes a quantity of users, user bandwidth, and the like carried on the virtual MAC address. For example, the load of the virtual MAC address is positively correlated with the quantity of users carried on the virtual MAC address.

(2) For the target UP node, the target UP node satisfies the target condition, and the target condition may be any load-related condition.

(2.1) For example, the target condition includes: the remaining load of the target UP node is capable of accommodating the first virtual MAC address.

(2.2) For another example, the target condition includes: the target UP node is a UP node, in UP nodes other than the first UP node in the plurality of UP nodes, whose remaining load is capable of accommodating the first virtual MAC address and whose load is the lowest.

(2.3) For still another example, the target condition includes: the load of the target UP node is less than the load of the first UP node.

(2.4) For still another example, the target condition includes: a quantity of virtual MAC addresses on the target UP node is less than a quantity of virtual MAC addresses on the first UP node.

(2.5) For still another example, the target condition includes: a first difference between a reference quantity and the quantity of virtual MAC addresses on the target UP node is greater than m, where m≥0, the reference quantity $S=((Z-1)/N)+1$, Z represents a quantity of virtual MAC addresses in the plurality of virtual MAC addresses, and N represents a quantity of UP nodes in the plurality of UP nodes.

(2.6) For another example, the target condition includes: the target UP node is a newly added UP node in the plurality of UP nodes.

In this application, the foregoing (2.1) to (2.6) provide a total of six conditions in the target condition. It may be understood that the target condition may include at least one of the six conditions. This is not limited in this application. When the target condition includes at least two of the six conditions, the target UP node may need to satisfy the at least two conditions, and the first transfer module may need to search, based on the at least two conditions, for the target UP node that satisfies the at least two conditions.

(3) For the first UP node, the first UP node may be any UP node in the plurality of UP nodes.

Optionally, the first UP node may be a faulty node or a non-faulty node in the plurality of UP nodes.

In one aspect, when the first UP node is a faulty node, and when transferring the first virtual MAC address from the first UP node to the target UP node based on that the target UP node satisfies the target condition, the first transfer module may transfer the first virtual MAC address from the first UP node to the target UP node based on that the target UP node satisfies the target condition and the first UP node is faulty.

In another aspect, when the first UP node is a non-faulty node, the first transfer module transfers the first virtual MAC address from the first UP node to the target UP node, so that a user carried on the first virtual MAC address can be transferred from the first UP node to the target UP node, and the user can be unaware of the transfer.

Optionally, when the first UP node is a non-faulty node, the first UP node is a UP node, in the plurality of UP nodes, whose load is the highest and that has a virtual MAC address that is capable of being accommodated by the remaining load of the target UP node.

It may be understood that, when the first UP node is a non-faulty node, the first UP node may alternatively be implemented in another manner.

For example, when the first UP node is a non-faulty node, the first UP node may alternatively be a UP node randomly selected by the first transfer module from the plurality of UP nodes.

For another example, when the first UP node is a non-faulty node, the first UP node may alternatively be a UP node whose second difference between the quantity of virtual MAC addresses and the reference quantity is greater than m, where m≥0, the reference quantity $S=((Z-1)/N)+1$, Z indicates the quantity of virtual MAC addresses in the plurality of virtual MAC addresses, and N indicates the quantity of UP nodes in the plurality of UP nodes.

In this application, an example in which when the second difference between the quantity of virtual MAC addresses on the first UP node and the reference quantity is greater than m, and the first UP node has at least one virtual MAC address that is capable of being accommodated by the remaining load of the target UP node, the target condition includes that the first difference between the reference quantity and the quantity of virtual MAC addresses on the target UP node is greater than m is used. In this case, when transferring the first virtual MAC address from the first UP node in the plurality of UP nodes to the target UP node, the first transfer module may transfer at least one virtual MAC address on the first UP node from the first UP node to the target UP node. A quantity of virtual MAC addresses in the at least one virtual MAC address on the first UP node is less than or equal to the first difference and the second difference, and the at least one virtual MAC address includes the first virtual MAC address. When the at least one virtual MAC address includes a plurality of virtual MAC addresses, the first transfer module may transfer the plurality of virtual MAC addresses from the first UP node to the target UP node once, and efficiency of balancing the quantity of virtual MAC addresses on the first UP node and the quantity of virtual MAC addresses on the target UP node can be improved.

The foregoing describes the plurality of implementations of the first UP node, the plurality of implementations of the first virtual MAC address, and the plurality of implementations of the target UP node (related to the plurality of implementations of the target condition) in this application. It may be understood that any implementation of the first UP node, any implementation of the first virtual MAC address, and any implementation of the target UP node in this application may be mutually combined, and all obtained communication apparatuses fall within the protection scope of this application.

The following uses three examples to describe the communication apparatus protected in this application.

Example 1: If the first transfer module transfers the first virtual MAC address from the first UP node to the target UP node based on that the target UP node satisfies the target condition and the first UP node is faulty, based on that the first UP node is faulty, when a virtual MAC address for user access exists on the first UP node, the first transfer module may perform a first operation at least once until no virtual MAC address for user access exists on the first UP node, or until no UP node whose remaining load is capable of accommodating the first virtual MAC address exists in the UP nodes other than the first UP node in the plurality of UP nodes, where the first operation includes: sifting out the first virtual MAC address whose load is the highest from virtual MAC addresses for user access on the first UP node; sequentially determining, in ascending order of load of the UP nodes, whether remaining load of each UP node other than the first UP node in the plurality of UP nodes is capable of accommodating the first virtual MAC address until the target UP node is determined; and transferring the first virtual MAC address to the target UP node.

In the example 1, the first UP node may be a faulty node, and the first virtual MAC address may be a virtual MAC address for user access, on the first UP node, whose load is the highest and that is capable of being accommodated by remaining load of the target UP node. The target condition may include: the target UP node is a UP node, in UP nodes other than the first UP node in the plurality of UP nodes, whose remaining load is capable of accommodating the first virtual MAC address and whose load is the lowest.

Example 2: If the first transfer module transfers the first virtual MAC address in the plurality of virtual MAC addresses from the first UP node in the plurality of UP nodes to the target UP node based on that the target UP node in the plurality of UP nodes satisfies the target condition, when the target UP node is not a UP node whose load is the highest in the plurality of UP nodes, the first transfer module may perform a second operation at least once until the target UP node is the UP node whose load is the highest in the plurality of UP nodes, or until no virtual MAC address that is capable of being accommodated by the remaining load of the target UP node exists on the UP node whose load is the highest in the plurality of UP nodes. The second operation includes: sifting out the first UP node whose load is the highest from the plurality of UP nodes; and transferring at least one virtual MAC address on the first UP node to the target UP node, to update load of the plurality of UP nodes, where the at least one virtual MAC address includes the first virtual MAC address.

In the example 2, the first UP node may be a UP node, in UP nodes other than the target UP node in the plurality of UP nodes, that has a virtual MAC address that is capable of being accommodated by the remaining load of the target UP node and whose load is the highest. The first virtual MAC address may be a virtual MAC address, on the first UP node, that is capable of being accommodated by the remaining load of the target UP node and whose load is the highest. The target condition may include: the target UP node is a newly added UP node.

Example 3: If the first transfer module transfers the at least one virtual MAC address on the first UP node from the first UP node to the target UP node based on that the target UP node in the plurality of UP nodes satisfies the target condition, when the first difference is greater than m, the first transfer module sequentially performs a third operation on each UP node other than the target UP node in the plurality of UP nodes until the first difference is less than or equal to m. The third operation includes: transferring the at least one virtual MAC address on the first UP node to the target UP node, to update a quantity of virtual MAC addresses on each UP node.

In the example 3, the second difference between the quantity of virtual MAC addresses on the first UP node and the reference quantity may be greater than m, and the first UP node has the at least one virtual MAC address that is capable of being accommodated by the remaining load of the target UP node. The first virtual MAC address may be a virtual MAC address, on the first UP node, whose load is the lowest and that is capable of being accommodated by the remaining load of the target UP node. The target condition may include: the target UP node is a newly added UP node, and the first difference between the reference quantity and the quantity of virtual MAC addresses on the target UP node is greater than m.

Further, it is assumed that the first UP node is a non-faulty node, the second difference between the quantity of virtual MAC addresses on the first UP node and the reference quantity is greater than m. The target condition includes: the first difference between the reference quantity and the quantity of virtual MAC addresses on the target UP node is greater than m and the remaining load of the target UP node is capable of accommodating the at least one virtual MAC address on the first UP node. The first transfer module transfers the at least one virtual MAC address on the first UP node to the target UP node based on that the target UP node satisfies the target condition. The quantity of virtual MAC addresses in the at least one virtual MAC address on the first UP node is less than or equal to the first difference and the second difference, and the at least one virtual MAC address on the first UP node includes the first virtual MAC address. In this case, the communication apparatus further includes a second transfer module.

The second transfer module is configured to: after the first transfer module transfers the first virtual MAC address in the plurality of virtual MAC addresses from the first UP node in the plurality of UP nodes to the target UP node based on that the target UP node in the plurality of UP nodes satisfies the target condition, transfer at least one virtual MAC address on a second UP node in the plurality of UP nodes to the target UP node based on that the target UP node satisfies an auxiliary condition. The auxiliary condition includes: a third difference between the reference quantity and the quantity of virtual MAC addresses on the target UP node is greater than n, a fourth difference between a quantity of virtual MAC addresses on the second UP node and the reference quantity is greater than or equal to n, and the at least one virtual MAC address on the second UP node is capable of being accommodated by the remaining load of the target UP node, where n>m, and a quantity of virtual MAC addresses in the at least one virtual MAC address on the second UP node is less than or equal to the third difference and the fourth difference.

For example, the second transfer module is configured to: sequentially perform a fourth operation on each UP node other than the target UP node in the plurality of UP nodes based on that the target UP node is a newly added node in the plurality of UP nodes and the third difference is greater than n, until the third difference is less than or equal to n. The fourth operation includes: transferring the at least one virtual MAC address on the second UP node to the target UP node, to update the quantity of virtual MAC addresses on each UP node.

According to a sixth aspect, a communication apparatus is provided. The communication apparatus belongs to a CP node in a vBNG system. The vBNG system further includes a plurality of user plane UP nodes, and the plurality of UP nodes have a plurality of virtual MAC addresses for user access. The communication apparatus includes a first sending module and a second sending module. The first sending module is configured to send, to a first UP node in the plurality of UP nodes at a first moment based on quality of a link between each of the plurality of UP nodes and the CP node, a first priority of responding to a request of a user by the first UP node. The second sending module is configured to send, to a second UP node in the plurality of UP nodes at a second moment based on the quality of the link between each of the plurality of UP nodes and the CP node, a second priority of responding to the request of the user by the second UP node, where the second UP node is different from the first UP node.

The CP node may perform a plurality of priority allocation operations, where an operation performed at the first moment is one priority allocation operation, and an operation performed at the second moment is another priority allocation operation. In this application, when performing each priority operation, the CP node may send, to the UP node (for example, the first UP node or the second UP node) based on the quality of the link between each of the plurality of UP nodes and the CP node, the priority of responding to the request of the user by the UP node. It can be learned that in this application, the priority of responding to the request of the user by the UP node is related to the quality of the link between the UP node and the CP node. In this way, the CP node may determine, with reference to the quality of the link between each UP node and the CP node, the priority of responding to the request of the user by the UP node, so that the priority of responding to the request of the user by the UP node is more reasonable.

Optionally, quality of a link between at least one of the plurality of UP nodes and the CP node changes at the second moment relative to the first moment.

Optionally, the quality of the link between the first UP node and the CP node at the first moment is higher than or equal to the first quality, or the quality of the link between the second UP node and the CP node at the second moment is higher than or equal to the second quality.

Optionally, the first priority is higher than the second priority; or the second priority is higher than the first priority.

Optionally, when the second priority is higher than the first priority, the quality of the link between the second UP node and the CP node is higher than the quality of the link between the first UP node and the CP node.

According to a seventh aspect, a broadband network access apparatus is provided. The apparatus belongs to a UP in a CU-separated BNG system. The broadband network access apparatus includes modules configured to perform the method performed by any UP according to the third aspect or the fourth aspect.

According to an eighth aspect, a communication device is provided. The communication device includes a processor and a memory, the memory stores a program, and the processor is configured to invoke the program stored in the memory, so that the communication device performs the communication method according to any design of the first aspect or the second aspect, or the communication device performs the method performed by any UP according to the third aspect or the fourth aspect.

According to a ninth aspect, a communication system is provided. The communication system is a vBNG system, the vBNG system includes a CP node and a plurality of UP nodes, and the plurality of UP nodes have a plurality of virtual MAC addresses for user access; and the CP node is configured to perform any method provided in the first aspect or the second aspect; and/or the UP node is configured to perform the method performed by the UP node in any method according to the third aspect or the fourth aspect.

According to a tenth aspect, a computer storage medium is provided. The storage medium stores a computer program. When the computer program runs on a computer, the computer is enabled to perform the communication method according to the first aspect or the second aspect, or the computer is enabled to perform the method performed by any UP according to the third aspect or the fourth aspect.

According to an eleventh aspect, a computer program product is provided. When the computer program product runs on a communication device, the communication device is enabled to perform the communication method according to the first aspect or the second aspect, or the communication device is enabled to perform the method performed by any UP according to the third aspect or the fourth aspect.

According to a twelfth aspect, a chip is provided. The chip includes a programmable logic circuit and/or program instructions. When the chip runs, the chip is configured to implement the communication method according to the first aspect or the second aspect, or the method performed by any UP according to the third aspect or the fourth aspect.

For beneficial effects of the fifth aspect to the twelfth aspect, refer to corresponding descriptions of the first aspect to the fourth aspect. Details are not described herein again in this application.

BRIEF DESCRIPTION OF DRAWINGS

FIG. 5 is a flowchart of a first operation in a communication method according to an embodiment of this application;

FIG. 7 is a flowchart of a second operation in a communication method according to an embodiment of this application;

FIG. 9 is a flowchart of a third operation in a communication method according to an embodiment of this application;

FIG. 10 is a flowchart of a fourth operation in a communication method according to an embodiment of this application;

FIG. 12 is a flowchart of a communication method according to an embodiment of this application;

FIG. 13 is a block diagram of a communication apparatus according to an embodiment of this application; and FIG. 14 is a block diagram of another communication apparatus according to an embodiment of this application.

DESCRIPTION OF EMBODIMENTS

To make principles and technical solutions of this application clearer, the following further describes implementations of this application in detail with reference to the accompanying drawings.

An embodiment of this application provides a communication system. The communication system includes a plurality of nodes. The node may be a communication device; or may be a part (for example, an interface board (slot) or a port on the interface board) of a communication device.

Figure 1:
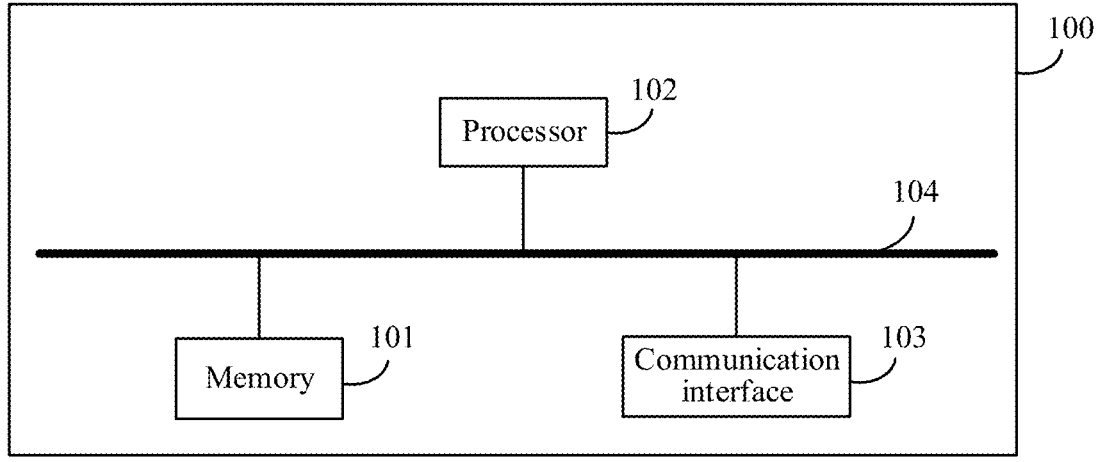
FIG. 1 is a schematic diagram of a structure of a communication device according to an embodiment of this application.

The communication device may be a server, a server cluster, a gateway, a router, or the like. For example, the communication device may include a processor. The processor is configured to: after being coupled to a memory and reading instructions in the memory, perform, according to the instructions, the method performed by the communication device according to embodiments of this application. In the communication device, there may be a plurality of processors, and the memory coupled to the processor may be independent of the processor or the communication device, or may be inside the processor or a network device. The memory may be a physically independent unit, or may be storage space, a web disk, or the like on a cloud server. Optionally, there may be one or more memories. When there is a plurality of memories, the plurality of memories may be located at a same location or different locations, and may be used independently or in cooperation. For example, when the memory is inside the communication device, refer to FIG. 1. FIG. 1 is a schematic diagram of a structure of a communication device according to an embodiment of this application. The communication device 100 includes a processor 102 and a memory 101. The memory 101 is configured to store a program, and the processor 102 is configured to invoke the program stored in the memory 101, so that the communication device performs a corresponding method or function. Optionally, as shown in FIG. 1, the communication device 100 may further include at least one communication interface 103 and at least one communication bus 104. The memory 101, the processor 102, and the communication interface 103 are in communication connection through the communication bus 104. The communication interface 103 is configured to communicate with another device under control of the processor 102, and the processor 102 may invoke, through the communication bus 104, the program stored in the memory 101.

When the node is a part of a communication device, for a structure of the node, refer to the structure of the communication device. Details are not described herein in embodiments of this application.

Figure 2:
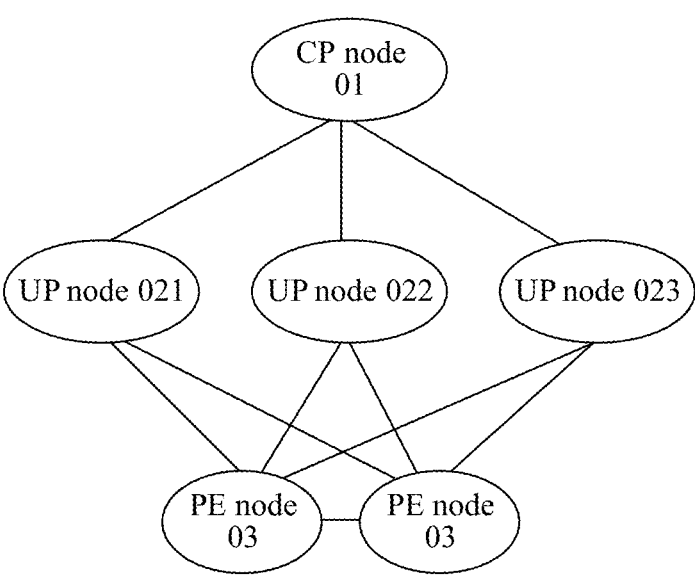
FIG. 2 is a schematic diagram of a vBNG system according to an embodiment of this application.

The communication system provided in this embodiment of this application may be a vBNG system. As shown in FIG. 2, a plurality of nodes in the vBNG system usually include a CP node 01 and at least two UP nodes. In FIG. 2, that the at least two UP nodes include a UP node 021, a UP node 022, and a UP node 023 is used as an example. A quantity of UP nodes in the at least two UP nodes may be 2, 3, 4, 5, or the like. This is not limited in embodiments of this application. The at least two UP nodes may be all UP nodes or some UP nodes in the communication system. This is not limited in embodiments of this application. The vBNG system may be any communication system including a CP node and at least two UP nodes, for example, a BRAS system configured to provide a broadband access service (such as authentication, authorization, accounting, and quality of service (QoS)) for a user.

The CP node 01 is in communication connection with each UP node, and the UP node is in communication connection with a user (to be specific, the UP node is in communication connection with a device used by the user). For example, the UP node may be in direct communication connection with the user, or the UP node may be in indirect communication connection with the user through another node (for example, a network side edge (Provider Edge, PE) node or a gateway node). In FIG. 2, an example in which each UP node is in communication connection with the user through a PE node 03 is used. The CP node is responsible for processing a core service of the vBNG system. The CP node is usually deployed in a private cloud or a public cloud of a carrier. The UP node is configured to bear high-speed forwarding of user data (carried in a user packet) and a related QoS service. The UP node usually runs on a dedicated physical device purchased by a supplier.

Further, to ensure high availability of the communication system, the vBNG system usually uses an N:1 warm backup technology (N>1). In this case, the at least two UP nodes in the vBNG system are divided into N active UP nodes and one backup UP node. When an active UP node is faulty, user traffic carried on the active UP node can be seamlessly migrated to the backup UP node. Users are unaware of this process.

For example, the active UP node has a virtual MAC address for user access, and the backup UP node has no virtual MAC address for user access. That a UP node has a virtual MAC address for user access means that when communicating with a device used by a user, the UP node may use the virtual MAC address as a MAC address of the UP node for communication. It should be noted that the virtual MAC address does not belong to a fixed UP node, and may be migrated between different UP nodes as required, to implement migration of user traffic between the different UP nodes. When the active UP node works normally, the active UP node can use the virtual MAC address to access a user and communicate with the user (that is, communicate with a device used by the user). In this case, the backup UP node cannot communicate with the user. The CP node is further configured to manage the UP node and the virtual MAC address on the UP node. When the active UP node is faulty, the CP node transfers the virtual MAC address for user access on the active UP node to the backup UP node, so that the backup UP node uses the virtual MAC address to communicate with the user, to ensure that user communication is not interrupted.

For example, it is assumed that in FIG. 2, both the UP node 021 and the UP node 022 are active UP nodes, and the UP node 023 is a backup UP node. The UP node 021 has a virtual MAC address 1 for user access, the UP node 022 has a virtual MAC address 2 for user access, and the UP node 023 has no virtual MAC address. When neither the UP node 021 nor the UP node 022 is faulty, the UP node 021 accesses a user by using the virtual MAC address 1, and the UP node 022 accesses a user by using the virtual MAC address 2. When the UP node 021 is faulty, the CP node 01 may transfer the virtual MAC address 1 from the UP node 021 to the UP node 023, so that the UP node 023 accesses a user by using the virtual MAC address 1. When the UP node 022 is faulty, the CP node 01 may transfer the virtual MAC address 2 from the UP node 022 to the UP node 023, so that the UP node 023 further accesses a user by using the virtual MAC address 2.

However, when a plurality of active UP nodes in the N active UP nodes are faulty, virtual MAC addresses on the plurality of active UP nodes are all transferred to the backup UP node. For example, when both the UP node 021 and the UP node 022 in FIG. 2 are faulty, both the virtual MAC address 1 of the UP node 021 and the virtual MAC address 2 of the UP node 022 are transferred to the UP node 023. In this case, the backup UP node is easily overloaded, causing user traffic packet loss or user connection interruption. In addition, when the N active UP nodes work normally, the backup UP node cannot communicate with the user. For example, when neither the UP node 021 nor the UP node 022 in FIG. 2 is faulty, the UP node 023 cannot access the user. Therefore, a resource of the backup UP node is idle, causing low communication efficiency of the communication system.

Embodiments of this application provide a communication method. The method may be applied to a vBNG system provided in embodiments of this application. In the method, a CP node may determine, based on a condition related to load of a UP node, a target UP node to which a virtual MAC address is to be transferred, and then transfer the virtual MAC address to the target UP node. In some cases, overloading of the UP node can be avoided. In addition, in the communication method, no backup UP node may be disposed, so that a problem of resource idleness of the backup UP node can be avoided.

Before the communication method provided in embodiments of this application is described, a change of the vBNG system to which the communication method is applied in comparison with the vBNG system shown in FIG. 2 is first briefly described. For example, the vBNG system to which the communication method is applicable includes a CP node and at least two UP nodes. In embodiments of this application, an example in which each of the at least two UP nodes have a virtual MAC address for user access, and each UP node may use the virtual MAC address of the UP node to access a user is used. Optionally, it may alternatively be that a part of the at least two UP nodes have a virtual MAC address for user access, and the other part of the at least two UP nodes have no a virtual MAC address for user access.

For example, in the vBNG system shown in FIG. 2, the UP node 021 has the virtual MAC address 1 for user access, the UP node 022 has the virtual MAC address 2 for user access, the UP node 023 has the virtual MAC address 3 for user access, and all the three UP nodes may use their respective virtual MAC addresses to access users.

Figure 3:
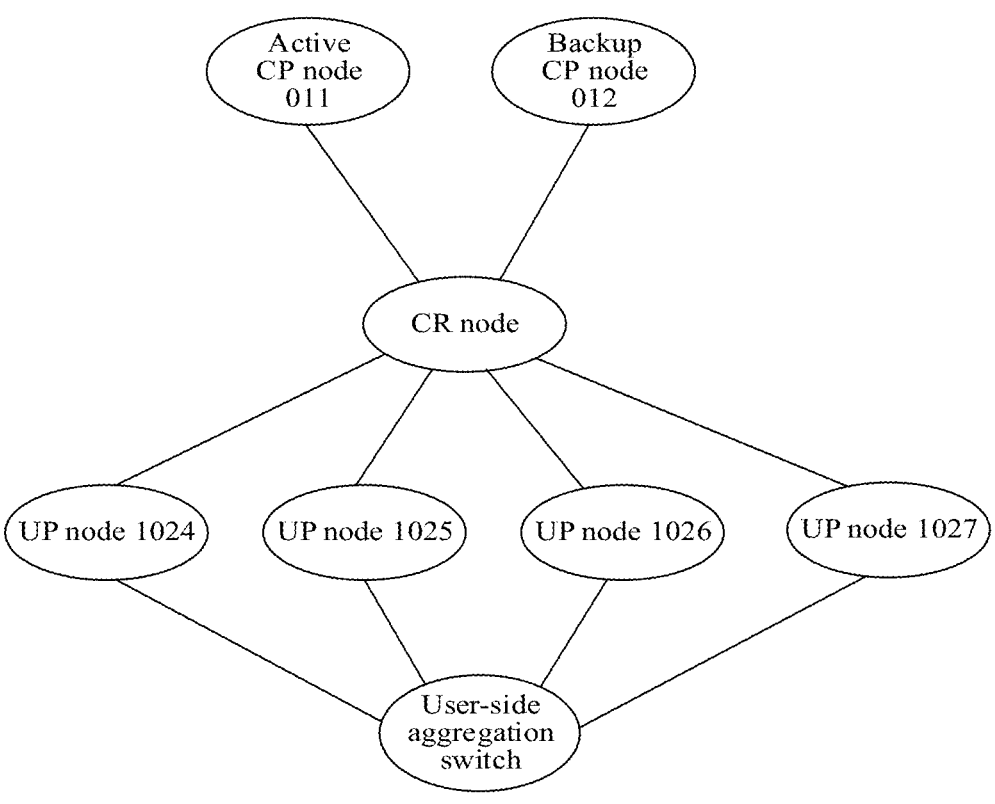
FIG. 3 is a schematic diagram of another vBNG system according to an embodiment of this application.

For another example, as shown in FIG. 3, a vBNG system includes a UP node 1024, a UP node 1025, a UP node 1026, and a UP node 1027. The UP node 1024 has virtual MAC addresses 1, 2, and 3 for user access, the UP node 1025 has virtual MAC addresses 4, 5, and 6 for user access, the UP node 1026 has virtual MAC addresses 7, 8, and 9 for user access, and the UP node 1027 has virtual MAC addresses 10, 11, and 12 for user access. Each UP node accesses a user through a user-side aggregation switch. Optionally, each UP node may access a CP node through a core router (CR), or may directly access the CP node.

Optionally, the CP node may further use a backup technology. In this case, the vBNG system includes an active CP node and a backup CP node (for example, an active CP node 011 and a backup CP node 012 in FIG. 3). When the active CP node is not faulty, the active CP node implements a function of the CP node. When the active CP node is faulty, the backup CP node implements the function of the CP node.

Further, the vBNG system to which the communication method is applied may include one group of UP nodes or a plurality of groups of UP nodes, and each group of UP nodes includes a plurality of UP nodes that have a plurality of virtual MAC addresses for user access. In embodiments of this application, that the plurality of UP nodes in each group of UP nodes have the virtual MAC addresses for user access is used as an example. Optionally, it may alternatively be that a part of UP nodes in each group of UP nodes have a virtual MAC address for user access, and the other part of UP nodes in the group of UP nodes have no virtual MAC address for user access. For example, in the plurality of UP nodes, N UP nodes (which may be referred to as active UP nodes) each have a virtual MAC address for user access, and one UP node (which may be referred to as a backup UP node) has no virtual MAC address for user access.

Figure 4:
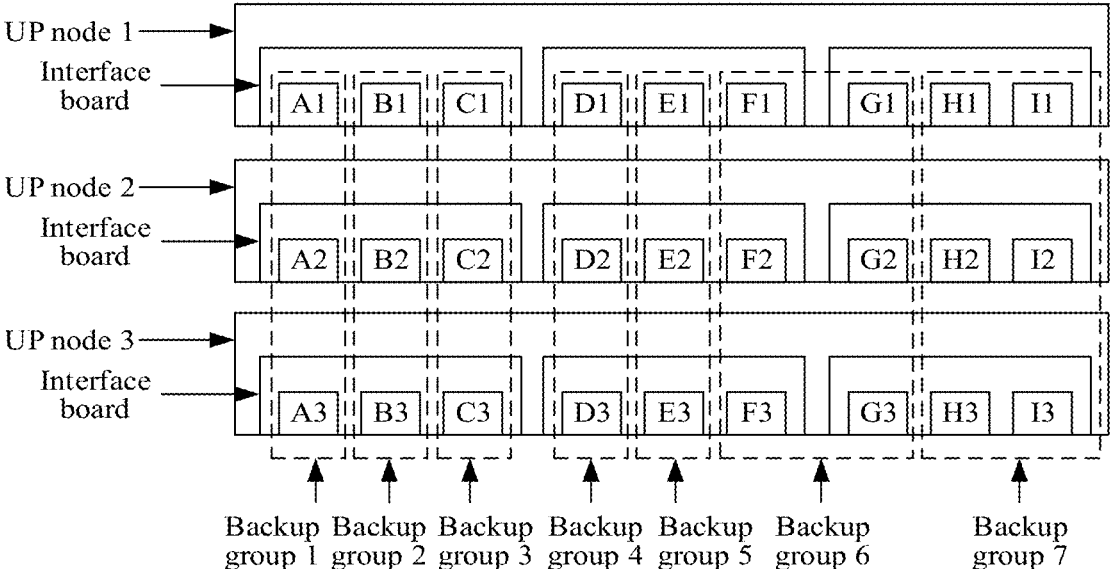
FIG. 4 is a schematic diagram of another vBNG system according to an embodiment of this application.

For example, as shown in FIG. 4, a vBNG system includes UP nodes 1, 2, and 3 that are in communication connection with a CP node, each UP node includes three interface boards, and each interface board includes three ports. For example, the UP node 1 includes ports A1, B1, C1, D1, E1, F1, G1, H1, and I1 in total. The UP node 2 includes ports A2, B2, C2, D2, E2, F2, G2, H2, and I2 in total. The UP node 3 includes ports A3, B3, C3, D3, E3, F3, G3, H3, and I3 in total. Each port of each UP node has at least one virtual MAC address.

Each of the UP nodes 1, 2, and 3 is added to at least one backup group. In FIG. 4, that the UP nodes 1, 2, and 3 are all added to backup groups 1 to 7 is used as an example. For each of the at least one backup group, a UP node that is added to the backup group has a virtual MAC address corresponding to the backup group.

For example, for the UP nodes 1, 2, and 3 that are added to the backup group 1, the virtual MAC addresses on the port A1 of the UP node 1, the port A2 of the UP node 2, and the port A3 of the UP node 3 all correspond to the backup group 1; for the UP nodes 1, 2, and 3 that are added to the backup group 2, the virtual MAC addresses on the port B1 of the UP node 1, the port B2 of the UP node 2, and the port B3 of the UP node 3 all correspond to the backup group 2; for the UP nodes 1, 2, and 3 that are added to the backup group 3, the virtual MAC addresses on the port C1 of the UP node 1, the port C2 of the UP node 2, and the port C3 of the UP node 3 all correspond to the backup group 3; for the UP nodes 1, 2, and 3 that are added to the backup group 4, the virtual MAC addresses on the port D1 of the UP node 1, the port D2 of the UP node 2, and the port D3 of the UP node 3 all correspond to the backup group 4; for the UP nodes 1, 2, and 3 that are added to the backup group 5, the virtual MAC addresses on the port E1 of the UP node 1, the port E2 of the UP node 2, and the port E3 of the UP node 3 all correspond to the backup group 5; for the UP nodes 1, 2, and 3 that are added to the backup group 6, the virtual MAC addresses on the ports F1 and G1 of the UP node 1, the ports F2 and G2 of the UP node 2, and the ports F3 and G3 of the UP node 3 all correspond to the backup group 6; and for the UP nodes 1, 2, and 3 that are added to the backup group 7, the virtual MAC addresses on the ports H1 and I1 of the UP node 1, the ports H2 and I2 of the UP node 2, and the ports H3 and I3 of the UP node 3 all correspond to the backup group 7.

As shown in FIG. 4, a plurality of virtual MAC addresses corresponding to a same backup group may include: different virtual MAC addresses on different UP nodes (for example, the virtual MAC addresses on the ports F1, F2, and F3), and/or different virtual MAC addresses on a same UP node (for example, the virtual MAC addresses on the ports F1 and G1). When the plurality of virtual MAC addresses corresponding to the same backup group include different virtual MAC addresses on different UP nodes, if one of the different UP nodes is faulty, the CP node may transfer a virtual MAC address that is on the faulty UP node and that corresponds to the backup group to another UP node in the different UP nodes, to back up the faulty UP node by using the another UP node. In addition, the plurality of virtual MAC addresses corresponding to the same backup group may include: different virtual MAC addresses on different interface boards (for example, the virtual MAC addresses on the ports F1 and G1), and/or different virtual MAC addresses on a same interface board (for example, the virtual MAC addresses on the ports H1 and I1).

It may be understood that the interface board or the port in the UP node in FIG. 4 may alternatively be considered as a UP node. In this case, each UP node may alternatively be added to at least one backup group. In addition, for each of the at least one backup group, a UP node that is added to the backup group has a virtual MAC address corresponding to the backup group. For example, when the interface board in FIG. 4 is considered as the UP node, the interface boards on which the ports A1, B1, and C1 are located are added to the backup groups 1, 2, and 3, the virtual MAC address on the port A1 on the interface board corresponds to the backup group 1, the virtual MAC address on the port B1 on the interface board corresponds to the backup group 2, and the virtual MAC address on the port C1 on the interface board corresponds to the backup group 3. When the port in FIG. 4 is considered as the UP node, the port A1 is added to the backup group 1, and the virtual MAC address on the port A1 corresponds to the backup group 1.

It should be noted that the vBNG system provided in embodiments of this application may further include a node other than the CP node and the at least one backup group. This is not limited in embodiments of this application.

The following describes the communication method provided in embodiments of this application by using a plurality of UP nodes that are added to one backup group in the vBNG system as an example. When UP nodes in the vBNG system are added to a plurality of backup groups, for a communication method related to the plurality of UP nodes that are added to each backup group, refer to the communication method related to the plurality of UP nodes that are added to the backup group. In addition, for the communication method related to the plurality of UP nodes that are added to the backup group, a virtual MAC address on a UP node in the communication method is a virtual MAC address that is on the UP node and that corresponds to the backup group.

For example, the communication method provided in embodiments of this application is performed by a CP node in a vBNG system. In the method, the CP node transfers a first virtual MAC address in a plurality of virtual MAC addresses from a first UP node in a plurality of UP nodes to a target UP node based on that the target UP node in the plurality of UP nodes satisfies a target condition.

The target condition is related to load of the target UP node. It should be noted that the load of the target UP node may be related to at least one parameter of the target UP node, and the load of the target UP node may be measured by using the at least one parameter. For example, the at least one parameter includes a quantity of users, user bandwidth, and the like carried on the target UP node. For example, the load of the target UP node is positively correlated with the quantity of users carried on the target UP node. The target UP node has one or more virtual MAC addresses for user access, the virtual MAC address may be used for carrying a user, and the quantity of users carried on the target UP node may be a sum of quantities of users carried on all the virtual MAC addresses on the target UP node.

It can be learned that in embodiments of this application, the CP node may search, based on the target condition related to the load of the target UP node, the plurality of UP nodes for the target UP node to which the first virtual MAC address may need to be transferred. For example, the target condition may be that remaining load of the target UP node is capable of accommodating the first virtual MAC address. The remaining load of the target UP node is a difference between total load that can be carried on the target UP node and current load of the target UP node. When the remaining load of the target UP node is capable of accommodating the first virtual MAC address, a processing capability of the target UP node can accommodate all users on the first virtual MAC address. In this case, the CP node may search nodes other than the first UP node in the plurality of UP nodes for the target UP node whose remaining load is capable of accommodating the first virtual MAC address, and then transfer the first virtual MAC address to the target UP node.

In a related technology in which an N:1 warm backup technology is used, when transferring the virtual MAC address, the CP node does not consider the load-related target condition, but directly transfers the virtual MAC address to a backup UP node. When the CP node transfers different virtual MAC addresses to a fixed backup UP node for a plurality of times, the backup UP node is easily overloaded and faulty. However, in embodiments of this application, when transferring the virtual MAC address, the CP node may need to consider that the target UP node satisfies the load-related target condition, so that the first virtual MAC address can be transferred to the target UP node. It can be learned that embodiments of this application provide another method for transferring a virtual MAC address by a CP node, to enrich functions of the CP node. In addition, in embodiments of this application, when the CP node performs the operation of transferring the first virtual MAC address for a plurality of times, a plurality of target UP nodes selected for a plurality of times based on the target condition may be different. In this way, the plurality of first virtual MAC addresses transferred for the plurality of times may be transferred to different target UP nodes, to reduce a probability that one UP node is overloaded and faulty because the plurality of first virtual MAC addresses are transferred to the UP node.

In addition, in the related technology in which the N:1 warm backup technology is used, before the CP node transfers the virtual MAC address to the backup UP node, the backup UP node has no virtual MAC address for user access. As a result, resource idleness of the backup UP node is caused. However, in embodiments of this application, the plurality of UP nodes has the plurality of virtual MAC addresses for user access, and in embodiments of this application, that each of the plurality of UP nodes has a virtual MAC address for user access is used as an example. For example, before the first virtual MAC address is transferred from the first UP node to the target node, the target node may have another virtual MAC address, for example, a second virtual MAC address. This may also be referred to as an N+1 warm backup technology. In this case, the CP node determines the target UP node in the plurality of UP nodes that have the virtual MAC addresses, and transfers the first virtual MAC address to the target UP node. In addition, before the CP node transfers the first virtual MAC address to the target UP node, because the target UP node has the virtual MAC address for user access, the target UP node can also communicate with a user, to avoid resource idleness of the target UP node and improve communication efficiency of the vBNG system. In this application, the N+1 warm backup technology is used, and an active UP node and a backup UP node in the plurality of UP nodes may not be distinguished.

Optionally, for a UP node having a virtual MAC address, the UP node may have one or more virtual MAC addresses. When the first UP node has a plurality of virtual MAC addresses, the CP node may transfer the plurality of virtual MAC addresses on the first UP node to different target UP nodes by using the method provided in embodiments of this application, to avoid transferring the plurality of virtual MAC addresses to a same UP node, so as to facilitate load balancing between the plurality of UP nodes.

In addition, in embodiments of this application, the first virtual MAC address may need to be transferred to the target UP node. The target UP node may be a non-faulty UP node. Certainly, the target UP node may alternatively be a faulty UP node. This is not limited in embodiments of this application. When the target UP node is a non-faulty UP node, the first virtual MAC address is transferred from the first UP node to the target UP node, so that a user carried on the first virtual MAC address can be transferred from the first UP node to the target UP node, and the user can be unaware of the transfer.

For example, all the plurality of UP nodes may access users through a user-side aggregation node (as shown in FIG. 3). When the first virtual MAC address is on the first UP node, the first UP node sends a gratuitous Address Resolution Protocol (ARP) packet to the user-side aggregation node. The gratuitous ARP packet includes an Internet Protocol (IP) address commonly used by the plurality of UP nodes and the first virtual MAC address. The user-side aggregation node may establish, based on the gratuitous ARP packet, a correspondence between the IP address, the first virtual MAC address, and a port that is on the user-side aggregation node and that receives the gratuitous ARP packet. Subsequently, when receiving a user packet to be sent to the IP address and the first virtual MAC address, the user-side aggregation node may transmit the user packet to the first UP node through the port based on the correspondence.

When the CP node transfers the first virtual MAC address from the first UP node to the target UP node, the target UP node sends the gratuitous ARP packet to the user-side aggregation node, where the gratuitous ARP packet includes the IP address and the first virtual MAC address. The user-side aggregation node may change, based on the gratuitous ARP packet, the port in the previously recorded correspondence to a port that is on the user-side aggregation node and that receives the gratuitous ARP packet, so as to update the correspondence. Subsequently, when receiving a user packet to be sent to the IP address and the first virtual MAC address, the user-side aggregation node may transmit the user packet to the target UP node through the port based on the correspondence.

In this way, before and after the CP node transfers the first virtual MAC address from the first UP node to the target UP node, user packets are forwarded by the user-side aggregation node to different UP nodes, but the user packets carry the same IP address and the first virtual MAC address, so as to implement user unawareness.

Further, in embodiments of this application, the CP node transfers the first virtual MAC address from the first UP node to the target UP node based on that the target UP node satisfies the target condition. Herein, the first UP node, the first virtual MAC address, and the target UP node may all have a plurality of implementations.

(1) For the first UP node, the first UP node may be any UP node in the plurality of UP nodes.

Optionally, the first UP node may be a faulty node or a non-faulty node in the plurality of UP nodes.

In one aspect, when the first UP node is a faulty node, and when transferring the first virtual MAC address from the first UP node to the target UP node based on that the target UP node satisfies the target condition, the CP node may transfer the first virtual MAC address from the first UP node to the target UP node based on that the target UP node satisfies the target condition and the first UP node is faulty. It can be learned that, when the faulty node (the first UP node) occurs in the plurality of UP nodes and the target UP node satisfies the target condition, the CP node may transfer the first virtual MAC address on the first UP node to the target UP node, to avoid communication interruption that is of a user accessed by using the first virtual MAC address and that is caused by the fault of the first UP node.

In another aspect, when the first UP node is a non-faulty node, the CP node transfers the first virtual MAC address from the first UP node to the target UP node, so that a user carried on the first virtual MAC address can be transferred from the first UP node to the target UP node, and the user can be unaware of the transfer.

Optionally, when the first UP node is a non-faulty node, the first UP node is a UP node, in the plurality of UP nodes, whose load is the highest and that has a virtual MAC address that is capable of being accommodated by the remaining load of the target UP node. In this case, the first virtual MAC address is transferred from the first UP node to the target UP node, so that load of the first UP node can be reduced, overload of the first UP node can be avoided, and load balancing between the plurality of UP nodes is facilitated. For example, the scenario shown in FIG. 2 is used as an example. It is assumed that the UP node 021 is the target UP node, load of the UP node 022 and load of the UP node 023 decrease sequentially, the UP node 022 has the virtual MAC address 2 that is capable of being accommodated by the remaining load of the target UP node, and the UP node 023 has the virtual MAC address 3 that is capable of being accommodated by the remaining load of the target UP node. In this case, the CP node may determine that the UP node 022 is the first UP node.

It may be understood that, when the first UP node is a non-faulty node, the first UP node may alternatively be implemented in another manner.

For example, when the first UP node is a non-faulty node, the first UP node may alternatively be a UP node randomly selected by the CP node from the plurality of UP nodes.

For another example, when the first UP node is a non-faulty node, the first UP node may alternatively be a UP node whose second difference between a quantity of virtual MAC addresses and a reference quantity is greater than m, where $m \geq 0$, the reference quantity $S = ((Z-1)/N) + 1$, Z indicates a quantity of virtual MAC addresses in the plurality of virtual MAC addresses, and N indicates a quantity of UP nodes in the plurality of UP nodes.

It should be noted that the reference quantity is related to the average value of the virtual MAC addresses on the plurality of UP nodes. When the second difference between the quantity of virtual MAC addresses on the first UP node and the reference quantity is greater than m, it indicates that the quantity of virtual MAC addresses on the first UP node is large. In this case, the first virtual MAC address on the first UP node may need to be transferred to another UP node, so that the quantities of virtual MAC addresses on the plurality of UP nodes tend to be balanced. As time goes on, a user goes online and offline continuously, and load of each virtual MAC address tends to be balanced. In this case, if quantities of virtual MAC addresses on the plurality of UP nodes tend to be balanced, load of the plurality of UP nodes tends to be balanced.

For example, the scenario shown in FIG. 2 is used as an example. It is assumed that the plurality of UP nodes includes the UP node 021, the UP node 022, and the UP node 023 in FIG. 2, the UP node 021 is a newly added UP node, and the UP node 021 has no virtual MAC address for user access. Virtual MAC addresses on the UP node 022 include virtual MAC addresses 1 and 2 whose load decreases sequentially, and virtual MAC addresses on the UP node 023 include virtual MAC addresses 3, 4, 5, 6, 7, and 8 whose load decreases sequentially. In this case, the reference quantity $S = ((Z-1)/N) + 1 = ((8-1)/3) + 1 \approx 3.3$. Using $m = 0$ as an example, a second difference −3.3 between the quantity 0 of virtual MAC addresses on the UP node 021 and the reference quantity 3.3 is not greater than m, a second difference −1.3 between the quantity 2 of virtual MAC addresses on the UP node 022 and the reference quantity 3.3 is not greater than m, and a second difference 2.7 between the quantity 6 of virtual MAC addresses on the UP node 023 and the reference quantity 3.3 is greater than m. Therefore, the UP node 023 is the first UP node.

(2) For the first virtual MAC address, the first virtual MAC address may be any virtual MAC address on the first UP node.

Optionally, the first virtual MAC address may be a virtual MAC address randomly selected by the CP node on the first UP node.

Alternatively, before the CP node transfers the first virtual MAC address to the target UP node, the first virtual MAC address may be a virtual MAC address, on the first UP node, whose load is the highest and that is capable of being accommodated by the remaining load of the target UP node. In this case, transferring the first virtual MAC address to the target UP node can greatly reduce load of the first UP node, and facilitate load balancing between the plurality of UP nodes.

Alternatively, before the CP node transfers the first virtual MAC address to the target UP node, the first virtual MAC address may be a virtual MAC address, on the first UP node, whose load is the lowest and that is capable of being accommodated by the remaining load of the target UP node. In this case, transferring the first virtual MAC address to the target UP node can reduce load of the first UP node, and the load of the target UP node is not high, so that a probability of implementing load balancing between the plurality of UP nodes is increased.

Alternatively, before the CP node transfers the first virtual MAC address to the target UP node, the first virtual MAC address may be a virtual MAC address for user access, on the first UP node, whose load is the lowest and that is capable of being accommodated by the remaining load of the target UP node. In this case, transferring the first virtual MAC address to the target UP node can reduce load of the first UP node, and the load of the target UP node is not high, so that a probability of implementing load balancing between the plurality of UP nodes is increased. In addition, because a user is accessed by using the first virtual MAC address, the user accessed by using the first virtual MAC address may be further transferred to the target UP node.

For example, the scenario shown in FIG. 2 is used as an example. It is assumed that the UP node 021 is the target UP node, the UP node 022 is the first UP node, the UP node 022 has virtual MAC addresses 1, 2, and 3 that are capable of being accommodated by the remaining load of the target UP node, load of the virtual MAC addresses 1, 2, and 3 decreases sequentially, users are accessed by using the virtual MAC addresses 1 and 2, and no user is accessed by using the virtual MAC address 3. Before the CP node transfers the first virtual MAC address to the target UP node, if the first virtual MAC address may be a virtual MAC address, on the first UP node, whose load is the highest and that is capable of being accommodated by the remaining load of the target UP node, the first virtual MAC address is 1. Before the CP node transfers the first virtual MAC address to the target UP node, if the first virtual MAC address may be a virtual MAC address, on the first UP node, whose load is the lowest and that is capable of being accommodated by the remaining load of the target UP node, the first virtual MAC address is 3. Before the CP node transfers the first virtual MAC address to the target UP node, if the first virtual MAC address may be a virtual MAC address for user access, on the first UP node, whose load is the lowest and that is capable of being accommodated by the remaining load of the target UP node, the first virtual MAC address is 2.

It should be noted that the load of the virtual MAC address may be related to at least one parameter of the virtual MAC address, and the at least one parameter may be used for measuring the load of the virtual MAC address. For example, the at least one parameter includes a quantity of users, user bandwidth, and the like carried on the virtual MAC address. For example, the load of the virtual MAC address is positively correlated with the quantity of users carried on the virtual MAC address.

(3) For the target UP node, the target UP node may be any one of the plurality of UP nodes, the target UP node satisfies the target condition, and the target condition may be any load-related condition.

(3.1) For example, the target condition includes: the remaining load of the target UP node is capable of accommodating the first virtual MAC address. In this case, after the CP node transfers the first virtual MAC address to the target UP node, the target UP node is not overloaded, to prevent the target UP node from being faulty.

(3.2) For another example, the target condition includes: the target UP node is a UP node, in UP nodes other than the first UP node in the plurality of UP nodes, whose remaining load is capable of accommodating the first virtual MAC address and whose load is the lowest. In this way, transferring the first virtual MAC address to the target UP node does not cause the load of the target UP node to far exceed load of a remaining UP node, and load balancing between the plurality of UP nodes can be facilitated.

For example, the scenario shown in FIG. 2 is used as an example. It is assumed that the UP node 022 is the first UP node, and the first virtual MAC address is the virtual MAC address 1 on the UP node 021. Load of the UP node 021 and load of the UP node 023 decrease sequentially, and remaining load of the UP nodes 021 and 023 is capable of accommodating the virtual MAC address 1. In this case, the UP node 023 may be the target UP node.

(3.3) For still another example, the target condition includes: the load of the target UP node is less than the load of the first UP node. In this case, after the CP node transfers the first virtual MAC address to the target UP node, the load of the first UP node can be reduced, and the load of the target UP node can be increased, so that load of the plurality of UP nodes can be balanced.

For example, the scenario shown in FIG. 2 is used as an example. It is assumed that the UP node 022 is the first UP node, and the first virtual MAC address is the virtual MAC address 1 on the UP node 021. Load of the UP node 021 is greater than load of the UP node 022, and load of the UP node 023 is less than the load of the UP node 022. In this case, the UP node 023 is the target UP node.

(3.4) For still another example, the target condition includes: a quantity of virtual MAC addresses on the target UP node is less than a quantity of virtual MAC addresses on the first UP node.

It should be noted that, when the target condition includes that the quantity of virtual MAC addresses on the target UP node is less than the quantity of virtual MAC addresses on the first UP node, transferring the first virtual MAC address from the first UP node to the target UP node can make the quantity of virtual MAC addresses on the first UP node and the quantity of virtual MAC addresses on the target UP node tend to be balanced. As time goes on, a user goes online and offline continuously, and load of each virtual MAC address tends to be balanced. In this case, if the quantity of virtual MAC addresses on the first UP node and the quantity of virtual MAC addresses on the target UP node tend to be balanced, load of the plurality of UP nodes tends to be balanced.

For example, the scenario shown in FIG. 2 is used as an example. It is assumed that the UP node 021 has one virtual MAC address, the UP node 022 has two virtual MAC addresses, and the UP node 023 has three virtual MAC addresses. In addition, if the UP node 022 is the first UP node, the UP node 021 is the target UP node.

(3.5) For still another example, the target condition includes: a first difference between the reference quantity and a quantity of virtual MAC addresses on the target UP node is greater than m, where m≥0, the reference quantity $S=((Z-1)/N)+1$, Z represents the quantity of virtual MAC addresses in the plurality of virtual MAC addresses, and N represents the quantity of UP nodes in the plurality of UP nodes.

It should be noted that the reference quantity is related to an average value of the virtual MAC addresses on the plurality of UP nodes. When the first difference between the reference quantity and the quantity of virtual MAC addresses on the target UP node is greater than m, it indicates that the quantity of virtual MAC addresses on the target UP node is small. In this case, the virtual MAC address may need to be transferred to the target UP node, so that the quantities of virtual MAC addresses on the plurality of UP nodes tend to be balanced. As time goes on, a user goes online and offline continuously, and load of each virtual MAC address tends to be balanced. In this case, if the quantities of virtual MAC addresses on the plurality of UP nodes tend to be balanced, load of the plurality of UP nodes tends to be balanced.

For example, the scenario shown in FIG. 2 is used as an example. It is assumed that the plurality of UP nodes includes the UP node 021, the UP node 022, and the UP node 023 in FIG. 2, the UP node 021 is a newly added UP node, and the UP node 021 has no virtual MAC address for user access. Virtual MAC addresses on the UP node 022 include virtual MAC addresses 1 and 2 whose load decreases sequentially, and virtual MAC addresses on the UP node 023 include virtual MAC addresses 3, 4, 5, 6, 7, and 8 whose load decreases sequentially. In this case, the reference quantity $S=((Z-1)/N)+1=((8-1)/3)+1\approx3.3$. Using m=0 as an example, a first difference 3.3 between the reference quantity 3.3 and the quantity 0 of virtual MAC addresses on the UP node 021 is greater than m, a first difference 1.3 between the reference quantity 3.3 and the quantity 2 of virtual MAC addresses on the UP node 022 is greater than m, and a first difference −2.7 between the reference quantity 3.3 and the quantity 6 of virtual MAC addresses on the UP node 023 is less than m. Therefore, the UP node 021 or 022 is the target UP node.

It should be noted that, when the first difference between the reference quantity and the quantity of virtual MAC addresses on the target UP node is greater than m, the quantity of virtual MAC addresses on the target UP node is not necessarily less than the quantity of virtual MAC addresses on the first UP node. The second difference between the quantity of virtual MAC addresses on the first UP node and the reference quantity is not necessarily greater than m.

In embodiments of this application, an example in which when the second difference between the quantity of virtual MAC addresses on the first UP node and the reference quantity is greater than m, and the first UP node has at least one virtual MAC address that is capable of being accommodated by the remaining load of the target UP node, the target condition includes that the first difference between the reference quantity and the quantity of virtual MAC addresses on the target UP node is greater than m is used. In this case, when transferring the first virtual MAC address from the first UP node in the plurality of UP nodes to the target UP node, the CP node may transfer at least one virtual MAC address on the first UP node from the first UP node to the target UP node. A quantity of virtual MAC addresses in the at least one virtual MAC address on the first UP node is less than or equal to the first difference and the second difference, and the at least one virtual MAC address includes the first virtual MAC address. When the at least one virtual MAC address includes a plurality of virtual MAC addresses, the CP node may transfer the plurality of virtual MAC addresses from the first UP node to the target UP node once, and efficiency of balancing the quantity of virtual MAC addresses on the first UP node and the quantity of virtual MAC addresses on the target UP node can be improved.

In addition, in embodiments of this application, regardless of whether the CP node transfers one or more virtual MAC addresses from the first UP node to the target UP node, before transferring the virtual MAC address, the CP node may determine that the remaining load of the target UP node is capable of accommodating the one or more to-be-transferred virtual MAC addresses. Certainly, the CP node may not need to consider whether the remaining load of the target UP node is capable of accommodating the one or more to-be-transferred virtual MAC addresses. This is not limited in embodiments of this application.

(3.6) For still another example, the target condition includes: the target UP node is a newly added UP node in the plurality of UP nodes, and the newly added UP node have no a virtual MAC address for user access. The newly added UP node may be a UP node that is re-added to the plurality of UP nodes after a fault is rectified, or may be a UP node that is not faulty and that has not been added to the plurality of UP nodes. In embodiments of this application, an example in which the target UP node is a newly added UP node is used. Certainly, the target UP node may not be a newly added UP node. This is not limited in embodiments of this application.

In embodiments of this application, the foregoing (3.1) to (3.6) provide a total of six conditions in the target condition. It may be understood that the target condition may include at least one of the six conditions. This is not limited embodiments of this application. When the target condition includes at least two of the six conditions, the target UP node may need to satisfy the at least two conditions, and the CP node may need to search, based on the at least two conditions, for the target UP node that satisfies the at least two conditions.

The foregoing describes the plurality of implementations of the first UP node, the plurality of implementations of the first virtual MAC address, and the plurality of implementations of the target UP node (related to the plurality of implementations of the target condition) in embodiments of this application. It may be understood that any implementation of the first UP node, any implementation of the first virtual MAC address, and any implementation of the target UP node in embodiments of this application may be mutually combined, and all obtained communication methods fall within the protection scope of this application.

The following uses three examples to describe the communication method protected in embodiments of this application.

Example 1: The first UP node is a faulty node, and the first virtual MAC address is a virtual MAC address for user access, on the first UP node, whose load is the highest and that is capable of being accommodated by the remaining load of the target UP node. The target condition includes: the target UP node is a UP node, in UP nodes other than the first UP node in the plurality of UP nodes, whose remaining load is capable of accommodating the first virtual MAC address and whose load is the lowest.

In the communication method obtained by combining the implementations, the CP node may detect whether there is a faulty node in the plurality of UP nodes. When finding a faulty UP node in the plurality of UP nodes, the CP node may determine that the faulty UP node is the first UP node. In addition, based on that the first UP node is faulty, when a virtual MAC address for user access exists on the first UP node, the CP node may further perform a first operation at least once until no virtual MAC address for user access exists on the first UP node, or until no UP node whose remaining load is capable of accommodating the first virtual MAC address exists in the UP nodes other than the first UP node in the plurality of UP nodes.

As shown in FIG. 5, the first operation includes the following steps.

S501: The CP node sifts out the first virtual MAC address whose load is the highest from virtual MAC addresses for user access on the first UP node.

In this example, the first virtual MAC address is a virtual MAC address for user access, on the first UP node, whose load is the highest and that is capable of being accommodated by the remaining load of the target UP node. In this case, the CP node may determine the virtual MAC addresses for user access in the virtual MAC addresses on the first UP node, and then sift out the first virtual MAC address whose load is the highest from the virtual MAC addresses for user access.

S502: The CP node sequentially determines, in ascending order of the load of the UP nodes, whether remaining load of each UP node other than the first UP node in the plurality of UP nodes is capable of accommodating the first virtual MAC address until the target UP node is determined.

In this process, if the CP node determines that remaining load of a UP node cannot accommodate the first virtual MAC address, the CP node may further determine whether remaining load of a next UP node is capable of accommodating the first virtual MAC address. If the CP node determines that remaining load of a UP node is capable of accommodating the first virtual MAC address, the CP node may determine that the UP node satisfies the target condition, determine the UP node as the target UP node, and does not continue to determine whether remaining load of a subsequent UP node is capable of accommodating the first virtual MAC address.

S503: The CP node transfers the first virtual MAC address to the target UP node.

After sifting out the first virtual MAC address and determining the target UP node, the CP node may transfer the first virtual MAC address from the first UP node to the target UP node.

In this example, after the CP node completes one first operation (S501 to S503), if the virtual MAC address for user access still exists on the first UP node, the CP node may repeatedly perform the first operation. In addition, a virtual MAC address that has been transferred out from the first UP node before the first operation is repeatedly performed does not belong to the first UP node. Therefore, in S501 in repeated execution of the first operation, a quantity of virtual MAC addresses on the first UP node is reduced in comparison with a quantity of virtual MAC addresses when S501 is performed last time.

In addition, after the CP node completes one first operation (S501 to S503), if no virtual MAC address for user access exists on the first UP node, the CP node does not need to repeatedly perform the first operation. In a process in which the CP node performs the first operation, if it is determined in S502 that there is no target UP node whose remaining load is capable of accommodating the first virtual MAC address in the UP nodes other than the first UP node in the plurality of UP nodes, the CP node may stop performing the first operation, and does not need to repeatedly perform the first operation.

For different first operations performed by the CP node, the first virtual MAC addresses sifted out by the CP node in S501 are different, and the target UP nodes determined by the CP node in S502 may be the same or may be different. Therefore, the different first virtual MAC addresses on the first UP node may be transferred to a same UP node or different UP nodes.

It can be learned from the content of this example that in S501, the CP node sifts out the first virtual MAC address from the virtual MAC addresses for user access on the first UP node. In this case, after the first operation is repeatedly performed for a plurality of times, a case in which all the virtual MAC addresses for user access on the faulty first UP node are transferred to another UP node exists. In this way, users carried on the faulty first UP node can be transferred to another UP node, so that communication of these users is ensured. It may be understood that, in S501, the CP node may alternatively sift out the first virtual MAC address from the virtual MAC addresses on the first UP node. In this case, after the first operation is repeatedly performed for a plurality of times, a case in which all the virtual MAC addresses on the faulty first UP node are transferred to another UP node exists.

In S501, the CP node sifts out the first virtual MAC address whose load is the highest from the virtual MAC addresses for user access on the first UP node. In this case, transferring the first virtual MAC address to the target UP node by the CP node in S503 can greatly reduce the load of the first UP node, and ensure that communication of a large quantity of users carried on the first UP node (users carried on the first virtual MAC address) is not interrupted. If the CP node repeatedly performs the first operation for a plurality of times, the CP node may transfer, in descending order of the load of the virtual MAC addresses, the virtual MAC address for user access on the first UP node, to ensure that communication of a large quantity of users carried on the first UP node is not interrupted.

The remaining load of the target UP node selected by the CP node in S502 is capable of accommodating the first virtual MAC address. In this case, after the CP node transfers the first virtual MAC address to the target UP node, the target UP node is not overloaded, to prevent the target UP node from being faulty. In addition, in the foregoing S502, the CP node sequentially determines, in ascending order of the load of the UP nodes, whether the remaining load of each UP node other than the first UP node in the plurality of UP nodes is capable of accommodating the first virtual MAC address until the target UP node is determined. In this way, the target UP node selected by the CP node is a UP node, in the UP nodes other than the first UP node in the plurality of UP nodes, whose remaining load is capable of accommodating the first virtual MAC address and whose load is the lowest, and transferring the first virtual MAC address to the target UP node does not cause the load of the target UP node to far exceed load of another UP node, and load balancing between the plurality of UP nodes can be facilitated.

In embodiments of this application, an example in which the first virtual MAC address is a virtual MAC address for user access, on the first UP node, whose load is the highest and that is capable of being accommodated by the load of the target UP node, and the target UP node is a UP node, in the UP nodes other than the first UP node in the plurality of UP nodes, whose remaining load is capable of accommodating the first virtual MAC address and whose load is the lowest is used. Optionally, the first virtual MAC address may alternatively be a virtual MAC address randomly selected from the first UP node; the first virtual MAC address may alternatively be a virtual MAC address, on the first UP node, whose load is the lowest and that is capable of being accommodated by the load of the target UP node; the first virtual MAC address may alternatively be a virtual MAC address for user access, on the first UP node, whose load is the lowest and that is capable of being accommodated by the load of the target UP node; the first virtual MAC address is a virtual MAC address, on the first UP node, whose load is the highest and that is capable of being accommodated by the load of the target UP node; or the like. Alternatively, the target UP node may be a UP node randomly selected from UP nodes that are other than the first UP node in the plurality of UP nodes and that can carry the first virtual MAC address; the target UP node may be a UP node, in the UP nodes other than the first UP node in the plurality of UP nodes, whose load is the highest and that can carry the first virtual MAC address; or the like.

In embodiments of this application, a proper first virtual MAC address and a proper target UP node may be selected based on requirements of different scenarios, for example, requirements on communication performance, load balancing precision, and a user migration success rate. For example, the first virtual MAC address is a virtual MAC address, on the first UP node, whose load is the lowest and that is capable of being accommodated by the load of the target UP node, and the target UP node is a UP node, in the UP nodes other than the first UP node in the plurality of UP nodes, whose load is the highest and that can carry the first virtual MAC address. When the target UP node selected by the CP node is a UP node, in the nodes other than the first UP node in the plurality of UP nodes, whose load is the highest and whose remaining load is capable of accommodating the first virtual MAC address, in S502, the CP node may sequentially determine, in descending order of the load of the UP nodes, whether the remaining load of each UP node other than the first UP node in the plurality of UP nodes is capable of accommodating the first virtual MAC address until the target UP node is determined.

Figure 6:
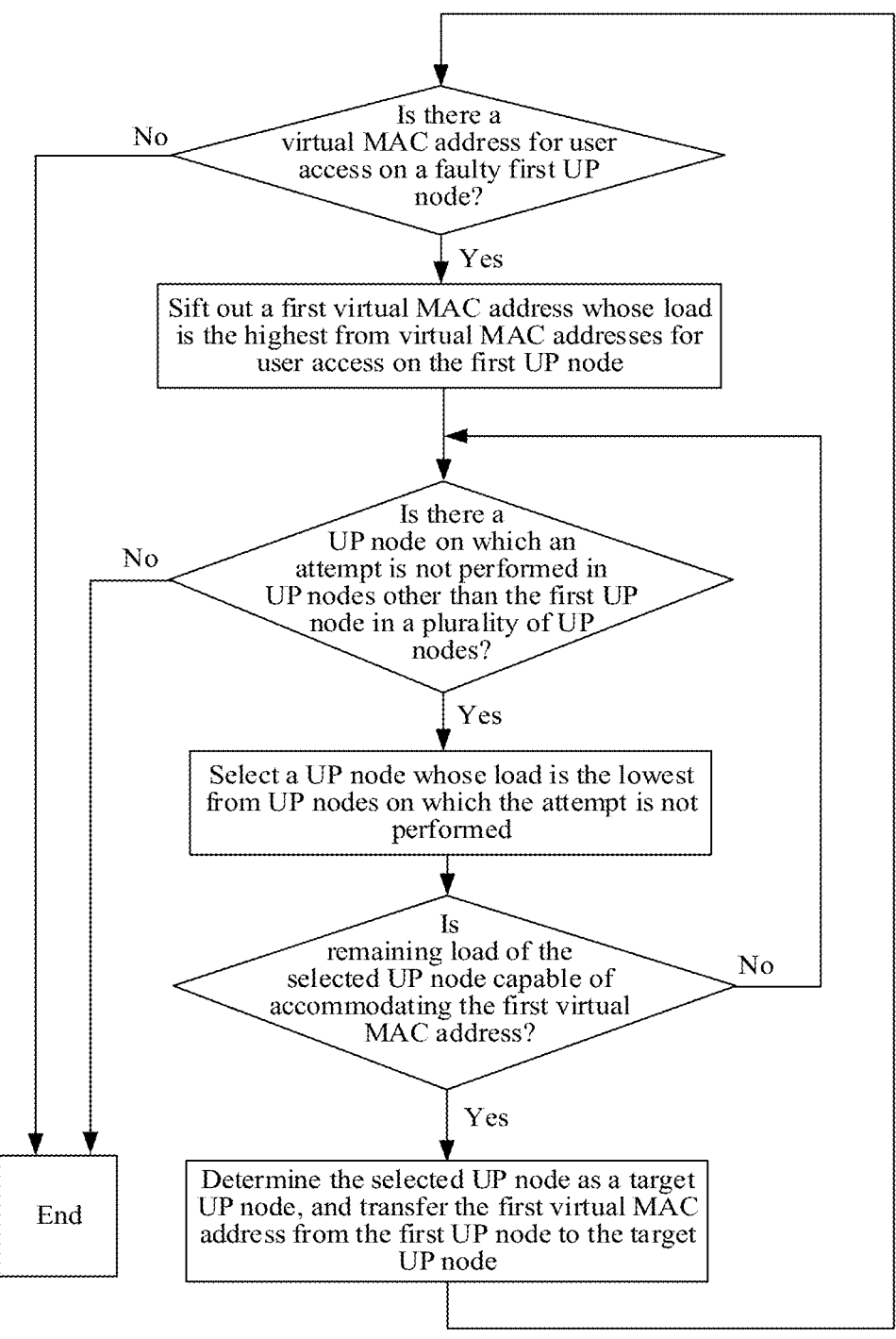
FIG. 6 is a flowchart of a communication method according to an embodiment of this application.

Further, the communication method provided in the example 1 may be represented by using a flowchart shown in FIG. 6. Refer to FIG. 6, in the communication method, when the first UP node is faulty, the CP node may determine whether a virtual MAC address for user access exists on the faulty first UP node. If there are virtual MAC addresses for user access on the faulty first UP node, the CP node may sift out the first virtual MAC address whose load is the highest from the virtual MAC addresses for user access on the first UP node.

Then, when there are UP nodes on which an attempt is not performed in the UP nodes, the CP node may select a UP node whose load is the lowest from the UP nodes on which the attempt is not performed, and determine whether remaining load of the selected UP node is capable of accommodating the first virtual MAC address, to complete the attempt on the UP node. If the remaining load of the UP node is capable of accommodating the first virtual MAC address, the CP node determines the UP node as the target UP node, and transfers the first virtual MAC address to the target UP node. If the remaining load of the UP node cannot accommodate the first virtual MAC address, the CP node may re-determine whether there is a UP node on which an attempt is not performed in the UP nodes other than the first UP node in the plurality of UP nodes. If the CP node determines that there is no UP node on which the attempt is not performed in the UP nodes other than the first UP node in the plurality of UP nodes, the CP node may determine that remaining load of each UP node other than the first UP node in the current plurality of UP nodes cannot accommodate the first virtual MAC address. In this case, the CP node may end the operation.

After the CP node transfers the first virtual MAC address to the target UP node, the CP node may re-determine whether a virtual MAC address for user access exists on the faulty first UP node. If the virtual MAC address for user access still exists on the first UP node, the CP node may use the virtual MAC address as the first virtual MAC address, and transfer the first virtual MAC address according to the foregoing method. If no virtual MAC address for user access exists on the first UP node, it indicates that all the virtual MAC addresses for user access on the first UP node are transferred. In this case, the CP node ends the operation.

The following uses an example to describe the communication method provided in the example 1.

It is assumed that the plurality of UP nodes include the UP node 021, the UP node 022, and the UP node 023 in FIG. 2, the UP node 021 is faulty, and virtual MAC addresses on the UP node 021 include virtual MAC addresses 1, 2, 3, and 4, where users are accessed by using the virtual MAC addresses 1 and 2, load of the virtual MAC addresses 1 and 2 decreases sequentially, and no user is accessed by using the virtual MAC addresses 3 and 4. Load of the UP node 022 and load of the UP node 023 decrease sequentially.

In this case, the CP node 01 may perform the first operation at least once based on that the UP node 021 is faulty.

In a process of performing the first operation for the first time, the CP node 01 may sift out the virtual MAC address 1 whose load is the highest from the virtual MAC addresses 1 and 2 by using which the users are accessed on the UP node 021. Then, the CP node 01 sequentially determines whether remaining load of the UP nodes 022 and 023 is capable of accommodating the virtual MAC address 1. Assuming that the remaining load of the UP node 022 is capable of accommodating the virtual MAC address 1, the CP node 01 may transfer the virtual MAC address 1 to the UP node 022. After the first operation for the first time ends, because the faulty UP node 021 further has the virtual MAC address 2 by using which the user is accessed, the CP node 01 may perform the first operation for the second time.

In a process of performing the first operation for the second time, the CP node 01 may sift out a virtual MAC address 2 whose load is the highest from virtual MAC addresses 2 by using which users are accessed on the UP node 021. Then, if load of the UP nodes 023 and 022 decreases sequentially, the CP node 01 sequentially determines whether remaining load of the UP nodes 023 and 022 is capable of accommodating the virtual MAC address 2. Assuming that the remaining load of the UP node 023 is capable of accommodating the virtual MAC address 2, the CP node 01 may transfer the virtual MAC address 2 to the UP node 023. After the first operation for the second time ends, because the faulty UP node 021 has no virtual MAC address by using which a user is accessed, the CP node 01 may not perform the first operation for a next time.

It can be learned from the foregoing two first operations that, the CP node 01 transfers the virtual MAC address 1 by using which the user is accessed on the faulty UP node 021 to the UP node 022, and transfers the virtual MAC address 2 by using which the user is accessed to the UP node 023. In this way, it is ensured that communication of users carried on the virtual MAC addresses 1 and 2 is not interrupted, and load balancing between the UP node 022 and the UP node 023 that are not faulty can be implemented.

Example 2: The first UP node is a UP node, in UP nodes other than the target UP node in the plurality of UP nodes, that has a virtual MAC address whose load is the highest and that is capable of being accommodated by the remaining load of the target UP node. The first virtual MAC address is a virtual MAC address, on the first UP node, whose load is the highest and that is capable of being accommodated by the remaining load of the target UP node. The target condition includes: the target UP node is a newly added UP node.

In the communication method obtained by combining the implementations, when a newly added UP node appears in the plurality of UP nodes, the CP node may determine the newly added UP node as the target UP node. In addition, when the target UP node is not a UP node whose load is the highest in the plurality of UP nodes, the CP node may further perform the second operation at least once until the target UP node is the UP node whose load is the highest in the plurality of UP nodes, or until no virtual MAC address that is capable of being accommodated by the remaining load of the target UP node exists on the UP node whose load is the highest in the plurality of UP nodes.

As shown in FIG. 7, the second operation includes the following steps.

S601: The CP node sifts out the first UP node whose load is the highest from the plurality of UP nodes.

Generally, no user accesses a newly added UP node in the plurality of UP nodes. Therefore, the newly added UP node is usually not the UP node whose load is the highest in the plurality of UP nodes. Therefore, when a newly added UP node appears in the plurality of UP nodes, the CP node may sift out the first UP node whose load is the highest from the plurality of UP nodes, to migrate at least a part of the virtual MAC addresses on the first UP node to the target UP node by using the second operation, to facilitate load balancing between the plurality of UP nodes.

S602: The CP node sequentially determines, in descending order of the load of the virtual MAC addresses, whether each virtual MAC address on the first UP node is capable of being accommodated by the remaining load of the target UP node until the first virtual MAC address, on the first UP node, whose load is the highest and that is capable of being accommodated by the remaining load of the target UP node is determined.

After the first UP node is sifted out, the CP node may sequentially determine, in descending order of the load of the virtual MAC addresses, whether each virtual MAC address on the first UP node is capable of being accommodated by the remaining load of the target UP node. In this process, if the CP node determines that the remaining load of the target UP node cannot accommodate a virtual MAC address, the CP node may further determine whether the remaining load of the target UP node is capable of accommodating a next virtual MAC address. If the CP node determines that the remaining load of the target UP node is capable of accommodating a virtual MAC address, the CP node may determine that the virtual MAC address is the first virtual MAC address, and does not further determine whether a next virtual MAC address is capable of being accommodated by the remaining load of the target UP node.

S603: The CP node transfers the first virtual MAC address to the target UP node.

After sifting out the first virtual MAC address, the CP node may transfer the first virtual MAC address from the first UP node to the target UP node.

In this example, after the CP node completes the second operation (S601 to S603) once, if the target UP node is not the UP node whose load is the highest in the plurality of UP nodes, the CP node may repeatedly perform the second operation. In addition, a virtual MAC address that has been transferred out from a UP node before the second operation is repeatedly performed does not belong to the UP node, and load of the plurality of UP nodes is also updated. Therefore, in S601 of repeatedly performing the second operation, a UP node whose load is the highest in the plurality of UP nodes may change.

In addition, after the CP node completes the second operation (S601 to S603) once, if the target UP node is the UP node whose load is the highest in the plurality of UP nodes, the CP node does not need to repeatedly perform the second operation. In a process in which the CP node performs the second operation, if it is determined in S602 that no first virtual MAC address that is capable of being accommodated by the remaining load of the target UP node exists on the first UP node, the CP node may stop performing the second operation, and does not need to repeatedly perform the second operation. After the CP node performs the second operation on each UP node other than the target UP node in the plurality of UP nodes, the CP node may stop performing the second operation on the UP node.

For different second operations performed by the CP node, first UP nodes determined in S601 may be the same or may be different, and first virtual MAC addresses selected by the CP node in S602 are different. Therefore, different first virtual MAC addresses transferred to the target UP node may be from a same UP node, or may be from different UP nodes.

It can be learned from the content of this example that, in S601, the CP node sifts out the first UP node whose load is the highest from the plurality of UP nodes. In this case, transferring the first virtual MAC address to the target UP node by the CP node in S603 can greatly reduce the load of the first UP node, prevent the first UP node from being faulty because of excessively high load, and ensure that communication of a large quantity of users carried on the first UP node (users carried on the first virtual MAC address) is not interrupted. After the second operation is repeatedly performed for a plurality of times, the CP node can transfer at least a part of virtual MAC addresses on a UP node whose load is high in the plurality of UP nodes to the target UP node, to facilitate load balancing between the plurality of UP nodes.

In S602, the CP node sequentially determines, in descending order of the load of the virtual MAC addresses, whether each virtual MAC address of the first UP node is capable of being accommodated by the remaining load of the target UP node, until the first virtual MAC address is determined. In this way, the first virtual MAC address selected by the CP node is a virtual MAC address whose load is the highest in virtual MAC addresses, on the first UP node, that are capable of being accommodated by the remaining load of the target UP node. Transferring the first virtual MAC address to the target UP node can improve load balancing efficiency of the plurality of UP nodes.

In addition, when the first virtual MAC address selected by the CP node is a virtual MAC address, on the first UP node, whose load is the lowest and that is capable of being accommodated by the remaining load of the target UP node, in S602, the CP node may sequentially determine, in ascending order of the load of the virtual MAC addresses, whether each virtual MAC address on the first UP node is capable of being accommodated by the remaining load of the target UP node until the first virtual MAC address is determined.

Figure 8:
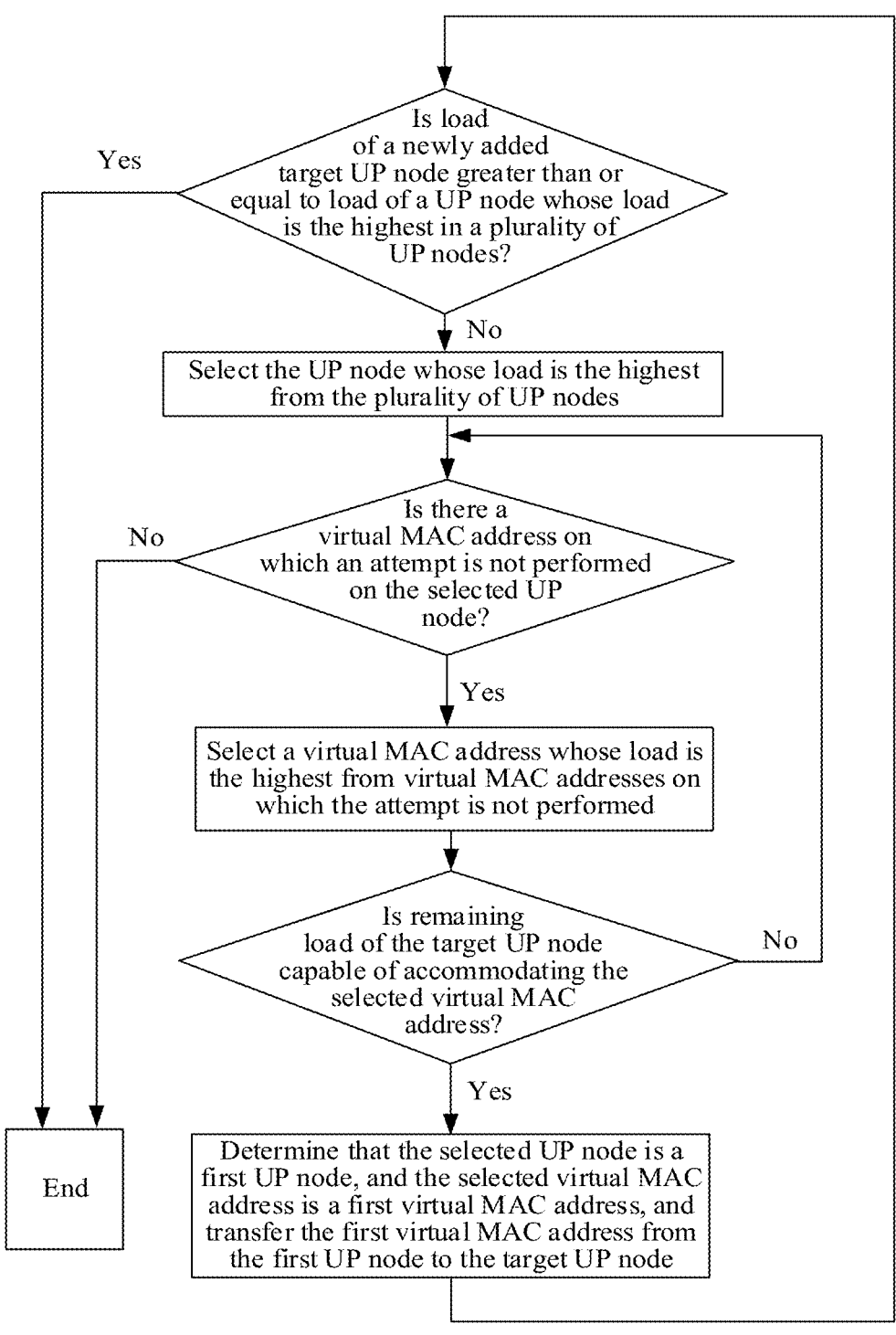
FIG. 8 is another flowchart of a communication method according to an embodiment of this application.

Further, the communication method provided in the example 2 may be represented by using a flowchart shown in FIG. 8. Refer FIG. 8, in the communication method, when a newly added target UP node appears, the CP node may determine whether the load of the target UP node is greater than or equal to load of a UP node whose load is the highest in the plurality of UP nodes. In other words, it is determined whether the target UP node is the UP node whose load is the highest in the plurality of UP nodes.

If the load of the target UP node is less than the load of the UP node whose load is the highest in the plurality of UP nodes, the CP node may select the UP node whose load is the highest in the plurality of UP nodes. Then, the CP node may determine whether the selected UP node has virtual MAC addresses on which an attempt is not performed. When the UP node has the virtual MAC addresses on which the attempt is not performed, the CP node may select a virtual MAC address whose load is the highest from the virtual MAC addresses on which the attempt is not performed, and determine whether the remaining load of the target UP node is capable of accommodating the selected virtual MAC address, so as to complete the attempt on the virtual MAC address.

If the remaining load of the target UP node is capable of accommodating the selected virtual MAC address, the CP node determines that the currently selected UP node is the first UP node and the currently selected virtual MAC address is the first virtual MAC address, and transfers the first virtual MAC address to the target UP node. If the remaining load of the target UP node cannot accommodate the selected virtual MAC address, the CP node may re-determine whether there is a virtual MAC address on which an attempt is not performed on the currently selected UP node. If the CP node determines that there is no virtual MAC address on which an attempt is performed on the UP node, the CP node may determine that there is no virtual MAC address, on the currently selected UP node, that is capable of being accommodated by the remaining load of the target UP node. In this case, the CP node may end the operation.

After the CP node transfers the first virtual MAC address to the target UP node, the CP node may re-determine whether the load of the target UP node is greater than or equal to the load of the UP node whose load is the highest in the plurality of UP nodes. If the load of the target UP node is less than the load of the UP node whose load is the highest in the plurality of UP nodes, the CP node may continue to transfer the virtual MAC address to the target UP node according to the foregoing method. If the load of the target UP node is greater than or equal to the load of the UP node whose load is the highest in the plurality of UP nodes, it indicates that the load of the target UP node is high. In this case, it is not suitable to transfer the virtual MAC address to the target UP node. In this case, the CP node ends the operation.

The following uses an example to describe the communication method provided in the example 2.

It is assumed that the plurality of UP nodes include the UP node 021, the UP node 022, and the UP node 023 in FIG. 2, the UP node 021 is a newly added UP node, virtual MAC addresses on the UP node 022 include virtual MAC addresses 1 and 2 whose load decreases sequentially, and virtual MAC addresses on the UP node 023 include virtual MAC addresses 3 and 4 whose load decreases sequentially. Load of the UP node 022 and load of the UP node 023 decrease sequentially.

In this case, the CP node 01 may perform the second operation at least once based on that the UP node 021 is the newly added UP node.

In a process of performing the second operation for the first time, the CP node 01 may sift out the UP node 022 whose load is highest from the UP node 022 and the UP node 023. Then, the CP node 01 sequentially determines whether the virtual MAC addresses 1 and 2 on the UP node 022 are capable of being accommodated by remaining load of the UP node 021. Assuming that the remaining load of the UP node 021 is capable of accommodating the virtual MAC address 1, the CP node 01 may transfer the virtual MAC address 1 to the UP node 021. After the second operation for the first time ends, it is assumed that load of the UP node 023, the UP node 022, and the UP node 021 decreases sequentially. In this case, the UP node 021 is not a UP node whose load is the highest in the plurality of UP nodes. Therefore, the CP node 01 may perform the second operation for the second time.

In a process of performing the second operation for the second time, the CP node 01 may sift out the UP node 023 whose load is the highest from the UP node 022 and the UP node 023. Then, the CP node 01 sequentially determines whether the virtual MAC addresses 3 and 4 on the UP node 023 are capable of being accommodated by remaining load of the UP node 021. Assuming that the remaining load of the UP node 021 is capable of accommodating the virtual MAC address 3, the CP node 01 may transfer the virtual MAC address 3 to the UP node 021. After the second operation for the second time ends, it is assumed that load of the UP node 021, the UP node 022, and the UP node 023 sequentially decreases. In this case, the UP node 021 is a UP node whose load is the highest in the plurality of UP nodes. Therefore, the CP node 01 may stop repeatedly performing the second operation.

It can be learned from the foregoing two second operations that, the CP node 01 transfers the virtual MAC address 1 whose load is high on the UP node 022 whose load is high and the virtual MAC address 3 on the UP node 023 whose load is high to the newly added UP node 021, so that load balancing can be performed on the UP node 021, the UP node 022, and the UP node 023.

In the example 2, in the process of the second operation, the CP node may transfer, to the target UP node, the virtual MAC address, on the first UP node, whose load is the highest and that is capable of being accommodated by the remaining load of the target UP node, to update the load of the plurality of UP nodes. Certainly, in the process of the second operation, the CP node may alternatively transfer, to the target UP node, at least one virtual MAC address (including the first virtual MAC address), on the first UP node, that is capable of being accommodated by the remaining load of the target UP node, to update the load of the plurality of UP nodes. In this case, in S602, a sequence in which the CP node determines whether each virtual MAC address on the first UP node is capable of being accommodated by the remaining load of the target UP node may be any sequence. For example, the sequence is the same as or different from a sequence in which the load of the virtual MAC addresses decreases sequentially.

Example 3: The second difference between the quantity of virtual MAC addresses on the first UP node and the reference quantity is greater than m, and the first UP node has the at least one virtual MAC address that is capable of being accommodated by the remaining load of the target UP node. The first virtual MAC address may be a virtual MAC address, on the first UP node, whose load is the lowest and that is capable of being accommodated by the remaining load of the target UP node. The target condition includes: the target UP node is a newly added UP node, and the first difference between the reference quantity and the quantity of virtual MAC addresses on the target UP node is greater than m.

In the communication method obtained by combining the implementations, when a newly added UP node appears in the plurality of UP nodes, if a first difference between the reference quantity and a quantity of virtual MAC addresses on the newly added UP node is greater than m, the CP node may determine that the newly added UP node is the target UP node. In addition, the CP node may further sequentially perform a third operation on each UP node other than the target UP node in the plurality of UP nodes based on that the target UP node is the newly added UP node in the plurality of UP nodes, and the first difference between the reference quantity and the quantity of virtual MAC addresses on the target UP node is greater than m, until the first difference is less than or equal to m. The third operation includes: transferring, by the CP node, at least one virtual MAC address on the first UP node to the target UP node.

For example, as shown in FIG. 9, the third operation includes the following steps.

S701: The CP node determines whether a second difference between a quantity of virtual MAC addresses on a UP node and the reference quantity is greater than m. When the second difference between the quantity of virtual MAC addresses on the UP node and the reference quantity is greater than m, the UP node is determined as the first UP node, and S702 is performed.

Generally, a newly added UP node in the plurality of UP nodes has no virtual MAC address for user access. Therefore, the first difference between the reference quantity and a quantity of virtual MAC addresses on the newly added UP node is generally greater than m. Therefore, when a newly added UP node appears in the plurality of UP nodes, the CP node may select the first UP node from the plurality of UP nodes, to migrate at least a part of the virtual MAC addresses on the first UP node to the target UP node by using the third operation, to facilitate load balancing between the plurality of UP nodes.

In the example 3, the CP node may need to sequentially perform the third operation on each UP node other than the target UP node in the plurality of UP nodes, until the first difference is less than or equal to m. In a process of performing the third operation on a UP node, in S701, the CP node may determine whether a second difference between a quantity of virtual MAC addresses on the UP node and the reference quantity is greater than m; and when the second difference between the quantity of virtual MAC addresses on the UP node and the reference quantity is greater than m, the CP node may determine that the UP node is the first UP node, so that S702 and S703 may be performed to transfer at least a part of the virtual MAC addresses on the first UP node to the newly added target UP node. When the second difference between the quantity of virtual MAC addresses on the UP node and the reference quantity is less than or equal to m, the CP node may determine that the UP node is not the first UP node, stop performing the third operation, and start to perform the third operation on a next UP node.

S702: The CP node sequentially determines, in ascending order of the load of the virtual MAC addresses, whether each virtual MAC address on the first UP node is capable of being accommodated by the remaining load of the target UP node, until at least one virtual MAC address, on the first UP node, that is capable of being accommodated by the remaining load of the target UP node is determined.

After determining the first UP node, the CP node may sequentially determine, in ascending order of the load of the virtual MAC addresses, whether the virtual MAC addresses on the first UP node are capable of being accommodated by the remaining load of the target UP node. In this process, if the CP node finds at least one virtual MAC address, on the first UP node, that is capable of being accommodated by the remaining load of the target UP node, the CP node may stop determining whether a next virtual MAC address is capable of being accommodated by the remaining load of the target UP node.

For example, a quantity of virtual MAC addresses in the at least one virtual MAC address may be x, where x is less than the first difference and the second difference. If the CP node finds the x virtual MAC addresses, on the first UP node, that are capable of being accommodated by the remaining load of the target UP node, the CP node may stop determining whether a next virtual MAC address is capable of being accommodated by the remaining load of the target UP node, and use the x virtual MAC addresses as the at least one virtual MAC address. If the CP node determines, after determining whether all the virtual MAC addresses on the first UP node are capable of being accommodated by the remaining load of the target UP node, y virtual MAC addresses, on the first UP node, that are capable of being accommodated by the remaining load of the target UP node, where $0<y<x$, the CP node may use the y virtual MAC addresses as the at least one virtual MAC address.

The CP node sequentially determines, in ascending order of the load of the virtual MAC addresses, whether the virtual MAC addresses on the first UP node are capable of being accommodated by the remaining load of the target UP node. Therefore, the at least one virtual MAC address determined by the CP node in S702 is at least one virtual MAC address, on the first UP node, whose load is low and that is capable of being accommodated by the remaining load of the target UP node. The at least one virtual MAC address includes the first virtual MAC address, on the first UP node, whose load is the lowest and that is capable of being accommodated by the remaining load of the target UP node.

S703: The CP node transfers the at least one virtual MAC address on the first UP node to the target UP node.

After sifting out the at least one virtual MAC address on the first UP node, the CP node may transfer the at least one virtual MAC address from the first UP node to the target UP node.

In this example, after the CP node completes the third operation on one UP node (S701 to S703) (or the third operation is stopped in an execution process), the quantity of virtual MAC addresses on the target UP node may change. In this case, the first difference between the reference quantity and the quantity of virtual MAC addresses on the target UP node may also change.

If the first difference is still greater than m after the CP node completes the third operation on one UP node (S701 to S703) (or the third operation is stopped in an execution process), the CP node may perform the third operation on a next UP node. In addition, before the CP node may perform the third operation on the next UP node, a virtual MAC address that has been transferred from a UP node does not belong to the UP node, the quantity of virtual MAC addresses on each UP node is updated, and the load of each UP node is also updated.

In addition, if the first difference is less than or equal to m after the CP node completes the third operation on one UP node (S701 to S703) (or the third operation is stopped in an execution process), the CP node does not need to perform the third operation on a next UP node. After the CP node performs the third operation on each UP node other than the target UP node in the plurality of UP nodes, regardless of whether the first difference is greater than m, the CP node stops performing the third operation on the UP node.

It can be learned from the content of the example 3 that, the second difference that is between the quantity of virtual MAC addresses on the first UP node and the reference quantity and that is determined by the CP node in S701 is greater than m, and the first difference between the reference quantity and the quantity of virtual MAC addresses on the target UP node is greater than m. It can be learned that the quantity of virtual MAC addresses on the first UP node is greater than the reference quantity, and the reference quantity is greater than the quantity of virtual MAC addresses on the target UP node. In this way, the at least one virtual MAC address on the first UP node is transferred to the target UP node, so that the quantities of virtual MAC addresses on the first UP node and the target UP node tend to be balanced, and the quantities of virtual MAC addresses on the plurality of UP nodes tend to be balanced. As time goes on, a user goes online and offline continuously, and load of each virtual MAC address tends to be balanced. In this case, if the quantity of virtual MAC addresses on the first UP node and the quantity of virtual MAC addresses on the target UP node tend to be balanced, load of the plurality of UP nodes tends to be balanced.

The at least one virtual MAC address selected by the CP node in S702 is at least one virtual MAC address, on the first UP node, whose load is low and that is capable of being accommodated by the remaining load of the target UP node. In this case, after the CP node transfers the at least one virtual MAC address to the target UP node, the target UP node is not overloaded, to prevent the target UP node from being faulty. In addition, transferring the at least one virtual MAC address to the target UP node does not cause excessively high load of the target UP node, so that load balancing efficiency of the plurality of UP nodes can be improved.

Further, in the foregoing content, the CP node sequentially performs the third operation on each UP node other than the target UP node in the plurality of UP nodes based on that the target UP node is the newly added UP node in the plurality of UP nodes, and the first difference between the reference quantity and the quantity of virtual MAC addresses on the target UP node is greater than m, until the first difference is less than or equal to m. In this way, the CP node transfers the first virtual MAC address in the plurality of virtual MAC addresses from the first UP node in the plurality of UP nodes to the target UP node based on that the target UP node in the plurality of UP nodes satisfies the target condition.

It is assumed that the first UP node is a non-faulty node, the second difference between the quantity of virtual MAC addresses on the first UP node and the reference quantity is greater than m, and the first UP node has the at least one virtual MAC address that is capable of being accommodated by the remaining load of the target UP node. The target condition includes: the first difference between the reference quantity and the quantity of virtual MAC addresses on the target UP node is greater than m. The CP node transfers the at least one virtual MAC address on the first UP node to the target UP node based on that the target UP node satisfies the target condition. The quantity of virtual MAC addresses in the at least one virtual MAC address on the first UP node is less than or equal to the first difference and the second difference, and the at least one virtual MAC address on the first UP node includes the first virtual MAC address. After the CP node transfers the first virtual MAC address in the plurality of virtual MAC addresses from the first UP node in the plurality of UP nodes to the target UP node based on that the target UP node in the plurality of UP nodes satisfies the target condition, the CP node may further transfer at least one virtual MAC address on a second UP node in the plurality of UP nodes to the target UP node based on that the target UP node satisfies an auxiliary condition. The auxiliary condition includes: a third difference between the reference quantity and the quantity of virtual MAC addresses on the target UP node is greater than n, a fourth difference between a quantity of virtual MAC addresses on the second UP node and the reference quantity is greater than or equal to n, and the at least one virtual MAC address on the second UP node is capable of being accommodated by the remaining load of the target UP node, where n>m, and a quantity of virtual MAC addresses in the at least one virtual MAC address on the second UP node is less than or equal to the third difference and the fourth difference.

For example, when the CP node transfers the at least one virtual MAC address on the second UP node in the plurality of UP nodes to the target UP node based on that the target UP node satisfies the auxiliary condition, the CP node may sequentially perform a fourth operation on each UP node other than the target UP node in the plurality of UP nodes based on that the target UP node is a newly added node in the plurality of UP nodes and the third difference is greater than n, until the third difference is less than or equal to n. The fourth operation includes: transferring, by the CP node, the at least one virtual MAC address on the second UP node to the target UP node.

As shown in FIG. 10, the fourth operation includes the following steps.

S801: The CP node determines whether a fourth difference between a quantity of virtual MAC addresses on a UP node and the reference quantity is greater than n. When the fourth difference between the quantity of virtual MAC addresses on the UP node and the reference quantity is greater than n, the UP node is determined as the second UP node, and S802 is performed.

For S801, refer to S701. Details are not described in embodiments of this application again.

S802: The CP node sequentially determines, in ascending order of load of the virtual MAC addresses, whether each virtual MAC address on the second UP node is capable of being accommodated by the remaining load of the target UP node, until at least one virtual MAC address, on the second UP node, that is capable of being accommodated by the remaining load of the target UP node is determined.

For S802, refer to S702. Details are not described in embodiments of this application again.

S803: The CP node transfers the at least one virtual MAC address on the second UP node to the target UP node.

For S803, refer to S703. Details are not described in embodiments of this application again.

In this example, after the CP node completes the fourth operation on one UP node (S801 to S803) (or the fourth operation is stopped in an execution process), the quantity of virtual MAC addresses on the target UP node may change. In this case, the third difference between the reference quantity and the quantity of virtual MAC addresses on the target UP node may also change.

If the third difference is still greater than n after the CP node completes the fourth operation on one UP node (S801 to S803) (or the fourth operation is stopped in an execution process), the CP node may perform the fourth operation on a next UP node. In addition, before the CP node may perform the fourth operation on the next UP node, a virtual MAC address that has been transferred from a UP node does not belong to the UP node, the quantity of virtual MAC addresses on each UP node is updated, and the load of each UP node is also updated.

In addition, if the third difference is less than or equal to n after the CP node completes the fourth operation on one UP node (S801 to S803) (or the fourth operation is stopped in an execution process), the CP node does not need to perform the fourth operation on a next UP node. After the CP node performs the fourth operation on each UP node other than the target UP node in the plurality of UP nodes, regardless of whether the third difference is greater than n, the CP node stops performing the fourth operation on the UP node.

It can be learned from the content of the example 3 that, the fourth difference that is between the quantity of virtual MAC addresses on the second UP node and the reference quantity and that is determined by the CP node in S801 is greater than n, and the third difference between the reference quantity and the quantity of virtual MAC addresses on the target UP node is greater than n. It can be learned that the quantity of virtual MAC addresses on the second UP node is greater than the reference quantity, and the reference quantity is greater than the quantity of virtual MAC addresses on the target UP node. In this way, the at least one virtual MAC address on the second UP node is transferred to the target UP node, so that the quantities of virtual MAC addresses on the second UP node and the target UP node tend to be balanced, and the quantities of virtual MAC addresses on the plurality of UP nodes tend to be balanced. As time goes on, a user goes online and offline continuously, and load of each virtual MAC address tends to be balanced. In this case, if the quantity of virtual MAC addresses on the second UP node and the quantity of virtual MAC addresses on the target UP node tend to be balanced, load of the plurality of UP nodes tends to be balanced.

The at least one virtual MAC address selected by the CP node in S802 is at least one virtual MAC address, on the second UP node, whose load is low and that is capable of being accommodated by the remaining load of the target UP node. In this case, after the CP node transfers the at least one virtual MAC address to the target UP node, the target UP node is not overloaded, to prevent the target UP node from being faulty. In addition, transferring the at least one virtual MAC address to the target UP node does not cause excessively high load of the target UP node, so that load balancing efficiency of the plurality of UP nodes can be improved.

In this example, the reference quantity may be considered as a baseline quantity of virtual MAC addresses on a UP node. When the first difference between the reference quantity and the quantity of virtual MAC addresses on the target UP node is greater than m, the CP node may determine that there is a difference between the quantity of virtual MAC addresses on the target UP node and a quantity of virtual MAC addresses on another UP node. In this case, the CP node may need to transfer the virtual MAC address to the target UP node, to facilitate balancing between the quantities of virtual MAC addresses on the UP nodes. In addition, the first difference between the reference quantity and the quantity of virtual MAC addresses on the target UP node may be further reduced.

After the CP node transfers the virtual MAC address to the target UP node based on that the first difference is greater than m, if the third difference between the reference quantity and the quantity of virtual MAC addresses on the target UP node is greater than n (n>m), the CP node may determine that a difference between the quantity of virtual MAC addresses on the target UP node and a quantity of virtual MAC addresses on another UP node is large. In this case, the CP node may need to continue to transfer the virtual MAC address to the target UP node, to further facilitate balancing between the quantities of virtual MAC addresses on the UP nodes. In addition, the third difference between the reference quantity and the quantity of virtual MAC addresses on the target UP node may be further made less than or equal to n as much as possible, to avoid a case in which a difference between the quantity of virtual MAC addresses on the target UP node and a quantity of virtual MAC addresses on another UP node is large, so as to facilitate load balancing between the plurality of UP nodes.

In addition, if after the CP node transfers the virtual MAC address to the target UP node based on that the first difference is greater than m, the third difference between the reference quantity and the quantity of virtual MAC addresses on the target UP node is less than or equal to n, the CP node may determine that a difference between the quantity of virtual MAC addresses on the target UP node and a quantity of virtual MAC addresses on another UP node is not large, and the quantities of virtual MAC addresses on the UP nodes are balanced. Therefore, the CP node does not need to continue to transfer the virtual MAC address to the target UP node.

It may be understood that, after the CP node transfers the first virtual MAC address in the plurality of virtual MAC addresses from the first UP node in the plurality of UP nodes to the target UP node based on that the target UP node in the plurality of UP nodes satisfies the target condition, the CP node may alternatively transfer the at least one virtual MAC address on the second UP node in the plurality of UP nodes to the target UP node without considering that the target UP node satisfies the auxiliary condition.

Figure 11A:
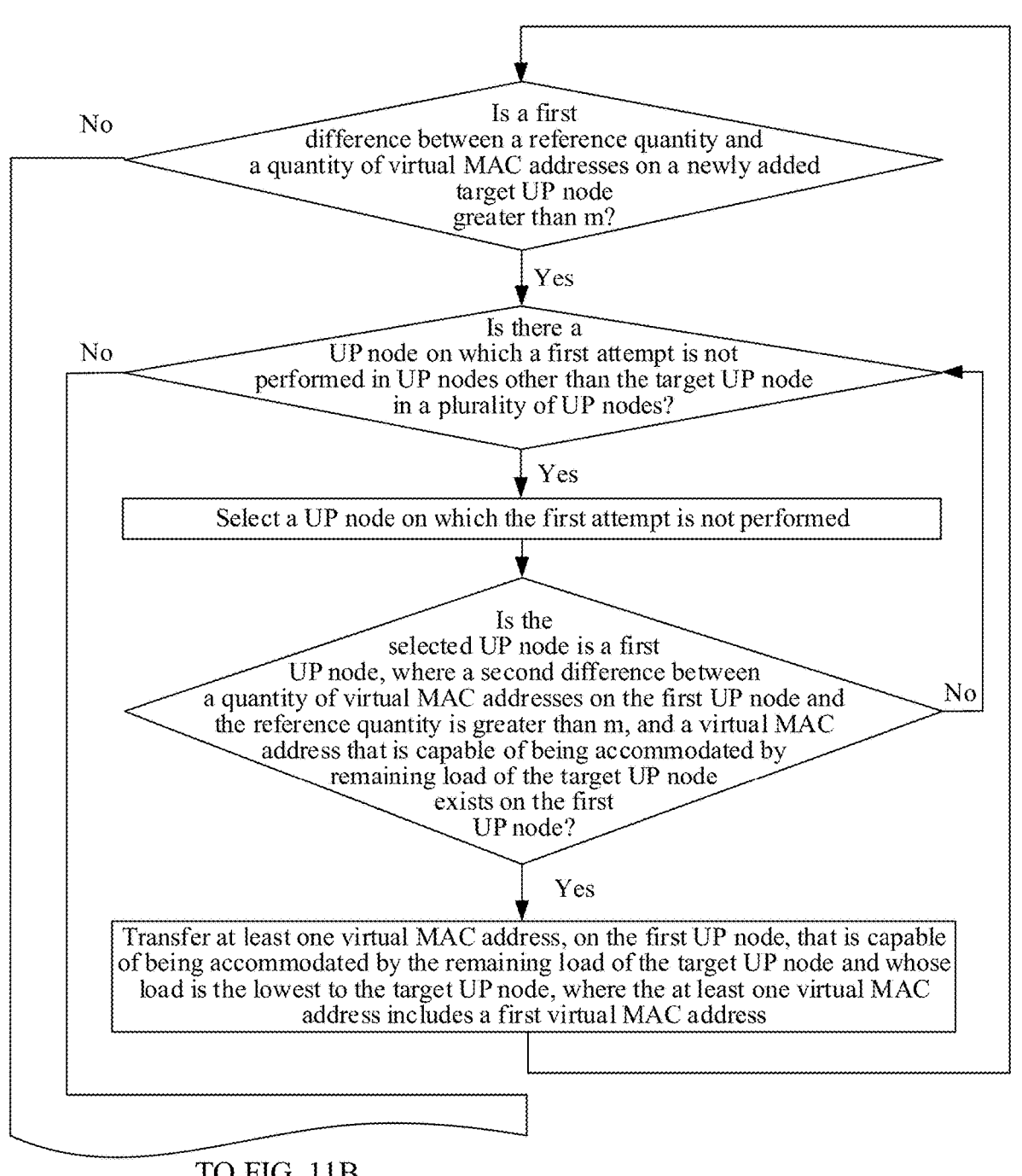
FIG. 11A and FIG. 11B are another flowchart of a communication method according to an embodiment of this application.
Figure 11B:
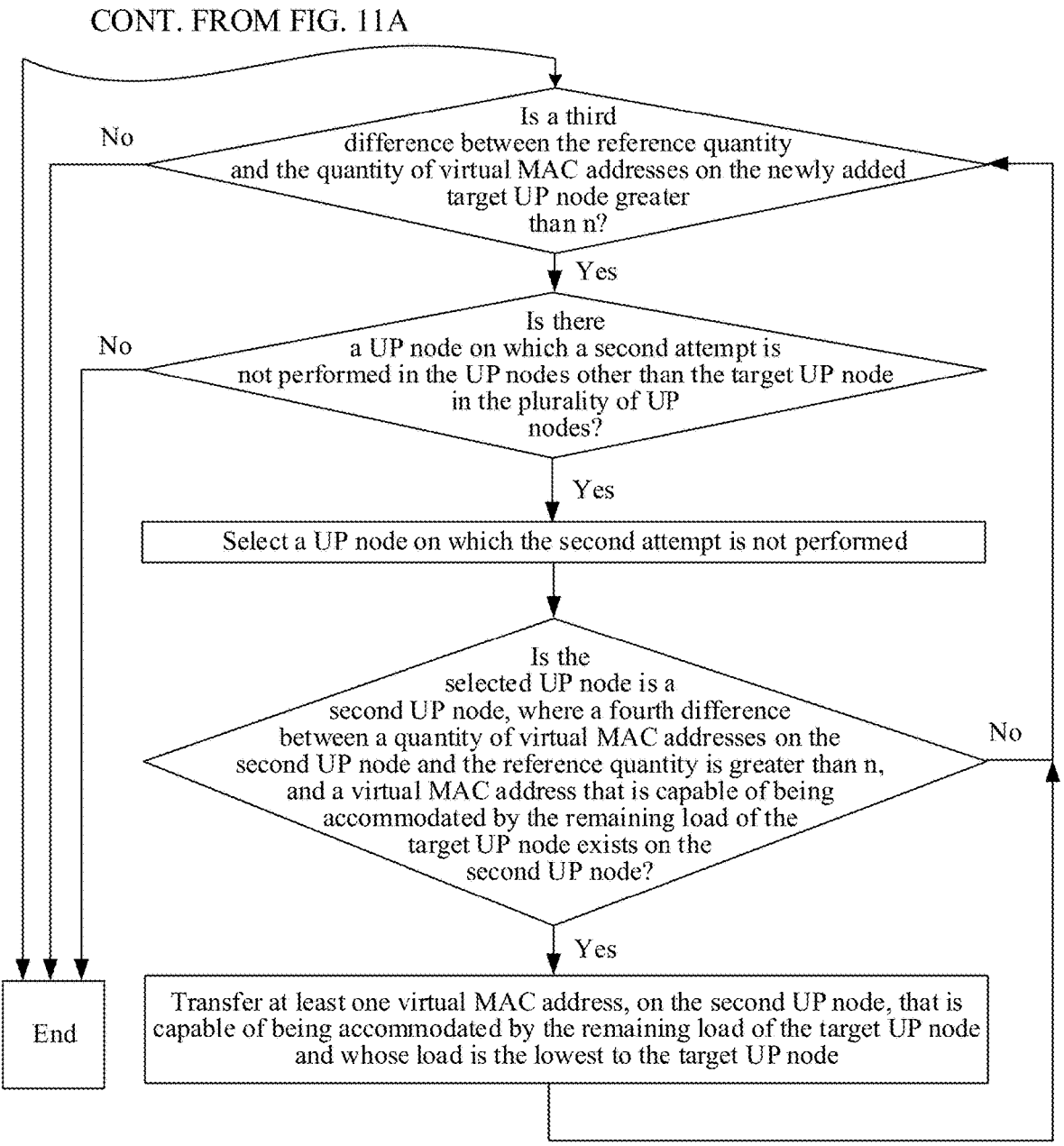

Further, the communication method provided in the example 3 may be represented by using a flowchart shown in FIG. 11A and FIG. 11B. Refer to FIG. 11A and FIG. 11B, in the communication method, when a newly added target UP node appears, the CP node may determine whether a first difference between the reference quantity and a quantity of virtual MAC addresses on the newly added target UP node is greater than m.

If the first difference is greater than m, the CP node determines whether there are UP nodes on which a first attempt is not performed in the UP nodes other than the target UP node in the plurality of UP nodes. When there are UP nodes on which the first attempt is not performed, the CP node may select a UP node on which the first attempt is not performed, and determine whether the UP node is the first UP node, to complete the first attempt on the UP node. When the CP node determines whether the UP node is the first UP node, the CP node may determine whether a second difference between a quantity of virtual MAC addresses on the UP node and the reference quantity is greater than m, and determine whether a virtual MAC address that is capable of being accommodated by the remaining load of the target UP node exists on the UP node.

If the selected UP node is the first UP node, the CP node may transfer, to the target UP node, at least one virtual MAC address, on the first UP node, whose load is the lowest and that is capable of being accommodated by the remaining load of the target UP node. If the selected UP node is not the first UP node, the CP node may re-determine whether there is still a UP node on which the first attempt is not performed.

After the CP node transfers the at least one virtual MAC address on the first UP node to the target UP node, the CP node may re-determine whether the first difference is greater than m. If the first difference is still greater than m, the CP node may continue to transfer the virtual MAC address to the target UP node according to the foregoing method. If the first difference is less than or equal to m, it indicates that there is a large quantity of virtual MAC addresses on the target UP node. In this case, it is not suitable to transfer the virtual MAC address to the target UP node. In this case, the CP node ends the operation.

Further, after determining that the first difference is greater than m, if the CP node determines that there is no UP node on which the first attempt is not performed in the nodes other than the target UP node in the plurality of UP nodes, the CP node may further transfer the virtual MAC address to the target UP node by using another operation, to avoid a case in which the quantity of virtual MAC addresses on the target UP node is less than the reference quantity, and a difference between the quantity of virtual MAC addresses on the target UP node and the reference quantity is large.

For example, the CP node may determine whether a third difference between the reference quantity and the quantity of virtual MAC addresses on the newly added target UP node is greater than n.

If the third difference is greater than n, the CP node determines whether there are UP nodes on which a second attempt is not performed in the UP nodes other than the target UP node in the plurality of UP nodes. When there are UP nodes on which the second attempt is not performed, the CP node may select a UP node on which the second attempt is not performed, and determine whether the UP node is the second UP node, to complete the second attempt on the UP node. When the CP node determines whether the UP node is the second UP node, the CP node may determine whether a fourth difference between a quantity of virtual MAC addresses on the UP node and the reference quantity is greater than n, and determine whether a virtual MAC address that is capable of being accommodated by the remaining load of the target UP node exists on the UP node.

If the selected UP node is the second UP node, the CP node may transfer, to the target UP node, at least one virtual MAC address, on the second UP node, whose load is the lowest and that is capable of being accommodated by the remaining load of the target UP node. If the selected UP node is not the second UP node, the CP node may re-determine whether there is still a UP node on which the second attempt is not performed.

If there is no UP node on which the second attempt is not performed in the UP nodes other than the target UP node in the plurality of UP nodes, the CP node may end the operation.

After the CP node transfers the at least one virtual MAC address on the second UP node to the target UP node, the CP node may re-determine whether the second difference is greater than n. If the second difference is still greater than n, the CP node may continue to transfer the virtual MAC address to the target UP node according to the foregoing method. If the second difference is less than or equal to n, it indicates that a quantity of virtual MAC addresses on the target UP node is not small, and the virtual MAC address may not be transferred to the target UP node any more. In this case, the CP node ends the operation.

The following uses an example to describe the communication method provided in the example 3.

It is assumed that the plurality of UP nodes include the UP node 021, the UP node 022, and the UP node 023 in FIG. 2, the UP node 021 is a newly added UP node, virtual MAC addresses on the UP node 022 include virtual MAC addresses 1 and 2 whose load decreases sequentially, and virtual MAC addresses on the UP node 023 include virtual MAC addresses 3, 4, 5, 6, 7, and 8 whose load decreases sequentially. In this case, the reference quantity $S=((Z-1)/N)+1=((8-1)/3)+1\approx3.3$.

An example in which m=0, n=1, at least one virtual MAC address on the first UP node includes one virtual MAC address, and at least one virtual MAC address on the second UP node includes one virtual MAC address is used.

In this case, a first difference between the reference quantity 3.3 and the quantity 0 of virtual MAC addresses on the UP node 021 is 3.3, and the first difference is greater than m. The CP node 01 may sequentially perform the third operation on the UP nodes 022 and 023 based on that the first difference is greater than m.

When the third operation is performed on the UP node 022, the CP node 01 determines that a second difference −1.3 between the quantity 2 of virtual MAC addresses on the UP node 022 and the reference quantity 3.3 is not greater than m. Therefore, the CP node 01 stops performing the third operation on the UP node 022, and starts to perform the third operation on the UP node 023.

When the third operation is performed on the UP node 023, the CP node 01 determines that a second difference 2.7 between the quantity 6 of virtual MAC addresses on the UP node 023 and the reference quantity 3.3 is greater than m. Therefore, the CP node 01 determines that the UP node 023 is the first UP node, and sequentially determines whether the virtual MAC addresses 8, 7, 6, 5, 4, and 3 on the UP node 023 are capable of being accommodated by remaining load of the UP node 021, until one virtual MAC address, on the UP node 023, that is capable of being accommodated by the remaining load of the UP node 02 is determined. If the virtual MAC address 8 is capable of being accommodated by the remaining load of the UP node 021, the CP node 01 may transfer the virtual MAC address 8 to the UP node 021.

After the CP node 01 sequentially performs the third operation on the UP nodes 022 and 023, a virtual MAC address on the UP node 021 includes the virtual MAC address 8, virtual MAC addresses on the UP node 022 includes the virtual MAC addresses 1 and 2, and virtual MAC addresses on the UP node 023 include the virtual MAC addresses 3, 4, 5, 6, and 7. In this case, in comparison with that before the CP node 01 sequentially performs the third operation on the UP nodes 022 and 023, the first difference decreases, and quantities of virtual MAC addresses on the UP nodes tend to be balanced.

However, after the CP node 01 sequentially performs the third operation on the UP nodes 022 and 023, the CP node 01 further determines that a third difference 2.3 between the reference quantity 3.3 and the quantity 1 of virtual MAC addresses on the UP node 021 is greater than n, indicating that a difference between the quantity of virtual MAC addresses on the current UP node 021 and a quantity of virtual MAC addresses on another UP node is still large. In this case, the CP node 01 may sequentially perform the fourth operation on the UP nodes 022 and 023 based on that the third difference is greater than n, to avoid a case in which a difference between the quantity of virtual MAC addresses on the UP node 021 and a quantity of virtual MAC addresses on another UP node is large.

When the fourth operation is performed on the UP node 022, the CP node 01 determines that a fourth difference −1.3 between the quantity 2 of virtual MAC addresses on the UP node 022 and the reference quantity 3.3 is not greater than n. Therefore, the CP node 01 stops performing the fourth operation on the UP node 022, and starts to perform the fourth operation on the UP node 023.

When the fourth operation is performed on the UP node 023, the CP node 01 determines that a fourth difference 1.7 between the quantity 5 of virtual MAC addresses on the UP node 023 and the reference quantity 3.3 is greater than n. Therefore, the CP node 01 determines that the UP node 023 is the second UP node, and sequentially determines whether the virtual MAC addresses 7, 6, 5, 4, and 3 on the UP node 023 are capable of being accommodated by remaining load of the UP node 021, until one virtual MAC address, on the UP node 023, that is capable of being accommodated by the remaining load of the UP node 02 is determined. If the virtual MAC address 7 is capable of being accommodated by the remaining load of the UP node 021, the CP node 01 may transfer the virtual MAC address 7 to the UP node 021.

After the CP node sequentially performs the fourth operation on the UP nodes 022 and 023, virtual MAC addresses on the UP node 021 includes the virtual MAC addresses 7 and 8, virtual MAC addresses on the UP node 022 include the virtual MAC addresses 1 and 2, and virtual MAC addresses on the UP node 023 include the virtual MAC addresses 3, 4, 5, and 6. In this case, in comparison with that before the CP node 01 sequentially performs the fourth operation on the UP nodes 022 and 023, a difference between the quantity of virtual MAC addresses on the UP node 021 and a quantity of virtual MAC addresses on another UP nodes is reduced, and quantities of virtual MAC addresses on the UP nodes tend to be balanced.

In the example 3, in S702, the CP node sequentially determines, in ascending order of the load of the virtual MAC addresses, whether the virtual MAC addresses on the first UP node are capable of being accommodated by the remaining load of the target UP node, and in S802, the CP node sequentially determines, in ascending order of the load of the virtual MAC addresses, whether the virtual MAC addresses on the second UP node are capable of being accommodated by the remaining load of the target UP node. Certainly, the CP node may alternatively sequentially determine, in another order, whether the virtual MAC addresses on the first UP node are capable of being accommodated by the remaining load of the target UP node, and sequentially determine, in another order, whether the virtual MAC addresses on the second UP node are capable of being accommodated by the remaining load of the target UP node. For example, the another order may be an order in which the load of the virtual MAC addresses decreases sequentially.

In the communication method provided in embodiments of this application, the CP node may perform the method in at least one of the foregoing examples 1, 2, and 3. The foregoing example 1 relates to a scenario in which the first UP node is faulty, and the foregoing examples 2 and 3 relate to a scenario in which the first UP node is not faulty. Generally, there is a low probability that a faulty UP node exists in the plurality of UP nodes. In this case, load balancing between the plurality of UP nodes may be facilitated by using the solutions provided in the foregoing examples 2 and 3.

Further, in embodiments of this application, the CP node may perform a priority allocation operation for a plurality of times (for example, periodically perform the priority allocation operation). When performing each priority allocation operation, the CP node may send, to at least one of the plurality of UP nodes, priorities of responding to a request of a user (also referred to as a request packet sent by the user) by the UP nodes. In addition, when the at least one UP node includes at least two UP nodes, priorities of responding to the request of the user by different UP nodes are different. In addition, in processes of performing different priority allocation operations, the CP node may send, to a same UP node or different UP nodes, a priority of responding to the request of the user by the UP node. This is not limited in embodiments of this application.

After receiving the priority of responding to the request of the user by the UP node, the UP node may determine, based on the priority, a delay of responding to the request of the user by the UP node. The delay of responding to the request of the user by the UP node is negatively correlated with the priority of responding to the request of the user by the UP node. That is, a higher priority of responding to the request of the user by the UP node indicates a shorter delay of responding to the request of the user by the UP node. In this way, a delay of responding to the request of the user by the UP node with the highest priority of responding to the request of the user is the shortest, and a delay of responding to the request of the user by the UP node with the lowest priority of responding to the request of the user is the longest.

Link layer encapsulation on a packet between the user and the UP node may be completed based on an ethernet protocol. In this case, the user and the UP node may be in communication connection by using the point to point protocol (PPP), the internet protocol over ethernet (IPoE), or another protocol. The first request packet (request of the user) sent by the user during an online process is broadcast to the plurality of UP nodes. After a UP node that receives a priority of responding to the request of the user determines a delay based on the priority, the UP node may respond to the request of the user (for example, send, to the user, a response to the request of the user) after the delay. The user may access the first UP node that responds to the request of the user (for example, a UP node with the highest priority of responding to the request of the user or a UP node with the shortest delay of responding to the request of the user). In addition, if a link between the UP node with the highest priority of responding to the request of the user and the user is abnormal, for example, the link is congested or the link is faulty, the user may still access another UP node (for example, a UP node with the second highest priority of responding to the request of the user).

It can be learned that an online user accesses the first UP node that responds to a request of the user, and a sequence in which the UP nodes respond to the request of the user is related to priorities of responding to the user by the UP node. The priority is sent by the CP node when the CP node performs a priority allocation operation. Therefore, the CP node may specify, by performing the priority allocation operation, the UP node to be accessed by the online user. When a UP node with the highest priority of responding to a request of a user changes in two priority allocation operations, a UP node accessed by the online user may also change. This can prevent all online users from accessing a same UP node, to facilitate load balancing between the plurality of UP nodes.

Further, the CP node performs the priority allocation operation for a plurality of times in various manners. The following uses several manners as examples for description.

(1) Manner 1 in which a CP node performs a priority allocation operation for a plurality of times:

As shown in FIG. 12, when a CP node performs a priority allocation operation for a plurality of times, a communication method performed by the CP node may include the following steps.

S901: The CP node sends, to a first UP node in a plurality of UP nodes at a first moment based on quality of a link between each of the plurality of UP nodes and the CP node, a first priority of responding to a request of a user by the first UP node.

S902: The CP node sends, to a second UP node in the plurality of UP nodes at a second moment based on quality of the link between each of the plurality of UP nodes and the CP node, a second priority of responding to the request of the user by the second UP node, where the second UP node is different from the first UP node.

In S901, the CP node performs one priority allocation operation at the first moment, to send, to at least one UP node (including the first UP node), a priority of responding to the request of the user by the UP node. In S902, the CP node performs another priority allocation operation at the second moment, to send, to at least one UP node (including the second UP node different from the first UP node), a priority of responding to the request of the user by the UP node. In this way, the CP node may send, to different first UP nodes and second UP nodes in different priority allocation operations, priorities of responding to the request of the user. When the first UP node is a UP node that has the highest priority of responding to the request of the user and that is in the at least one UP node in S901, and the second UP node is a UP node that has the highest priority of responding to the request of the user and that is in the at least one UP node in S902, the user can access different UP nodes at the first moment and the second moment.

Certainly, the first UP node and the second UP node may alternatively be the same. In this case, the CP node may alternatively send, in different priority allocation operations, priorities of responding to the request of the user to the same first UP node and second UP node. This is not limited in embodiments of this application. In addition, when the CP node performs different priority allocation operations, the first priority that is of responding to the request of the user and that is received by the first UP node may be the same as or different from the second priority that is of responding to the request of the user and that is received by the second UP node. For example, the first priority is higher than the second priority; or the second priority is higher than the first priority.

It should be noted that, in a process in which a user goes online, a request of the user is sent to a UP node. Before responding to the request of the user, the UP node may need to send a packet to the CP node, so that the CP node completes, based on the packet, some operations (such as authentication and authorization) related to the user. Then, the CP node adds results of these operations to a response packet of the packet and feeds back the response packet to the UP node, so that the UP node responds to the request of the user based on the results of these operations. It can be learned that before the UP node responds to the request of the user, the UP node may need to communicate with the CP node, and efficiency of the communication affects efficiency of responding to the request of the user by the UP node. The efficiency of the communication between the UP node and the CP node is positively correlated with quality of a link between the UP node and the CP node. Therefore, the efficiency of responding to the request of the user by the UP node is positively correlated with the quality of the link between the UP node and the CP node. If the quality of the link between the UP node and the CP node is poor, in a user online process, a packet transmitted between the UP node and the CP node may be lost or retransmitted due to problems such as link congestion and low link reliability. Consequently, user online performance is affected, and even the user may fail to access the UP node.

It can be learned from S901 and S902 that in embodiments of this application, when the CP node performs each priority allocation operation, the CP node may send, to the UP node (for example, the first UP node or the second UP node) based on the quality of the link between each of the plurality of UP nodes and the CP node, the priority of responding to the request of the user by the UP node. A UP node with a higher priority in the plurality of UP nodes preferentially responds to the access request of the user. It can be learned that in embodiments of this application, the priority of responding to the request of the user by the UP node is related to the quality of the link between the UP node and the CP node. In this way, the CP node may determine, with reference to the quality of the link between each UP node and the CP node, the priority of responding to the request of the user by the UP node, so that the priority of responding to the request of the user by the UP node is more reasonable.

For example, the priority of responding to the request of the user by a UP node may be positively correlated with the quality of the link between the UP node and the CP node. For example, in one priority allocation operation process, the CP node sends priorities of responding to the request of the user to at least two UP nodes. In addition, for the at least two UP nodes, a UP node with higher quality of a link between the UP node and the CP node has a higher priority of responding to the request of the user, and a UP node with lower quality of a link between the UP node and the CP node has a lower priority of responding to the request of the user. For another example, in different priority allocation operation processes, for two UP nodes that receive priorities of responding to the request of the user, a UP node with higher quality of a link between the UP node and the CP node has a higher priority of responding to the request of the user, and a UP node with lower quality of a link between the UP node and the CP node has a lower priority of responding to the request of the user. For example, when the second priority in S902 is higher than the first priority in S901, the quality of the link between the second UP node and the CP node is higher than the quality of the link between the first UP node and the CP node.

When the priority of responding to the request of the user by the UP node is positively correlated with the quality of the link between the UP node and the CP node, the CP node may set a priority of responding to the request of the user by a UP node with highest quality of a link between the UP node and the CP node to be the highest, so that the user can access the UP node, to ensure high efficiency of responding to the request of the user by the UP node and improve user experience.

Optionally, quality of a link between at least one of the plurality of UP nodes and the CP node changes at the second moment relative to the first moment. It can be learned that when the CP node performs different priority allocation operations, if the quality of the link between at least one of the plurality of UP nodes and the CP node changes, at least one UP node that receives a priority of responding to the request of the user in the different priority allocation operations changes (for example, changes from the first UP node to the second UP node).

In embodiments of this application, in a process of performing the priority allocation operation, the CP node may send, to at least one UP node based on the quality of the link between each UP node and the CP node, a priority of responding to the request of the user by the UP node. In at least one priority allocation operation, for a UP node that receives the priority of responding to the request of the user, quality of a link between the UP node and the CP node is higher than or equal to a quality threshold. In this way, the quality of the link between the UP node that responds to the request of the user (the UP node that receives the priority of responding to the request of the user) and the CP node is high, and it is ensured that efficiency of responding to the request of the user by the UP node is high. However, for a UP node whose quality of a link between the UP node and the CP node is lower than the quality threshold, efficiency of responding to the request of the user by the UP node is low. Therefore, the CP node may not send a priority of responding to the request of the user to the UP node, to prevent the UP node from responding to the request of the user. Certainly, alternatively, in a process of performing the priority allocation operation, the CP node may send, to each UP node, a priority of responding to the request of the user by the UP node, so that each UP node responds to the request of the user. This is not limited in embodiments of this application.

Optionally, in each priority allocation operation performed by the CP node, for a UP node that receives a priority of responding to the request of the user, quality of a link between the UP node and the CP node is higher than or equal to the quality threshold. Alternatively, in some priority allocation operations performed by the CP node, for a UP node that receives a priority of responding to the request of the user, quality of a link between the UP node and the CP node is higher than or equal to a quality threshold. However, in other priority allocation operations performed by the CP node, for a UP node that receives a priority of responding to the request of the user, quality of a link between the UP node and the CP node may alternatively be lower than the quality threshold. For example, in S901, the quality of the link between the first UP node and the CP node is higher than or equal to first quality, and in S902, the quality of the link between the second UP node and the CP node is higher than or equal to second quality. The first quality is a quality threshold in S901, and the second quality is a quality threshold in S902. For another example, in S901, the quality of the link between the first UP node and the CP node is higher than or equal to the first quality; or in S902, the quality of the link between the second UP node and the CP node is higher than or equal to the second quality.

In a priority allocation operation performed by the CP node, if quality of a link between the CP node and a UP node that receives a priority of responding to the request of the user is higher than or equal to the quality threshold, the priority of responding to the request of the user can be prevented from being sent to a UP node whose quality of a link between the UP node and the CP node is lower than the quality threshold, and the UP node is prevented from responding to the request of the user, to ensure reliability of user communication. Certainly, in embodiments of this application, alternatively, in each priority allocation operation, each UP node may receive a priority that is of responding to the request of the user and that is sent by the CP node. This is not limited in embodiments of this application.

Further, for different priority allocation operations, quality thresholds may be the same or may be different. For example, the quality threshold (the first quality) in S901 may be the same as or different from the quality threshold (the second quality) in S902.

The quality of the link between the UP node and the CP node may be measured by using at least one communication parameter between the UP node and the CP node. The at least one communication parameter may include a network layer parameter and/or a link layer parameter between the UP node and the CP node. For example, the at least one parameter may include at least one of a depth of a packet queue from the CP node to the UP node (a network layer parameter) and a quantity of available tokens for sending (a network layer parameter) that are in the CP node and that correspond to the UP node.

For example, quality of a link between a UP node and the CP node is negatively correlated with a depth of a packet queue from the CP node to the UP node. When the depth of the packet queue does not exceed a depth threshold (for example, the depth threshold is 30% of a total depth of the packet queue), the CP node may determine that the link quality is good. When the depth of the packet queue exceeds the depth threshold, the CP node may determine that the link quality is poor; and/or quality of a link between a UP node and the CP node is positively correlated with a quantity of available tokens for sending that are in the CP node and that correspond to the UP node. When the quantity of available tokens for sending that are in the CP node and that correspond to the UP node exceeds a quantity threshold, the CP node may determine that the link quality is good. When the quantity of available tokens for sending that are in the CP node and that correspond to the UP node does not exceed the quantity threshold, the CP node may determine that the link quality is poor.

It should be noted that in a process of communication between a UP node and the CP node, the CP node adds a packet that may need to be sent to the UP node to a packet queue from the CP node to the UP node, and then sequentially sends packets in the packet queue. When quality of a link between the UP node and the CP node is high, most packets to-be-sent by the CP node to the UP node have been sent, there are few packets that wait to be sent in the packet queue, and a length of the packet queue is short. Therefore, quality of a link between a UP node and the CP node is negatively correlated with a depth of a packet queue from the CP node to the UP node.

In addition, a specific quantity of tokens for sending corresponding to each UP node is configured on the CP node. In a process of communication between the UP node and the CP node, each packet sent by the CP node to the UP node may need to carry one token for sending. In addition, after the packet is transmitted to the UP node, a response packet that is of the packet and that is sent by the UP node to the CP node also carries the token for sending. After the CP node sends the packet to the UP node, and before the CP node receives the response packet of the packet, the token for sending that corresponds to the UP node and that is carried in the packet is unavailable. If the CP node may need to send a packet to the UP node in this case, the packet may need to carry another available token for sending corresponding to the UP node. When the quality of the link between the UP node and the CP node is high, for most packets sent by the CP node to the UP node, there are response packets quickly transmitted to the CP node. In this case, on the CP node, there are a large quantity of available tokens for sending corresponding to the UP node. Therefore, the quality of the link between the UP node and the CP node is positively correlated with the quantity of available tokens for sending that are on the CP node and that correspond to the UP node.

The quality of the link between the UP node and the CP node may be quality of the link at a moment or quality of the link in a time period. When the quality of the link between the UP node and the CP node is quality of the link in a time period, that the quality of the link is higher than or equal to a quality threshold means that quality of the link at each moment in the time period (for example, 5 seconds or 6 seconds) is higher than specific quality, or duration in which the quality of the link is lower than the quality in the time period (for example, 5 seconds or 6 seconds) is less than a duration threshold, where the duration threshold is less than duration of the time period. When the quality of the link between the UP node and the CP node is quality of the link in a time period, by detecting the quality of the link in the time period, it can be ensured that the quality that is of the link and that is determined by the CP node is accurate, to avoid a case in which the link is unstable and affect user online.

(2) Manner 2 in which a CP node performs a plurality of priority allocation operations:

Based on the foregoing manner (1) in which the CP node performs the plurality of priority allocation operations, the priority of responding to the request of the user by the UP node is positively correlated with the quality of the link between the UP node and the CP node, and may further negatively correlated with load of the UP node.

When the priority of responding to the request of the user by the UP node is negatively correlated with the load of the UP node, if the load of the UP node is high, it indicates that the UP node is not suitable for being accessed by more users. Therefore, the CP node may appropriately reduce the priority of responding to the request of the user by the UP node. If the load of the UP node is low, it indicates that more users may further be accessed to the UP node. Therefore, the CP node may appropriately increase the priority of responding to the request of the user by the UP node. In this way, when determining a UP node to be accessed by a user, the CP node may consider quality of a link between the UP node and the CP node, and may further consider load of the UP node, so as to avoid overload of the UP node and facilitate load balancing between the plurality of UP nodes.

For example, a priority of responding to the request of the user by a UP node is negatively correlated with a priority parameter of the UP node. The priority parameter P of the UP node is equal to $L*C1+(1-R)*C2$, where L represents load (for example, a load rate) of the UP node, R represents quality (which may be represented by a percentage) of a link between the UP node and the CP node, C1 and C2 are both constants, and $C1+C2=1$. Optionally, C2 may be greater than C1, or C2 may be less than C1, or C2 may be equal to C1. When C2 is greater than C1, the quality of the link between the UP node and the CP node has high impact on the priority of responding to the request of the user by the UP node, to avoid poor quality of a link between a UP node with a highest priority of responding to the request of the user and the CP node. When C1 is greater than C2, the load of the UP node has high impact on the priority of responding to the request of the user by the UP node, to avoid high load of a UP node with a highest priority of responding to the request of the user. When C2 is equal to C1, the quality of the link between the UP node and the CP node and the load of the UP node have the same impact on the priority of responding to the request of the user by the UP node.

Optionally, similar to the manner 1, in the manner 2, in each priority allocation operation performed by the CP node, for a UP node that receives a priority of responding to the request of the user, quality of a link between the UP node and the CP node is higher than or equal to the quality threshold. Alternatively, in some priority allocation operations performed by the CP node, for a UP node that receives a priority of responding to the request of the user, quality of a link between the UP node and the CP node is higher than or equal to the quality threshold. However, in some other priority allocation operations performed by the CP node, for a UP node that receives a priority of responding to the request of the user, quality of a link between the UP node and the CP node may alternatively be lower than the quality threshold. Alternatively, in each priority allocation operation performed by the CP node, each UP node receives a priority of responding to the request of the user.

(3) Manner 3 in which a CP node performs a plurality of priority allocation operations:

When the CP node performs a plurality of priority allocation operations, a UP node with a highest priority of responding to a request of a user performs polling among a plurality of UP nodes. In this way, the plurality of UP nodes can access users in sequence, to facilitate load balancing between the UP nodes.

Optionally, when the CP node performs the plurality of priority allocation operations, when a UP node with a highest priority of responding to the request of the user is polled to a UP node, and the UP node satisfies a skip condition, the CP node may skip the UP node, and set a next UP node of the UP node to the UP node with the highest priority of responding to the request of the user. The skip condition may include: quality of a link between the UP node and the CP node is lower than a quality threshold, and/or load of the UP node is higher than a load threshold. In this way, the UP node that satisfies the skip condition can be prevented from being set as the UP node with the highest priority of responding to the request of the user, and a user is prevented from accessing these UP nodes, to ensure user online efficiency.

(4) Manner 4 in which a CP node performs a plurality of priority allocation operations:

When the CP node performs each priority allocation operation, the CP node sets a UP node whose load is the lowest as a UP node with a highest priority of responding to a request of a user. In this way, the user can access the UP node whose load is currently the lowest, to prevent the UP node from being overloaded and promote load balancing between a plurality of UP nodes. It should be noted that, as the user goes online and offline, load of each UP node changes; and when the CP node performs different priority allocation operations, the UP node whose load is the lowest may change or may not change.

Further, regardless of a priority allocation operation manner used by the CP node, in each priority allocation operation process, for a UP node that receives a response to the request of the user, the CP node or the UP node may need to specify a virtual MAC address that is to be accessed by the user and that is responded by the UP node. The MAC address may be any virtual MAC address of the UP node. After the request of the user broadcast by the user is sent to each UP node, if the UP node may need to respond to the request of the user, when responding to the request of the user, the UP node may further need to add a virtual MAC address to be accessed by the user.

The virtual MAC address may be specified by the UP node or the CP node. When the virtual MAC address is specified by the CP node, the CP node may add, to a same packet (or different packets), a priority of responding to the request of the user by the UP node and a virtual MAC address used by the UP node to respond to the request of the user, and send the same packet (or the different packets) to the UP node. When the virtual MAC address is specified by the UP node, after receiving a priority of responding to the request of the user each time, the UP node may specify a virtual MAC address as the virtual MAC address to be accessed by the user.

The CP node or UP node may select a virtual MAC address to be accessed by the user on the UP node according to a load balancing policy. For example, in a process of the plurality of priority allocation operations, a virtual MAC address to be accessed by the user on the UP node is polled among virtual MAC addresses on the UP node, to promote load balancing between the virtual MAC addresses. Alternatively, in a process of each priority allocation operation, a virtual MAC address to be accessed by the user on the UP node is a virtual MAC address whose load is the lowest in virtual MAC addresses on the UP node, to prevent some virtual MAC addresses from being overloaded and promote load balancing between the virtual MAC addresses.

It can be learned from the foregoing content that, in the communication method provided in this application, the CP node may consider load balancing between the plurality of UP nodes, and may further consider load balancing between the plurality of virtual MAC addresses on the plurality of UP nodes. In this way, no virtual MAC address with excessively heavy load exists in the plurality of virtual MAC addresses. When the CP node transfers a virtual MAC address on a UP node (for example, a faulty UP node) to another UP node, it may be easy to find a target UP node whose remaining load is capable of accommodating the virtual MAC address, so that the virtual MAC address has a high transfer success rate. In addition, because load of the virtual MAC addresses is balanced, and load balancing between the UP nodes is also considered during transferring the virtual MAC addresses, the transferred virtual MAC addresses can be evenly transferred to the plurality of UP nodes. After the virtual MAC address is transferred, the UP nodes may have similar load, so that the load of the UP nodes can be balanced.

Further, an embodiment of this application further provides a broadband network access method, applied to a CU-separated BNG system. The CU-separated BNG system is a BNG system including a CP and a UP. The BNG system is also referred to as a vBNG system.

For example, the BNG system includes a first UP and a second UP. The broadband network access method provided in this embodiment of this application includes: The first UP enables a first user to access a network; the second UP enables a second user to access the network; and the second UP enables the first user to access the network when the first UP is faulty. It can be learned that, both the first UP and the second UP can enable the user to access the network; and when the first UP is faulty, the first user that originally accesses the network by using the first UP may access the network by using the second UP. In addition, before the first UP is faulty, the second UP may further enable the second user to access the network, that is, an N+1 warm backup technology is implemented between the first UP and the second UP, to avoid resource idleness of the second UP.

For another example, the BNG system includes a first UP, a second UP, and a third UP. The broadband network access method provided in this embodiment of this application includes: The first UP enables a first user and a second user to access a network; the second UP enables a third user to access the network; the third UP enables a fourth user to access the network; and when the first UP is faulty, the second UP enables the first user to access the network, and the third UP enables the second user to access the network. It can be learned that, the first UP, the second UP, and the third UP all can enable the user to access the network; and when the first UP is faulty, the first user and the second user that originally access the network by using the first UP may access the network by using the second UP and the third UP. The first user accesses the network by using the third UP, and the second user accesses the network by using the fourth UP. In this way, load balancing can be implemented between the second UP and the third UP, to avoid overload of the second UP or the third UP and prevent the second UP or the third UP from being faulty when both the first user and the second user access the second UP or the third UP. In addition, before the first UP is faulty, the second UP may further enable the third user to access the network, and the third UP may further enable the fourth user to access the network, that is, an N+1 warm backup technology is implemented between the first UP, the second UP, and the third UP, to avoid resource idleness of the second UP and the third UP.

The foregoing describes in detail the communication method provided in this application with reference to FIG. 1 to FIG. 12. It may be understood that, to implement the functions described in the foregoing methods, a device may need to include corresponding hardware and/or software modules for performing the functions. This application can be implemented in a form of hardware or a combination of hardware and computer software with reference to the execution processes of the methods described in embodiments disclosed in this specification. Whether a function is performed by hardware or hardware driven by computer software depends on particular applications and design constraints of the technical solutions. A person skilled in the art may use different manners to implement the described functions for each particular application with reference to embodiments, but it should not be considered that the implementation goes beyond the scope of this application.

In this embodiment, a corresponding device may be divided into functional modules based on the foregoing method embodiments. For example, functional modules may be obtained through division based on corresponding functions, or two or more functions may be integrated into one processing module. The integrated module may be implemented in a form of hardware. It should be noted that in embodiments, division into the modules is an example, and is specifically a possible logical function division. During actual implementation, another division manner may be used.

When a functional module division manner is used, the following describes communication apparatuses provided in this application with reference to FIG. 13 and FIG. 14.

FIG. 13 is a block diagram of a communication apparatus according to an embodiment of this application. For example, the communication device may belong to the CP node in the foregoing embodiments. The communication apparatus includes a first transfer module 1001.

The first transfer module 1001 is configured to transfer a first virtual MAC address in a plurality of virtual MAC addresses from a first UP node in a plurality of UP nodes to a target UP node based on that the target UP node in the plurality of UP nodes satisfies a target condition, where the target condition is related to load of the target UP node. For an operation performed by the first transfer module 1001, refer to related descriptions in the foregoing embodiment. Details are not described in this embodiment of this application.

In a related technology in which an N:1 warm backup technology is used, when transferring the virtual MAC address, the CP node does not consider the load-related target condition, but directly transfers the virtual MAC address to a backup UP node. When the CP node transfers different virtual MAC addresses to a fixed backup UP node for a plurality of times, the backup UP node is easily overloaded and faulty. However, in this application, when transferring the virtual MAC address, the CP node may need to consider that the target UP node satisfies the load-related target condition, so that the first virtual MAC address can be transferred to the target UP node. It can be learned that this application provides another manner for transferring a virtual MAC address by a CP node, to enrich functions of the CP node. In addition, in this application, when the CP node performs the operation of transferring the first virtual MAC address for a plurality of times, a plurality of target UP nodes selected for a plurality of times based on the target condition may be different. In this way, the plurality of first virtual MAC addresses transferred for the plurality of times may be transferred to different target UP nodes, to reduce a probability that one UP node is overloaded and faulty because the plurality of first virtual MAC addresses is transferred to the UP node.

In addition, in the related technology in which the N:1 warm backup technology is used, before the CP node transfers the virtual MAC address to the backup UP node, the backup UP node has no virtual MAC address for user access. As a result, resource idleness of the backup UP node is caused. However, in this application, the plurality of UP nodes has the plurality of virtual MAC addresses for user access, and in embodiments of this application, that each of the plurality of UP nodes has a virtual MAC address for user access is used as an example. For example, before the first virtual MAC address is transferred from the first UP node to the target node, the target node may have another virtual MAC address, for example, a second virtual MAC address. This may also be referred to as an N+1 warm backup technology. In this case, the CP node determines the target UP node in the plurality of UP nodes that have the virtual MAC addresses, and transfers the first virtual MAC address to the target UP node. In addition, before the CP node transfers the first virtual MAC address to the target UP node, because the target UP node has the virtual MAC address for user access, the target UP node can also communicate with a user, to avoid resource idleness of the target UP node and improve communication efficiency of the vBNG system. In this application, the N+1 warm backup technology is used, and an active UP node and a backup UP node in the plurality of UP nodes may not be distinguished.

It should be noted that the load of the target UP node may be related to at least one parameter of the target UP node, and the load of the target UP node may be measured by using the at least one parameter. For example, the at least one parameter includes a quantity of users, user bandwidth, and the like carried on the target UP node. For example, the load of the target UP node is positively correlated with the quantity of users carried on the target UP node. The target UP node has one or more virtual MAC addresses for user access, the virtual MAC address may be used for carrying a user, and the quantity of users carried on the target UP node may be a sum of quantities of users carried on all the virtual MAC addresses on the target UP node.

Further, in embodiments of this application, the CP node transfers the first virtual MAC address from the first UP node to the target UP node based on that the target UP node satisfies the target condition. Herein, the first UP node, the first virtual MAC address, and the target UP node may all have a plurality of implementations.

(1) For the first virtual MAC address, the first virtual MAC address may be any virtual MAC address on the first UP node.

Optionally, the first virtual MAC address may be a virtual MAC address randomly selected by the first transfer module 1001 on the first UP node.

Alternatively, before the first transfer module 1001 transfers the first virtual MAC address to the target UP node, the first virtual MAC address may be a virtual MAC address, on the first UP node, whose load is the highest and that is capable of being accommodated by remaining load of the target UP node. In this case, transferring the first virtual MAC address to the target UP node can greatly reduce load of the first UP node, and facilitate load balancing between the plurality of UP nodes.

Alternatively, before the first transfer module 1001 transfers the first virtual MAC address to the target UP node, the first virtual MAC address may be a virtual MAC address, on the first UP node, whose load is the lowest and that is capable of being accommodated by remaining load of the target UP node. In this case, transferring the first virtual MAC address to the target UP node can reduce load of the first UP node, and the load of the target UP node is not high, so that a probability of implementing load balancing between the plurality of UP nodes is increased.

Alternatively, before the first transfer module 1001 transfers the first virtual MAC address to the target UP node, the first virtual MAC address may be a virtual MAC address for user access, on the first UP node, whose load is the lowest and that is capable of being accommodated by remaining load of the target UP node. In this case, transferring the first virtual MAC address to the target UP node can reduce load of the first UP node, and the load of the target UP node is not high, so that a probability of implementing load balancing between the plurality of UP nodes is increased. In addition, because a user is accessed by using the first virtual MAC address, the user accessed by using the first virtual MAC address may be further transferred to the target UP node.

It should be noted that the load of the virtual MAC address may be related to at least one parameter of the virtual MAC address, and the at least one parameter may be used for measuring the load of the virtual MAC address. For example, the at least one parameter includes a quantity of users, user bandwidth, and the like carried on the virtual MAC address. For example, the load of the virtual MAC address is positively correlated with the quantity of users carried on the virtual MAC address.

(2) For the target UP node, the target UP node satisfies the target condition, and the target condition may be any load-related condition.

(2.1) For example, the target condition includes: the remaining load of the target UP node is capable of accommodating the first virtual MAC address. In this case, after the first transfer module 1001 transfers the first virtual MAC address to the target UP node, the target UP node is not overloaded, to prevent the target UP node from being faulty.

(2.2) For another example, the target condition includes: the target UP node is a UP node, in UP nodes other than the first UP node in the plurality of UP nodes, whose remaining load is capable of accommodating the first virtual MAC address and whose load is the lowest. In this way, transferring the first virtual MAC address to the target UP node does not cause the load of the target UP node to far exceed load of a remaining UP node, and load balancing between the plurality of UP nodes can be facilitated.

(2.3) For still another example, the target condition includes: the load of the target UP node is less than the load of the first UP node. In this case, after the first transfer module 1001 transfers the first virtual MAC address to the target UP node, the load of the first UP node can be reduced, and the load of the target UP node can be increased, so that load of the plurality of UP nodes can be balanced.

(2.4) For still another example, the target condition includes: a quantity of virtual MAC addresses on the target UP node is less than a quantity of virtual MAC addresses on the first UP node.

It should be noted that, when the target condition includes that the quantity of virtual MAC addresses on the target UP node is less than the quantity of virtual MAC addresses on the first UP node, transferring the first virtual MAC address from the first UP node to the target UP node can make the quantity of virtual MAC addresses on the first UP node and the quantity of virtual MAC addresses on the target UP node tend to be balanced. As time goes on, a user goes online and offline continuously, and load of each virtual MAC address tends to be balanced. In this case, if the quantity of virtual MAC addresses on the first UP node and the quantity of virtual MAC addresses on the target UP node tend to be balanced, load of the plurality of UP nodes tends to be balanced.

(2.5) For still another example, the target condition includes: a first difference between a reference quantity and the quantity of virtual MAC addresses on the target UP node is greater than m, where m≥0, the reference quantity $S=((Z-1)/N)+1$, Z represents a quantity of virtual MAC addresses in the plurality of virtual MAC addresses, and N represents a quantity of UP nodes in the plurality of UP nodes.

The reference quantity is related to an average value of the virtual MAC addresses on the plurality of UP nodes. When the first difference between the reference quantity and the quantity of virtual MAC addresses on the target UP node is greater than m, it indicates that the quantity of virtual MAC addresses on the target UP node is small. In this case, the virtual MAC address may need to be transferred to the target UP node, so that the quantities of virtual MAC addresses on the plurality of UP nodes tend to be balanced. As time goes on, a user goes online and offline continuously, and load of each virtual MAC address tends to be balanced. In this case, if the quantities of virtual MAC addresses on the plurality of UP nodes tend to be balanced, load of the plurality of UP nodes tends to be balanced.

(2.6) For still another example, the target condition includes: the target UP node is a newly added UP node in the plurality of UP nodes, and the newly added UP node have no a virtual MAC address for user access. The newly added UP node may be a UP node that is re-added to the plurality of UP nodes after a fault is rectified, or may be a UP node that is not faulty and that has not been added to the plurality of UP nodes. In this application, an example in which the target UP node is a newly added UP node is used. Certainly, the target UP node may not be a newly added UP node. This is not limited in this application.

In this application, the foregoing (2.1) to (2.6) provide a total of six conditions in the target condition. It may be understood that the target condition may include at least one of the six conditions. This is not limited in this application. When the target condition includes at least two of the six conditions, the target UP node may need to satisfy the at least two conditions, and the first transfer module 1001 may need to search, based on the at least two conditions, for the target UP node that satisfies the at least two conditions.

(3) For the first UP node, the first UP node may be any UP node in the plurality of UP nodes.

Optionally, the first UP node may be a faulty node or a non-faulty node in the plurality of UP nodes.

In one aspect, when the first UP node is a faulty node, and when transferring the first virtual MAC address from the first UP node to the target UP node based on that the target UP node satisfies the target condition, the first transfer module 1001 may transfer the first virtual MAC address from the first UP node to the target UP node based on that the target UP node satisfies the target condition and the first UP node is faulty. It can be learned that, when the faulty node (the first UP node) occurs in the plurality of UP nodes and the target UP node satisfies the target condition, the CP node may transfer the first virtual MAC address on the first UP node to the target UP node, to avoid communication interruption that is of a user accessed by using the first virtual MAC address and that is caused by the fault of the first UP node.

In another aspect, when the first UP node is a non-faulty node, the first transfer module 1001 transfers the first virtual MAC address from the first UP node to the target UP node, so that a user carried on the first virtual MAC address can be transferred from the first UP node to the target UP node, and the user can be unaware of the transfer.

Optionally, when the first UP node is a non-faulty node, the first UP node is a UP node, in the plurality of UP nodes, whose load is the highest and that has a virtual MAC address that is capable of being accommodated by the remaining load of the target UP node. In this case, the first virtual MAC address is transferred from the first UP node to the target UP node, so that load of the first UP node can be reduced, overload of the first UP node can be avoided, and load balancing between the plurality of UP nodes is facilitated.

It may be understood that, when the first UP node is a non-faulty node, the first UP node may alternatively be implemented in another manner.

For example, when the first UP node is a non-faulty node, the first UP node may alternatively be a UP node randomly selected by the first transfer module 1001 from the plurality of UP nodes.

For another example, when the first UP node is a non-faulty node, the first UP node may alternatively be a UP node whose second difference between the quantity of virtual MAC addresses and the reference quantity is greater than m, where m≥0, the reference quantity $S=((Z-1)/N)+1$, Z indicates the quantity of virtual MAC addresses in the plurality of virtual MAC addresses, and N indicates the quantity of UP nodes in the plurality of UP nodes.

It should be noted that the reference quantity is related to the average value of the virtual MAC addresses on the plurality of UP nodes. When the second difference between the quantity of virtual MAC addresses on the first UP node and the reference quantity is greater than m, it indicates that the quantity of virtual MAC addresses on the first UP node is large. In this case, the first virtual MAC address on the first UP node may need to be transferred to another UP node, so that the quantities of virtual MAC addresses on the plurality of UP nodes tend to be balanced. As time goes on, a user goes online and offline continuously, and load of each virtual MAC address tends to be balanced. In this case, if the quantities of virtual MAC addresses on the plurality of UP nodes tend to be balanced, load of the plurality of UP nodes tends to be balanced.

In this application, an example in which when the second difference between the quantity of virtual MAC addresses on the first UP node and the reference quantity is greater than m, and the first UP node has at least one virtual MAC address that is capable of being accommodated by the remaining load of the target UP node, the target condition includes that the first difference between the reference quantity and the quantity of virtual MAC addresses on the target UP node is greater than m is used. In this case, when transferring the first virtual MAC address from the first UP node in the plurality of UP nodes to the target UP node, the first transfer module 1001 may transfer at least one virtual MAC address on the first UP node from the first UP node to the target UP node. A quantity of virtual MAC addresses in the at least one virtual MAC address on the first UP node is less than or equal to the first difference and the second difference, and the at least one virtual MAC address includes the first virtual MAC address. When the at least one virtual MAC address includes a plurality of virtual MAC addresses, the first transfer module 1001 may transfer the plurality of virtual MAC addresses from the first UP node to the target UP node once, and efficiency of balancing the quantity of virtual MAC addresses on the first UP node and the quantity of virtual MAC addresses on the target UP node can be improved.

The foregoing describes the plurality of implementations of the first UP node, the plurality of implementations of the first virtual MAC address, and the plurality of implementations of the target UP node (related to the plurality of implementations of the target condition) in this application. It may be understood that any implementation of the first UP node, any implementation of the first virtual MAC address, and any implementation of the target UP node in this application may be mutually combined, and all obtained communication apparatuses fall within the protection scope of this application.

The following uses three examples to describe the communication apparatus protected in this application.

Example 1: If the first transfer module 1001 transfers the first virtual MAC address from the first UP node to the target UP node based on that the target UP node satisfies the target condition and the first UP node is faulty, based on that the first UP node is faulty, when a virtual MAC address for user access exists on the first UP node, the first transfer module 1001 may perform a first operation at least once until no virtual MAC address for user access exists on the first UP node, or until no UP node whose remaining load is capable of accommodating the first virtual MAC address exists in the UP nodes other than the first UP node in the plurality of UP nodes, where the first operation includes: sifting out the first virtual MAC address whose load is the highest from virtual MAC addresses for user access on the first UP node; sequentially determining, in ascending order of load of the UP nodes, whether remaining load of each UP node other than the first UP node in the plurality of UP nodes is capable of accommodating the first virtual MAC address until the target UP node is determined; and transferring the first virtual MAC address to the target UP node.

In the example 1, the first UP node may be a faulty node, and the first virtual MAC address may be a virtual MAC address for user access, on the first UP node, whose load is the highest and that is capable of being accommodated by remaining load of the target UP node. The target condition may include: the target UP node is a UP node, in UP nodes other than the first UP node in the plurality of UP nodes, whose remaining load is capable of accommodating the first virtual MAC address and whose load is the lowest.

It can be learned from the content of this example that the first transfer module 1001 sifts out the first virtual MAC address from the virtual MAC addresses for user access on the first UP node. In this case, after the first operation is repeatedly performed for a plurality of times, a case in which all the virtual MAC addresses for user access on the faulty first UP node are transferred to another UP node exists. In this way, users carried on the faulty first UP node can be transferred to another UP node, so that communication of these users is ensured.

The first transfer module 1001 sifts out the first virtual MAC address whose load is the highest from the virtual MAC addresses for user access on the first UP node. In this case, transferring the first virtual MAC address to the target UP node by the first transfer module 1001 can greatly reduce the load of the first UP node, and ensure that communication of a large quantity of users carried on the first UP node (users carried on the first virtual MAC address) is not interrupted. If the first transfer module 1001 repeatedly performs the first operation for a plurality of times, the first transfer module 1001 may transfer, in descending order of the load of the virtual MAC addresses, the virtual MAC address for user access on the first UP node, to ensure that communication of a large quantity of users carried on the first UP node is not interrupted.

The remaining load of the target UP node selected by the first transfer module 1001 is capable of accommodating the first virtual MAC address. In this case, after the first transfer module 1001 transfers the first virtual MAC address to the target UP node, the target UP node is not overloaded, to prevent the target UP node from being faulty. In addition, the first transfer module 1001 sequentially determines, in ascending order of the load of the UP nodes, whether the remaining load of each UP node other than the first UP node in the plurality of UP nodes is capable of accommodating the first virtual MAC address until the target UP node is determined. In this way, the target UP node selected by the first transfer module 1001 is a UP node, in the UP nodes other than the first UP node in the plurality of UP nodes, whose remaining load is capable of accommodating the first virtual MAC address and whose load is the lowest, and transferring the first virtual MAC address to the target UP node does not cause the load of the target UP node to far exceed load of another UP node, and load balancing between the plurality of UP nodes can be facilitated.

Example 2: If the first transfer module 1001 transfers the first virtual MAC address in the plurality of virtual MAC addresses from the first UP node in the plurality of UP nodes to the target UP node based on that the target UP node in the plurality of UP nodes satisfies the target condition, when the target UP node is not a UP node whose load is the highest in the plurality of UP nodes, the first transfer module 1001 may perform a second operation at least once until the target UP node is the UP node whose load is the highest in the plurality of UP nodes, or until no virtual MAC address that is capable of being accommodated by the remaining load of the target UP node exists on the UP node whose load is the highest in the plurality of UP nodes. The second operation includes: sifting out the first UP node whose load is the highest from the plurality of UP nodes; and transferring at least one virtual MAC address on the first UP node to the target UP node, to update load of the plurality of UP nodes, where the at least one virtual MAC address includes the first virtual MAC address.

In the example 2, the first UP node may be a UP node, in UP nodes other than the target UP node in the plurality of UP nodes, that has a virtual MAC address whose load is the highest and that is capable of being accommodated by the remaining load of the target UP node. The first virtual MAC address may be a virtual MAC address, on the first UP node, whose load is the highest and that is capable of being accommodated by the remaining load of the target UP node. The target condition may include: the target UP node is a newly added UP node.

It can be learned from the content of this example that, the first transfer module 1001 sifts out the first UP node whose load is the highest from the plurality of UP nodes. In this case, transferring the first virtual MAC address to the target UP node by the first transfer module 1001 can greatly reduce the load of the first UP node, prevent the first UP node from being faulty because of excessively high load, and ensure that communication of a large quantity of users carried on the first UP node (users carried on the first virtual MAC address) is not interrupted. After the second operation is repeatedly performed for a plurality of times, the first transfer module 1001 can transfer at least a part of virtual MAC addresses on a UP node whose load is high in the plurality of UP nodes to the target UP node, to facilitate load balancing between the plurality of UP nodes.

The first transfer module 1001 sequentially determines, in descending order of the load of the virtual MAC addresses, whether each virtual MAC address of the first UP node is capable of being accommodated by the remaining load of the target UP node, until the first virtual MAC address is determined. In this way, the first virtual MAC address selected by the first transfer module 1001 is a virtual MAC address whose load is the highest in virtual MAC addresses, on the first UP node, that are capable of being accommodated by the remaining load of the target UP node. Transferring the first virtual MAC address to the target UP node can improve load balancing efficiency of the plurality of UP nodes.

In addition, when the first virtual MAC address selected by the first transfer module 1001 is a virtual MAC address, on the first UP node, whose load is the lowest and that is capable of being accommodated by the remaining load of the target UP node, the first transfer module 1001 may sequentially determine, in ascending order of the load of the virtual MAC addresses, whether each virtual MAC address on the first UP node is capable of being accommodated by the remaining load of the target UP node until the first virtual MAC address is determined.

Example 3: If the first transfer module 1001 transfers the at least one virtual MAC address on the first UP node from the first UP node to the target UP node based on that the target UP node in the plurality of UP nodes satisfies the target condition, when the first difference is greater than m, the first transfer module 1001 sequentially performs a third operation on each UP node other than the target UP node in the plurality of UP nodes until the first difference is less than or equal to m. The third operation includes: transferring the at least one virtual MAC address on the first UP node to the target UP node, to update a quantity of virtual MAC addresses on each UP node.

In the example 3, the second difference between the quantity of virtual MAC addresses on the first UP node and the reference quantity may be greater than m. The first virtual MAC address may be a virtual MAC address, on the first UP node, whose load is the lowest and that is capable of being accommodated by the remaining load of the target UP node. The target condition may include: the target UP node is a newly added UP node, and the first difference between the reference quantity and the quantity of virtual MAC addresses on the target UP node is greater than m.

It can be learned from the content of the example 3 that, the second difference that is between the quantity of virtual MAC addresses on the first UP node and the reference quantity and that is determined by the first transfer module 1001 is greater than m, and the first difference between the reference quantity and the quantity of virtual MAC addresses on the target UP node is greater than m. It can be learned that the quantity of virtual MAC addresses on the first UP node is greater than the reference quantity, and the reference quantity is greater than the quantity of virtual MAC addresses on the target UP node. In this way, the at least one virtual MAC address on the first UP node is transferred to the target UP node, so that the quantities of virtual MAC addresses on the first UP node and the target UP node tend to be balanced, and the quantities of virtual MAC addresses on the plurality of UP nodes tend to be balanced. As time goes on, a user goes online and offline continuously, and load of each virtual MAC address tends to be balanced. In this case, if the quantity of virtual MAC addresses on the first UP node and the quantity of virtual MAC addresses on the target UP node tend to be balanced, load of the plurality of UP nodes tends to be balanced.

The at least one virtual MAC address selected by the first transfer module 1001 is at least one virtual MAC address, on the first UP node, whose load is low and that is capable of being accommodated by the remaining load of the target UP node. In this case, after the first transfer module 1001 transfers the at least one virtual MAC address to the target UP node, the target UP node is not overloaded, to prevent the target UP node from being faulty. In addition, transferring the at least one virtual MAC address to the target UP node does not cause excessively high load of the target UP node, so that load balancing efficiency of the plurality of UP nodes can be improved.

In the foregoing content, the first transfer module 1001 sequentially performs the third operation on each UP node other than the target UP node in the plurality of UP nodes based on that the target UP node is the newly added UP node in the plurality of UP nodes, and the first difference between the reference quantity and the quantity of virtual MAC addresses on the target UP node is greater than m, until the first difference is less than or equal to m. In this way, the first transfer module 1001 transfers the first virtual MAC address in the plurality of virtual MAC addresses from the first UP node in the plurality of UP nodes to the target UP node based on that the target UP node in the plurality of UP nodes satisfies the target condition.

Further, it is assumed that the first UP node is a non-faulty node, the second difference between the quantity of virtual MAC addresses on the first UP node and the reference quantity is greater than m, and the first UP node has the at least one virtual MAC address that is capable of being accommodated by the remaining load of the target UP node. The target condition includes: the first difference between the reference quantity and the quantity of virtual MAC addresses on the target UP node is greater than m. The first transfer module 1001 transfers the at least one virtual MAC address on the first UP node to the target UP node based on that the target UP node satisfies the target condition. The quantity of virtual MAC addresses in the at least one virtual MAC address on the first UP node is less than or equal to the first difference and the second difference, and the at least one virtual MAC address on the first UP node includes the first virtual MAC address. In this case, as shown in FIG. 13, the communication apparatus further includes a second transfer module 1002.

The second transfer module 1002 is configured to: after the first transfer module 1001 transfers the first virtual MAC address in the plurality of virtual MAC addresses from the first UP node in the plurality of UP nodes to the target UP node based on that the target UP node in the plurality of UP nodes satisfies the target condition, transfer at least one virtual MAC address on a second UP node in the plurality of UP nodes to the target UP node based on that the target UP node satisfies an auxiliary condition. The auxiliary condition includes: a third difference between the reference quantity and the quantity of virtual MAC addresses on the target UP node is greater than n, a fourth difference between a quantity of virtual MAC addresses on the second UP node and the reference quantity is greater than or equal to n, n>m, the at least one virtual MAC address on the second UP node is capable of being accommodated by the remaining load of the target UP node, and a quantity of virtual MAC addresses in the at least one virtual MAC address on the second UP node is less than or equal to the third difference and the fourth difference. For an operation performed by the second transfer module 1002, refer to related descriptions in the foregoing embodiment of the communication method. Details are not described in this embodiment of this application.

For example, the second transfer module is configured to: sequentially perform a fourth operation on each UP node other than the target UP node in the plurality of UP nodes based on that the target UP node is a newly added node in the plurality of UP nodes and the third difference is greater than n, until the third difference is less than or equal to n. The fourth operation includes: transferring the at least one virtual MAC address on the second UP node to the target UP node, to update the quantity of virtual MAC addresses on each UP node.

It can be learned from the foregoing content that, the fourth difference that is between the quantity of virtual MAC addresses on the second UP node and the reference quantity and that is determined by the second transfer module 1002 is greater than n, and the third difference between the reference quantity and the quantity of virtual MAC addresses on the target UP node is greater than n. It can be learned that the quantity of virtual MAC addresses on the second UP node is greater than the reference quantity, and the reference quantity is greater than the quantity of virtual MAC addresses on the target UP node. In this way, the at least one virtual MAC address on the second UP node is transferred to the target UP node, so that the quantities of virtual MAC addresses on the second UP node and the target UP node tend to be balanced, and the quantities of virtual MAC addresses on the plurality of UP nodes tend to be balanced. As time goes on, a user goes online and offline continuously, and load of each virtual MAC address tends to be balanced. In this case, if the quantity of virtual MAC addresses on the second UP node and the quantity of virtual MAC addresses on the target UP node tend to be balanced, load of the plurality of UP nodes tends to be balanced.

The at least one virtual MAC address selected by the second transfer module 1002 may be at least one virtual MAC address, on the second UP node, whose load is low and that is capable of being accommodated by the remaining load of the target UP node. In this case, after the second transfer module transfers the at least one virtual MAC address to the target UP node, the target UP node is not overloaded, to prevent the target UP node from being faulty. In addition, transferring the at least one virtual MAC address to the target UP node does not cause excessively high load of the target UP node, so that load balancing efficiency of the plurality of UP nodes can be improved.

In this example, the reference quantity may be considered as a baseline quantity of virtual MAC addresses on a UP node. When the first difference between the reference quantity and the quantity of virtual MAC addresses on the target UP node is greater than m, the first transfer module 1001 may determine that there is a difference between the quantity of virtual MAC addresses on the target UP node and a quantity of virtual MAC addresses on another UP node. In this case, the first transfer module 1001 may need to transfer the virtual MAC address to the target UP node, to facilitate balancing between the quantities of virtual MAC addresses on the UP nodes. In addition, the first difference between the reference quantity and the quantity of virtual MAC addresses on the target UP node may be further reduced.

After the first transfer module 1001 transfers the virtual MAC address to the target UP node based on that the first difference is greater than m, if the third difference between the reference quantity and the quantity of virtual MAC addresses on the target UP node is greater than n (n>m), the second transfer module 1002 may determine that a difference between the quantity of virtual MAC addresses on the target UP node and a quantity of virtual MAC addresses on another UP node is large. In this case, the second transfer module 1002 may need to continue to transfer the virtual MAC address to the target UP node, to further facilitate balancing between the quantities of virtual MAC addresses on the UP nodes. In addition, the third difference between the reference quantity and the quantity of virtual MAC addresses on the target UP node may be further made less than or equal to n as much as possible, to avoid a case in which a difference between the quantity of virtual MAC addresses on the target UP node and a quantity of virtual MAC addresses on another UP node is large, so as to facilitate load balancing between the plurality of UP nodes.

In addition, if after the first transfer module 1001 transfers the virtual MAC address to the target UP node based on that the first difference is greater than m, the third difference between the reference quantity and the quantity of virtual MAC addresses on the target UP node is less than or equal to n, the second transfer module 1002 may determine that a difference between the quantity of virtual MAC addresses on the target UP node and a quantity of virtual MAC addresses on another UP node is not large, and the quantities of virtual MAC addresses on the UP nodes are balanced. Therefore, the second transfer module 1002 does not need to continue to transfer the virtual MAC address to the target UP node.

It may be understood that, after the first transfer module 1001 transfers the first virtual MAC address in the plurality of virtual MAC addresses from the first UP node in the plurality of UP nodes to the target UP node based on that the target UP node in the plurality of UP nodes satisfies the target condition, the second transfer module 1002 may alternatively transfer the at least one virtual MAC address on the second UP node in the plurality of UP nodes to the target UP node without considering that the target UP node satisfies the auxiliary condition.

FIG. 14 is a block diagram of another communication apparatus according to an embodiment of this application. For example, the communication device may belong to the CP node in the foregoing embodiments. The communication apparatus includes a first sending module 1101 and a second sending module 1102.

The first sending module 1101 is configured to send, to a first UP node in a plurality of UP nodes at a first moment based on quality of a link between each of the plurality of UP nodes and the CP node, a first priority of responding to a request of a user by the first UP node. For an operation performed by the first sending module 1101, refer to S901 in the embodiment shown in FIG. 12. Details are not described in this embodiment of this application.

The second sending module 1102 is configured to send, to a second UP node in the plurality of UP nodes at a second moment based on quality of the link between each of the plurality of UP nodes and the CP node, a second priority of responding to the request of the user by the second UP node, where the second UP node is different from the first UP node. For an operation performed by the second sending module 1102, refer to S902 in the embodiment shown in FIG. 12. Details are not described in this embodiment of this application.

The CP node may perform a plurality of priority allocation operations, where an operation performed at the first moment is one priority allocation operation, and an operation performed at the second moment is another priority allocation operation. In embodiments of this application, when performing each priority operation, the CP node may send, to the UP node (for example, the first UP node or the second UP node) based on the quality of the link between each of the plurality of UP nodes and the CP node, the priority of responding to the request of the user by the UP node. A UP node with a higher priority in the plurality of UP nodes preferentially responds to the access request of the user. It can be learned that in embodiments of this application, the priority of responding to the request of the user by the UP node is related to the quality of the link between the UP node and the CP node. In this way, the CP node may determine, with reference to the quality of the link between each UP node and the CP node, the priority of responding to the request of the user by the UP node, so that the priority of responding to the request of the user by the UP node is more reasonable.

Optionally, quality of a link between at least one of the plurality of UP nodes and the CP node changes at the second moment relative to the first moment. It can be learned that when the CP node performs different priority allocation operations, if the quality of the link between at least one of the plurality of UP nodes and the CP node changes, at least one UP node that receives a priority of responding to the request of the user in the different priority allocation operations changes (for example, changes from the first UP node to the second UP node).

Optionally, in each priority allocation operation performed by the CP node, for a UP node that receives a priority of responding to the request of the user, quality of a link between the UP node and the CP node is higher than or equal to a quality threshold. Alternatively, in some priority allocation operations performed by the CP node, for a UP node that receives a priority of responding to the request of the user, quality of a link between the UP node and the CP node is higher than or equal to a quality threshold. However, in other priority allocation operations performed by the CP node, for a UP node that receives a priority of responding to the request of the user, quality of a link between the UP node and the CP node may alternatively be lower than the quality threshold. For example, the quality of the link between the first UP node and the CP node is higher than or equal to first quality, and the quality of the link between the second UP node and the CP node is higher than or equal to second quality. The first quality is a quality threshold at the first moment, and the second quality is a quality threshold at the second moment. For another example, the quality of the link between the first UP node and the CP node at the first moment is higher than or equal to the first quality, or the quality of the link between the second UP node and the CP node at the second moment is higher than or equal to the second quality.

In a priority allocation operation performed by the CP node, if quality of a link between the CP node and a UP node that receives a priority of responding to the request of the user is higher than or equal to the quality threshold, the priority of responding to the request of the user can be prevented from being sent to a UP node whose quality of a link between the UP node and the CP node is lower than the quality threshold, and the UP node is prevented from responding to the request of the user, to ensure reliability of user communication. Certainly, in this application, alternatively, in each priority allocation operation, each UP node may receive a priority that is of responding to the request of the user and that is sent by the CP node. This is not limited in this application.

Further, for different priority allocation operations, quality thresholds may be the same or may be different. For example, a quality threshold (the first quality) at the first moment may be the same as or different from a quality threshold (the second quality) at the first moment.

Optionally, when the CP node performs different priority allocation operations, the first priority that is of responding to the request of the user and that is received by the first UP node may be the same as or different from the second priority that is of responding to the request of the user and that is received by the second UP node. For example, the first priority is higher than the second priority; or the second priority is higher than the first priority.

Optionally, a priority of responding to a request of a user by a UP node may be positively correlated with quality of a link between the UP node and the CP node. For example, the CP node sends priorities of responding to the request of the user to at least two UP nodes. In addition, for the at least two UP nodes, a UP node with higher quality of a link between the UP node and the CP node has a higher priority of responding to the request of the user, and a UP node with lower quality of a link between the UP node and the CP node has a lower priority of responding to the request of the user. For another example, in different priority allocation operation processes, for two UP nodes that receive priorities of responding to the request of the user, a UP node with higher quality of a link between the UP node and the CP node has a higher priority of responding to the request of the user, and a UP node with lower quality of a link between the UP node and the CP node has a lower priority of responding to the request of the user. For example, when the second priority is higher than the first priority, the quality of the link between the second UP node and the CP node is higher than the quality of the link between the first UP node and the CP node.

When the priority of responding to the request of the user by the UP node is positively correlated with the quality of the link between the UP node and the CP node, the CP node may set a priority of responding to the request of the user by a UP node with highest quality of a link between the UP node and the CP node to be the highest, so that a user can access the UP node, to ensure high efficiency of responding to the request of the user by the UP node and improve user experience.

In addition, an embodiment of this application further provides a broadband network access apparatus, which belongs to a UP in a CU-separated BNG system. The broadband network access apparatus includes modules configured to perform the method performed by any UP in any one of the foregoing broadband network access methods.

An embodiment of this application provides a computer storage medium. The storage medium stores a computer program. When the computer program runs on a computer, the computer is enabled to perform the method performed by the CP node or the UP node in any method provided in embodiments of this application.

An embodiment of this application further provides a computer program product including instructions. When the computer program product runs on a communication device, the communication device is enabled to perform the method performed by the CP node or the UP node in any method provided in embodiments of this application.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

An embodiment of this application further provides a chip. The chip includes a programmable logic circuit and/or program instructions. When the chip runs, the chip is configured to implement the method performed by the CP node or the UP node in any method provided in embodiments of this application.

In this application, the terms "first", "second", and the like are merely intended for description, but cannot be understood as an indication or implication of relative importance. The term "at least one" refers to one or more, and the term "a plurality of" refers to two or more, unless expressly limited otherwise. A term "and/or" describes only an association relationship between associated objects and indicates that there may be three relationships. For example, A and/or B may represent the following three cases: Only A exists, both A and B exist, and only B exists.

For different types of embodiments such as the method embodiment and the device embodiment provided in embodiments of this application, refer to each other. This is not limited in embodiments of this application. A sequence of the operations of the method embodiment provided in embodiments of this application can be properly adjusted, and the operations can be correspondingly added or deleted based on a situation. Any method that can be easily figured out by a person skilled in the art within a technical scope disclosed in this application shall fall within the protection scope of this application. Therefore, details are not described again.

In the corresponding embodiments provided in this application, it should be understood that the disclosed system and device may be implemented in other manners. For example, the described device embodiment is merely an example. For example, division into modules is merely logical function division. During actual implementation, there may be another division manner. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic or other forms.

The units described as separate parts may or may not be physically separate, and parts described as units may or may not be physical units, may be located in one position, or may be distributed on a plurality of devices. Some or all of the units may be selected based on actual requirements to achieve the objectives of the solutions in embodiments.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a control plane (CP) node in a virtual broadband network gateway (vBNG) system, wherein the method comprises:
   transferring, based on a target user plane (UP) node satisfying a target condition, a first virtual media access control (MAC) address from a first UP node to the target UP node,
   wherein the target condition is related to a load of the target UP node,
   wherein the vBNG system comprises a plurality of UP nodes,
   wherein the plurality of UP nodes has a plurality of virtual MAC addresses for user access,
   wherein the plurality of UP nodes comprises the first UP node and the target UP node, and
   wherein the plurality of virtual MAC addresses comprises the first virtual MAC address.

2. The method according to claim 1, wherein the load of the target UP node is positively correlated with a quantity of users carried on the target UP node.

3. The method according to claim 1, wherein the target condition is one of:
   the first virtual MAC address is on the first UP node, wherein the first UP node has a load that is the highest load of the plurality of UP nodes and that is capable of being accommodated by a remaining load of the target UP node;

the first virtual MAC address is on the first UP node, wherein the first UP node has a load that is the lowest load of the plurality of UP nodes and that is capable of being accommodated by the remaining load of the target UP node; or the first virtual MAC address is for user access on the first UP node, wherein the first UP node has a load that is the lowest load of the plurality of UP nodes and that is capable of being accommodated by the remaining load of the target UP node.

4. The method according to claim 3, wherein the load of the first UP node is positively correlated with a quantity of users carried on the virtual MAC address.

5. The method according to claim 1, wherein the target condition is a remaining load of the target UP node being capable of accommodating the first virtual MAC address.

6. The method according to claim 1, wherein the target condition is the target UP node having a remaining load that is capable of accommodating the first virtual MAC address and having a load that is the lowest load of the plurality of UP nodes.

7. The method according to claim 1, wherein the target condition is the target UP node being a newly added UP node in the plurality of UP nodes.

8. The method according to claim 1, wherein the target condition is the load of the target UP node being less than a load of the first UP node.

9. The method according to claim 1, wherein the target condition is a first quantity of virtual MAC addresses on the target UP node being less than a second quantity of virtual MAC addresses on the first UP node.

10. A communication device applied to a control plane (CP) node in a virtual broadband network gateway (vBNG) system, wherein the communication device comprises:

a memory configured to store instructions; and one or more processors coupled to the memory and configured to execute the instructions to cause the communication device to:

transfer, based on a target user plane (UP) node satisfying a target condition, a first virtual media access control (MAC) address from a first UP node to the target UP node, wherein the target condition is related to a load of the target UP node, wherein the vBNG system comprises a plurality of UP nodes, wherein the plurality of UP nodes has a plurality of virtual MAC addresses for user access, wherein the plurality of UP nodes comprises the first UP node and the target UP node, and wherein the plurality of virtual MAC addresses comprises the first virtual MAC address.

11. The communication device according to claim 10, wherein the load of the target UP node is positively correlated with a quantity of users carried on the target UP node.

12. The communication device according to claim 10, wherein the target condition is one of:

the first virtual MAC address is on the first UP node, wherein the first UP node has a load that is the highest load of the plurality of UP nodes and that is capable of being accommodated by a remaining load of the target UP node;

the first virtual MAC address is on the first UP node, wherein the first UP node has a load that is the lowest load of the plurality of UP nodes and that is capable of being accommodated by the remaining load of the target UP node; or the first virtual MAC address is for user access on the first UP node, wherein the first UP node has a load that is the lowest load of the plurality of UP nodes and that is capable of being accommodated by the remaining load of the target UP node.

13. The communication device according to claim 12, wherein the load of the first UP node is positively correlated with a quantity of users carried on the virtual MAC address.

14. The communication device according to claim 10, wherein the target condition is a remaining load of the target UP node being capable of accommodating the first virtual MAC address.

15. The communication device according to claim 10, wherein the target condition is the target UP node having a remaining load that is capable of accommodating the first virtual MAC address and having a load that is the lowest load of the plurality of UP nodes.

16. The communication device according to claim 10, wherein the target condition is the target UP node being a newly added UP node in the plurality of UP nodes.

17. The communication device according to claim 10, wherein the target condition is the load of the target UP node being less than a load of the first UP node.

18. The communication device according to claim 10, wherein the target condition is a first quantity of virtual MAC addresses on the target UP node being less than a second quantity of virtual MAC addresses on the first UP node.

19. A virtual broadband network gateway (vBNG) system comprising:

a plurality of user plane (UP) nodes having a plurality of virtual media access control (MAC) addresses for user access, wherein the plurality of UP nodes comprises a first UP node and a target UP node, and wherein the plurality of virtual MAC addresses comprises a first virtual MAC address; and a control plane (CP) configured to transfer, based on the target UP node satisfying a target condition, the first virtual MAC address from the first UP node to the target UP node, wherein the target condition is related to a load of the target UP node.

20. The vBNG system according to claim 19, wherein the load of the target UP node is positively correlated with a quantity of users carried on the target UP node.

* * * * *